(12) United States Patent
Ahn et al.

(10) Patent No.: US 12,517,553 B2
(45) Date of Patent: Jan. 6, 2026

(54) ELECTRONIC APPARATUS COMPRISING FLEXIBLE DISPLAY

(71) Applicant: SAMSUNG ELECTRONICS CO., LTD., Suwon-si (KR)

(72) Inventors: Sungho Ahn, Suwon-si (KR); Youngtae Kim, Suwon-si (KR); Kiyul Lim, Suwon-si (KR); Inkuk Yun, Suwon-si (KR); Hyunju Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 322 days.

(21) Appl. No.: 18/297,192

(22) Filed: Apr. 7, 2023

(65) Prior Publication Data

US 2023/0259167 A1    Aug. 17, 2023

Related U.S. Application Data

(63) Continuation of application No. PCT/KR2021/016999, filed on Nov. 18, 2021.

(30) Foreign Application Priority Data

Nov. 18, 2020 (KR) .................. 10-2020-0154332
Jan. 11, 2021 (KR) .................. 10-2021-0003608
(Continued)

(51) Int. Cl.
    *G06F 1/16*    (2006.01)
(52) U.S. Cl.
    CPC .......... *G06F 1/1652* (2013.01); *G06F 1/1624* (2013.01)
(58) Field of Classification Search
    CPC ..... G06F 1/1652; G06F 1/1624; B32B 17/06; B32B 3/18; B32B 3/263; B32B 3/266;
    (Continued)

(56) References Cited

U.S. PATENT DOCUMENTS 9,677,742 B2    6/2017  Cho
9,773,853 B2    9/2017  Tao et al.
(Continued)

FOREIGN PATENT DOCUMENTS

CN    105789252 A    7/2016
JP    2019219545 A   12/2019
(Continued)

OTHER PUBLICATIONS

International Search Report for PCT/KR2021/016999 mailed Feb. 25, 2022, 4 pages.
(Continued)

*Primary Examiner* — Rockshana D Chowdhury
(74) *Attorney, Agent, or Firm* — Nixon & Vanderhye P.C.

(57) ABSTRACT

An electronic device according to an embodiment of the disclosure includes: a first housing, a second housing coupled to one side of the first housing and configured to slide in multiple directions, and a display including a plurality of layers, and a size of a visible region of the display of a front surface of the electronic device is configured to be changed in response to a sliding operation of the second housing. The display includes a base part forming the front surface of the electronic device and configured to maintain a shape based on the second structure sliding and a rollable part extending from the base part and configured to be deformed to be flat or curved based on the sliding operation of the second housing. The plurality of layers include a panel layer, a reinforcement layer disposed on a surface of the panel layer, and a cover layer disposed on a surface of the reinforcement layer and facing the panel layer with the reinforcement layer therebetween. The cover layer includes a first portion included in the base part of the display and a second portion included in the rollable part of the display when a section of the display is viewed. The first portion and
(Continued)

the second portion are different from each other in terms of at least one of a structure, a shape, or a property.

17 Claims, 27 Drawing Sheets

(30) Foreign Application Priority Data

May 7, 2021 (KR) .................. 10-2021-0059326
Sep. 15, 2021 (KR) .................. 10-2021-0123096

(58) Field of Classification Search
CPC .......... B32B 7/022; B32B 7/12; B32B 27/08;
B32B 27/281; B32B 27/283; B32B
27/308; B32B 27/36; B32B 27/38; B32B
27/40; B32B 2307/54; B32B 2457/20;
H04M 1/0235; H04M 1/0268; G09F
9/301
See application file for complete search history.

(56) References Cited

U.S. PATENT DOCUMENTS

| | | | |
|---|---|---|---|
| 9,935,279 B2* | 4/2018 | Lee .................. H10K 77/111 |
| 9,991,468 B2 | 6/2018 | Lee et al. |
| 10,211,426 B2 | 2/2019 | Lee et al. |
| 10,303,218 B2 | 5/2019 | Jones et al. |
| 10,375,839 B2 | 8/2019 | Jung et al. |
| 10,579,105 B2 | 3/2020 | Jones et al. |
| 10,603,876 B2* | 3/2020 | Kwak .................. C08L 51/00 |
| 10,804,477 B2* | 10/2020 | Kim .................. H10K 59/871 |
| 10,845,848 B2 | 11/2020 | Jones et al. |
| 10,897,826 B2 | 1/2021 | Jung et al. |
| 11,194,363 B2 | 12/2021 | Kim et al. |
| 11,385,682 B2 | 7/2022 | Jones et al. |
| 11,398,607 B2* | 7/2022 | Lee .................. B32B 27/06 |
| 11,775,013 B2* | 10/2023 | Cho .................. G06F 1/1681 |
| | | 361/679.01 |
| 12,044,822 B2* | 7/2024 | Park .................. G06F 1/1652 |
| 2014/0140037 A1 | 5/2014 | Cho |
| 2015/0147532 A1 | 5/2015 | Nam et al. |
| 2016/0204183 A1 | 7/2016 | Tao et al. |
| 2017/0247579 A1* | 8/2017 | Kwak .................. B32B 27/36 |
| 2018/0014417 A1* | 1/2018 | Seo .................. G09F 9/301 |
| 2018/0132370 A1* | 5/2018 | Choi .................. B32B 27/06 |
| 2018/0217639 A1 | 8/2018 | Jones et al. |
| 2018/0364759 A1 | 12/2018 | Ahn et al. |
| 2019/0101784 A1* | 4/2019 | Shin .................. G02F 1/133305 |
| 2019/0293921 A1 | 9/2019 | Nam et al. |
| 2020/0133345 A1 | 4/2020 | Ahn et al. |
| 2020/0235340 A1* | 7/2020 | Oh .................. H10K 77/111 |
| 2020/0292731 A1 | 9/2020 | Park et al. |
| 2020/0409421 A1 | 12/2020 | Cho et al. |
| 2021/0124401 A1 | 4/2021 | Ahn et al. |
| 2022/0057843 A1 | 2/2022 | Kim et al. |
| 2023/0140335 A1 | 5/2023 | Ahn et al. |
| 2023/0259167 A1* | 8/2023 | Ahn .................. B32B 27/36 |

FOREIGN PATENT DOCUMENTS

| | | |
|---|---|---|
| KR | 20140063227 A | 5/2014 |
| KR | 20160095285 A | 8/2016 |
| KR | 20170026747 A | 3/2017 |
| KR | 20190062855 A | 6/2019 |
| KR | 20190106322 A | 9/2019 |
| KR | 102068685 B1 | 1/2020 |
| KR | 20200006223 A | 1/2020 |
| KR | 20200124059 A | 11/2020 |

OTHER PUBLICATIONS

Written Opinion of the ISA for PCT/KR2021/016999 mailed Feb. 25, 2022, 5 pages.
Partial European Search Report dated Mar. 5, 2024 issued in European Patent Application No. 21895130.9.
Extended European Search Report dated Jun. 14, 2024 issued in European Patent Application No. 21895130.9.

* cited by examiner

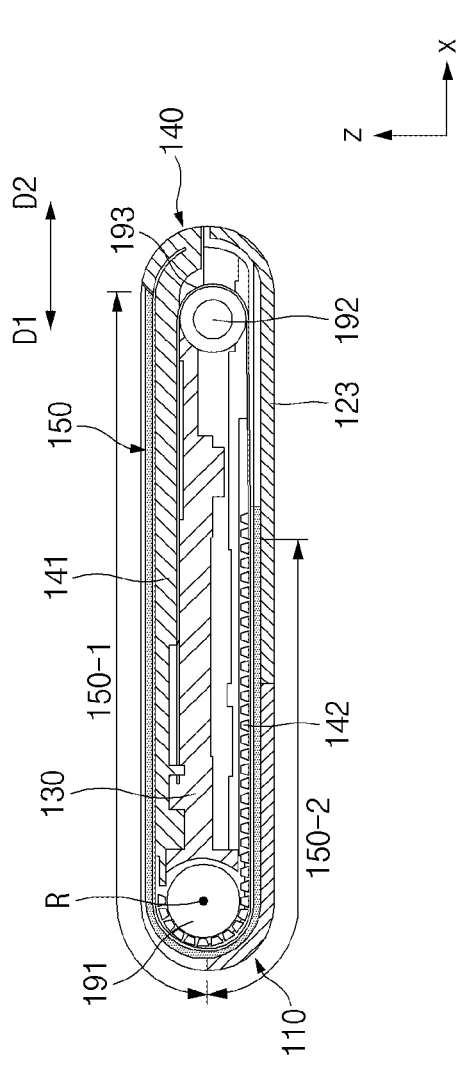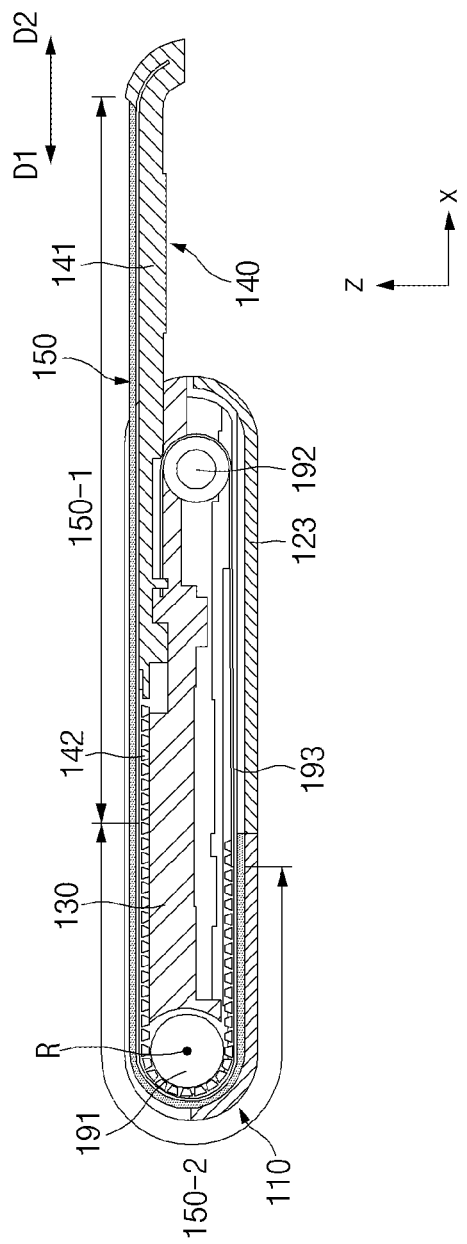
FIG. 4A
FIG. 4B

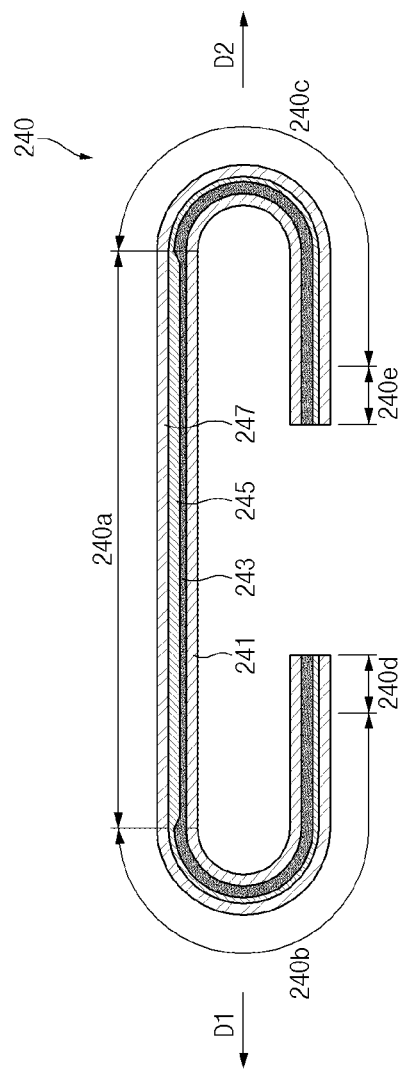
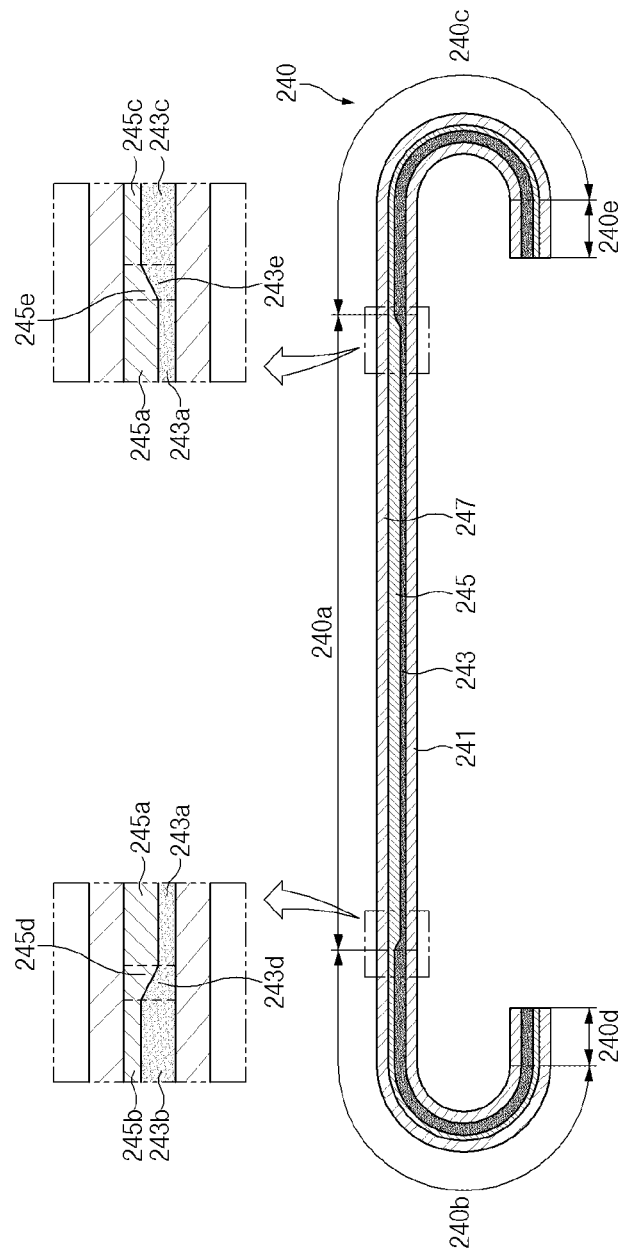
FIG. 14A
FIG. 14B

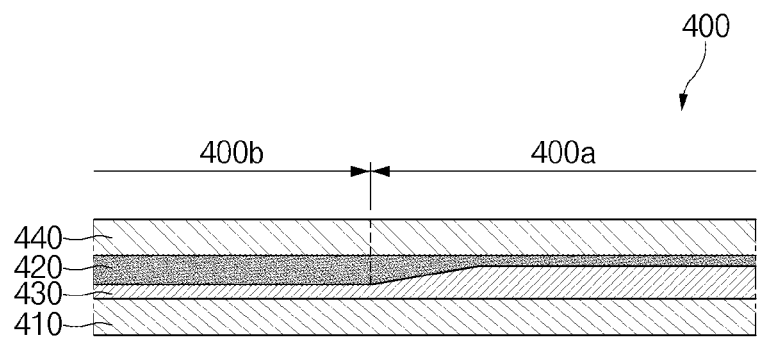
F I G. 18A
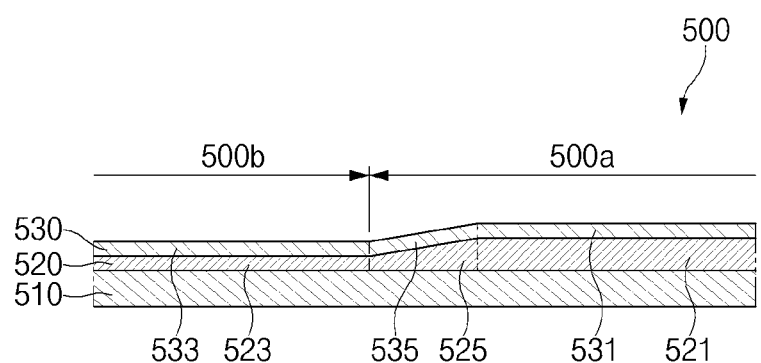
F I G. 18B

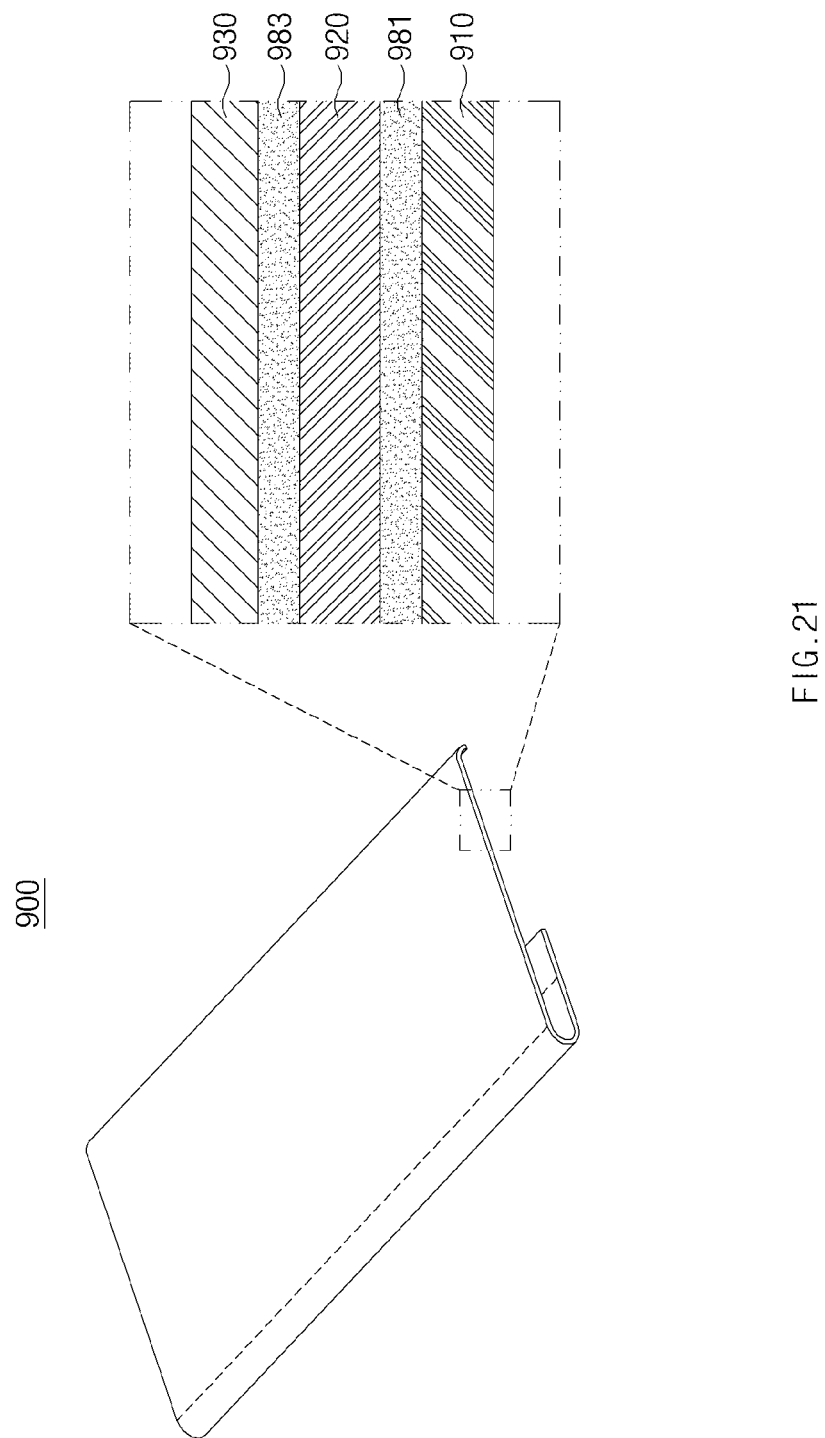

ELECTRONIC APPARATUS COMPRISING FLEXIBLE DISPLAY

CROSS-REFERENCE TO RELATED APPLICATIONS

This application is a continuation of International Application No. PCT/KR2021/016999 designating the United States, filed on Nov. 18, 2021, in the Korean Intellectual Property Receiving Office and claiming priority to Korean Patent Application Nos.: 10-2020-0154332, filed on Nov. 18, 2020, 10-2021-0003608, filed on Jan. 11, 2021, 10-2021-0059326, filed on May 7, 2021, and 10-2021-0123096, filed on Sep. 15, 2021, in the Korean Intellectual Property Office, the disclosures of each of which are incorporated by reference herein in their entireties.

BACKGROUND

Field

The disclosure relates to an electronic device including a flexible display.

DESCRIPTION OF RELATED ART

An electronic device may include a flexible display. The electronic device may extend a display region visually exposed (e.g., visible) on an outer surface of the electronic device. For example, the flexible display may be disposed in the electronic device so as to be curved, foldable, or rollable.

A flexible display included in an electronic device of a slidable type or a rollable type may include an invariable part (e.g., a flat part) that maintains a shape irrespective of a state of the electronic device and a variable part (e.g., a rollable part) that is deformed depending on the state of the electronic device. The variable part, which is deformable, may be deformed to be curved and flat while being rolled when the state of the electronic device is changed.

The flexible display may include a plurality of layers. In a case in which the plurality of layers have the same thickness, there may be a limitation in securing flexibility for deformation of the variable part of the display into a curved surface or a flat surface.

SUMMARY

Embodiments of the disclosure provide an electronic device in which at least one of a plurality of layers included in a flexible display has different structures (e.g., thicknesses, densities, or shapes) in a variable part and an invariable part to secure the strength and flexibility of the flexible display.

An electronic device according to an example embodiment of the disclosure includes: a first housing, a second housing coupled to one side of the first housing and configured to slide in both directions, and a display including a plurality of layers, and a size of a visible region of the display that forms a front surface of the electronic device is configured to be changed in response to a sliding operation of the second housing. The display includes: a base part including the front surface of the electronic device and configured to maintain a shape based on the second structure sliding and a rollable part extending from the base part and deformable to be flat or curved based on the sliding operation of the second housing. The plurality of layers include: a panel layer, a reinforcement layer disposed on one surface of the panel layer, and a cover layer disposed on one surface of the reinforcement layer and facing the panel layer with the reinforcement layer therebetween. The cover layer includes a first portion included in the base part of the display and a second portion included in the rollable part of the display when a section of the display is viewed. The first portion and the second portion are different from each other in terms of at least one of a structure, a shape, or a property.

An electronic device according to an example embodiment of the disclosure includes: a housing having an opening formed on one side thereof, a roller coupled to the inside of the housing and configured to be rotatable, and a display including a plurality of layers and having one end portion connected to the roller, the display being at least partially wound around the roller. The display is visible outside the housing or accommodated in the housing through the opening in response to rotation of the roller. The display includes a base part configured to maintain a shape based on the roller rotating and a rollable part extending from the base part and configured to be wound around the roller and is deformable based on rotation of the roller. The plurality of layers include: a panel layer, a reinforcement layer disposed on one surface of the panel layer, and a cover layer disposed on one surface of the reinforcement layer and facing the panel layer with the reinforcement layer therebetween. At least one of the plurality of layers extending over the base part and the rollable part wherein a portion included in the base part and a portion included in the rollable part are different from each other in terms of at least one of a structure, a shape, or a property.

An electronic device according to an example embodiment of the disclosure includes: a first housing, a second housing coupled to one side of the first housing and configured to slide in both directions, and a display including a plurality of layers, wherein a size of a visible region of the display of a front surface of the electronic device is configured to change in response to a sliding operation of the second housing. The plurality of layers include: a panel layer including a first surface visible in a direction toward the front surface of the electronic device and a second surface facing away from the first surface, a cover layer disposed on the first surface of the panel layer, a protective layer disposed on the cover layer and facing the panel layer with the cover layer therebetween, a first adhesive layer disposed between the panel layer and the cover layer, and a second adhesive layer disposed between the cover layer and the protective layer. The first adhesive layer has a first modulus, and the second adhesive layer has a second modulus greater than the first modulus.

An electronic device according to an example embodiment of the disclosure includes: a first housing, a second housing coupled to one side of the first structure and configured to slide in both directions, and a display including a plurality of layers, wherein a size of a visible region of the display of a front surface of the electronic device is configured to be changed in response to a sliding operation of the second housing. The plurality of layers include: a panel layer including a first surface visible in a direction toward the front surface of the electronic device and a second surface facing away from the first surface, a cover layer disposed on the first surface of the panel layer, a protective layer disposed on the cover layer and facing the panel layer with the cover layer therebetween, a reinforcement layer disposed between the protective layer and the cover layer, and an adhesive layer disposed between the reinforcement layer and the cover layer or between the protective layer and the reinforcement layer attaching the reinforcement layer to the cover layer or the protective layer. The reinforcement layer has a modulus less than a modulus of the protective layer and greater than a modulus of the adhesive layer.

In the electronic device according to the various example embodiments of the disclosure, at least one of the plurality of layers of the display may have different structures (e.g., thicknesses, densities, or shapes) in the variable part (e.g., the rollable part) and the invariable part (e.g., the base part). Accordingly, the strength and flexibility of the flexible display may be secured.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 4A and 4B are cross-sectional views of the electronic device according to various embodiments;

FIGS. 14A and 14B are cross-sectional views illustrating the display of the electronic device according to various embodiments;

FIGS. 18A and 18B are cross-sectional views illustrating portions of displays according to various embodiments;

FIG. 21 is a perspective and cross-sectional view illustrating a display of an electronic device according to various embodiments;

With regard to description of the drawings, identical or similar reference numerals may be used to refer to identical or similar components.

DETAILED DESCRIPTION

Hereinafter, various example embodiments of the disclosure will be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
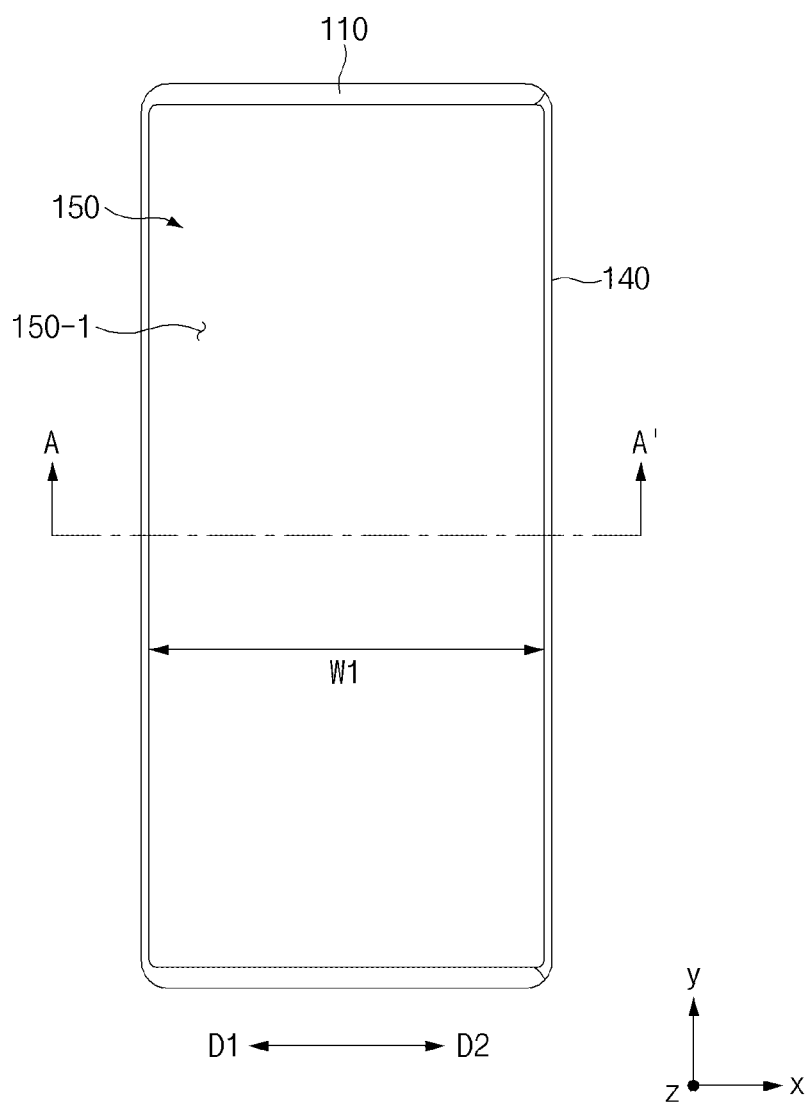
FIG. 1 is a diagram illustrating a first state of an electronic device according to various embodiments.
Figure 2:
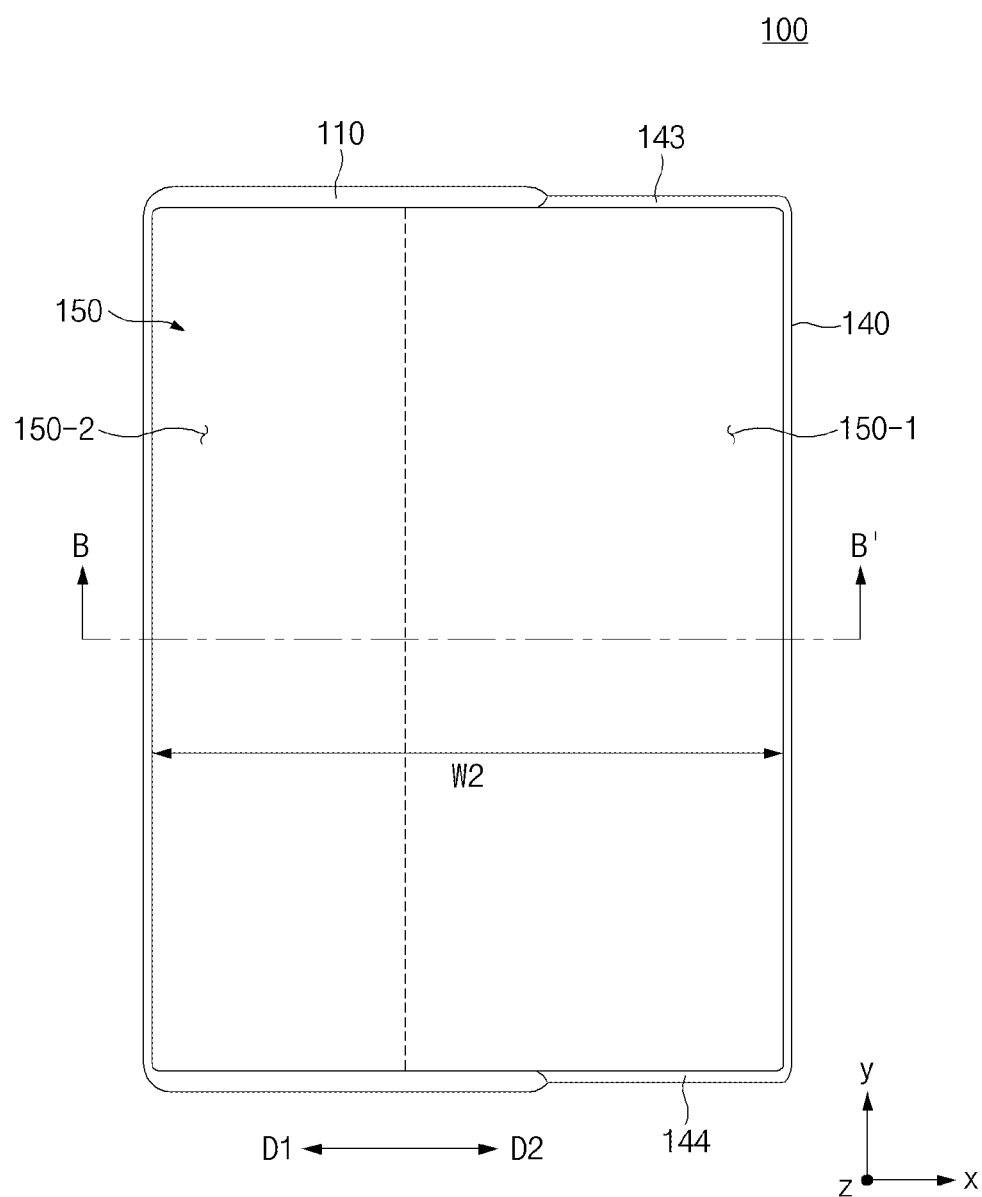
FIG. 2 is a diagram illustrating a second state of the electronic device according to various embodiments.

FIG. 1 is a diagram illustrating a first state of an electronic device according to various embodiments. FIG. 2 is a diagram illustrating a second state of the electronic device according to various embodiments.

Referring to FIGS. 1 and 2, the electronic device 100 according to an embodiment may include a first structure (e.g., a first housing) 110, a second structure (e.g., a second housing) 140, and a display 150. It will be understood, as used herein the terms "first structure" and "second structure" may be used interchangeably with the terms "first housing" and "second housing", respectively.

In an embodiment, the electronic device 100 may be an electronic device of a slidable type or a rollable type and may include the first state (e.g., a closed state or a reduced mode) and the second state (e.g., an open state or an extended mode). The first state and the second state may be determined depending on the position of the second structure 140 relative to the first structure 110. The electronic device 100 may be changed between the first state and the second state by a user operation or a mechanical operation.

In an embodiment, the first state may refer to a state in which the area (or, size) of the display 150 exposed (e.g., visible) on a front surface of the electronic device 100 is relatively reduced. It will be understood that as used herein with reference to a display, the terms "exposed", "visually exposed", "visible" or the like, may be used interchangeably and include a display including a cover layer, cover glass, protective layer, etc. The second state may refer to a state in which the area (or, size) of the display 150 exposed (e.g., visible) on the front surface of the electronic device 100 is relatively extended. For example, the second state may be a state in which the area of the display 150 visually exposed on the front surface of the electronic device 100 is larger than that in the first state. Furthermore, the first state may be a closed state in which portions of the second structure 140 (e.g., lateral portions 143 and 144 facing in the y-axis direction) are located inside (or, outside) the first structure 110 so that the second structure 140 is closed to the first structure 110. The second state may be an open state in which the portions 143 and 144 of the second structure 140 move out of the first structure 110 so that the second structure 140 is open to the first structure 110.

In an embodiment, the first structure (e.g., first housing) 110 and the second structure (e.g., second housing) 140 may be coupled to slide relative to each other. The second structure 140 may be slidably coupled to one side of the first structure 110. For example, the first structure 110 may be a fixed structure, and the second structure 140 may be a structure movable relative to the first structure 110. The second structure 140 may be coupled to the one side of the first structure 110 (e.g., the −x-axis direction) so as to slide relative to the first structure 110 in opposite directions (e.g., the +x/−x-axis directions).

In an embodiment, the electronic device 100 may be changed to the first state and the second state as the second structure 140 slides relative to the first structure 110. For example, the electronic device 100 may be changed to the second state (e.g., the state of FIG. 2) as the second structure 140 moves in a second direction D2 relative to the first structure 110 in the first state (e.g., the state of FIG. 1). The electronic device 100 may be changed to the first state as the second structure 140 moves in a first direction D1 relative to the first structure 110 in the second state.

In an embodiment, the size (or, area) of a region of the display 150 exposed (e.g., visible) on the front surface of the electronic device 100 may be changed in response to a sliding operation of the second structure 140. The exposed (e.g., visible) region of the display 150 may be extended or reduced depending on the sliding operation of the second structure 140 in a state in which the display 150 is supported by at least one of the first structure 110 or the second structure 140. The display 150 may at least partially include a flexible portion.

In an embodiment, the display 150 may include a default region 150-1 and an extended region 150-2 extending from the default region 150-1. The default region 150-1 may remain exposed (e.g., visible) on the front surface of the electronic device 100. The area of the extended region 150-2 exposed on the front surface of the electronic device 100 may vary depending on the states of the electronic device 100. The extended region 150-2 may extend from one side of the default region 150-1 (e.g., the +x-axis direction). For example, the default region 150-1 may refer to a partial region of the display 150 visually exposed on the front surface of the electronic device 100 in the first state. The second region 150-2 may refer to a region that is located inside the electronic device 100 in the first state and that at least partially moves out of the electronic device 100 in the second state and is visually exposed on the front surface of the electronic device 100.

In an embodiment, the first state may be a state in which the default region 150-1 forms the front surface of the electronic device 100 and the extended region 150-2 is located inside the first structure 110, and the second state may be a state in which at least a portion of the extended region 150-2 forms the front surface of the electronic device 100 together with the default region 150-1. The exposed (e.g., visible) area of the display 150 of the electronic device 100 may be extended as the extended region 150-2 is additionally exposed on the front surface of the electronic device 100 in the second state. The display 150 may form a screen display region that is visually exposed on the front surface of the electronic device 100 and on which predetermined visual information (or, a screen) is displayed. For example, in the first state, the screen display region may be formed by the default region 150-1. In the second state, the screen display region may be formed by a portion of the extended region 150-2 and the default region 150-1. In the second state, the electronic device 100 may display a screen on the default region 150-1 and the portion of the extended region 150-2 and thus may provide a screen display region that is extended when compared to that in the first state.

In an embodiment, the first state may include a state in which the exposed (e.g., visible) region of the display 150 has a first size, and the second state may include a state in which the exposed (e.g., visible) region of the display 150 has a second size. For example, the exposed region of the display 150 may have a first width W1 in the first state and may have a second width W2 in the second state. For example, the first size and the first width W1 may be defined as the minimum size and the minimum width of the exposed region of the display 150, respectively. For example, the second size and the second width W2 may be defined as the maximum size and the maximum width of the exposed region of the display 150, respectively. In various embodiments, the electronic device 100 may include any intermediate state defined between the first state and the second state. The intermediate state may be defined as any state in which the width of the exposed region of the display 150 is greater than the first width W1 and smaller than the second width W2.

Figure 3:
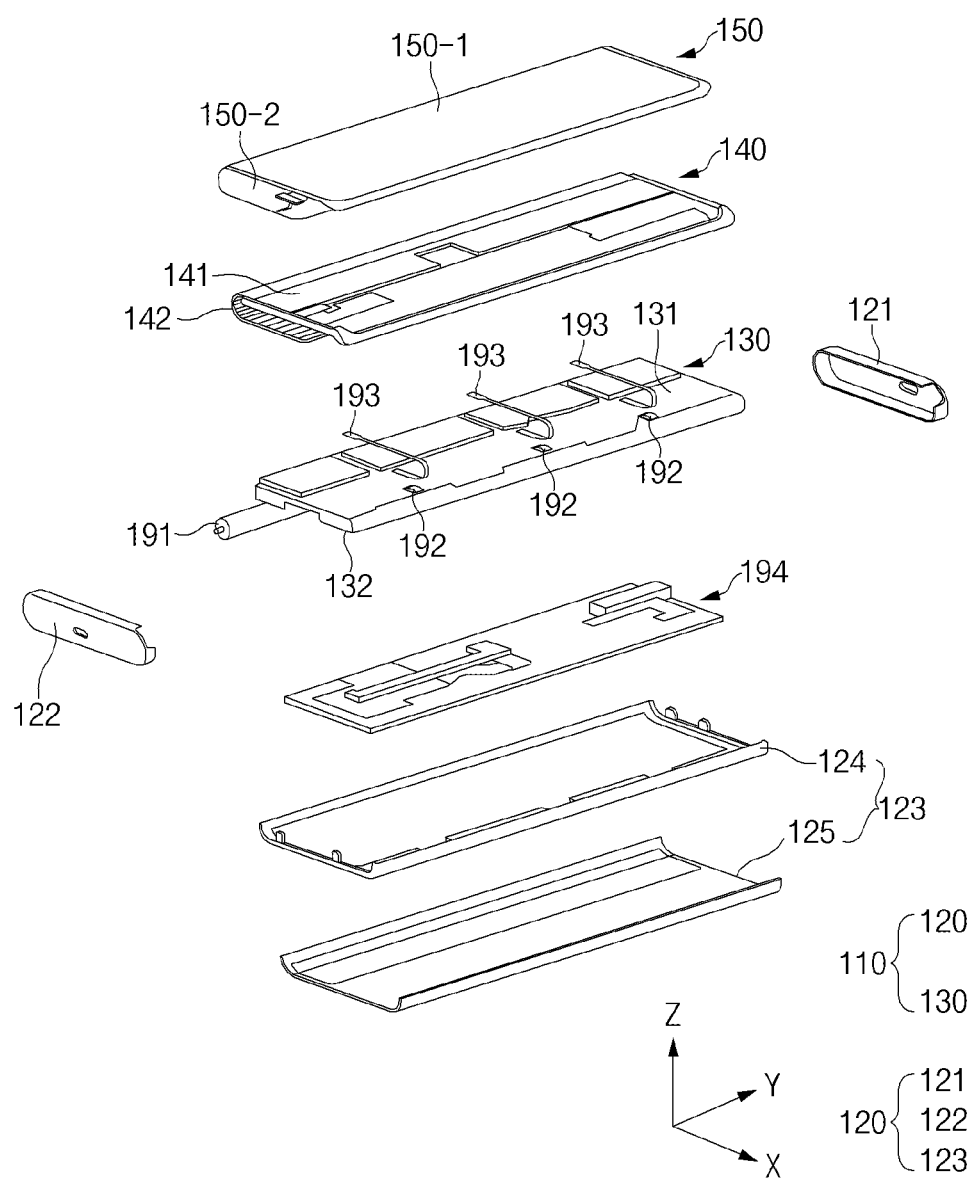
FIG. 3 is an exploded perspective view of the electronic device according to various embodiments

FIG. 3 is an exploded perspective view of the electronic device according to various embodiments. FIGS. 4A and 4B are cross-sectional views illustrating the electronic device according to various embodiments.

FIG. 4A illustrates the first state of the electronic device, and FIG. 4B illustrates the second state of the electronic device. FIG. 4A illustrates a sectional view of the electronic device taken along line A-A' in FIG. 1. FIG. 4B illustrates a sectional view of the electronic device taken along line B-B' in FIG. 2.

Referring to FIGS. 3, 4A and 4B, the electronic device 100 according to an embodiment may include the first structure (e.g., first housing) 110, the second structure (e.g., second housing) 140, the display 150, a first roller 191, a second roller 192, a tension belt 193, and a circuit board 194.

In an embodiment, the first structure 110 may include a case 120 and a bracket 130. The bracket 130 may be coupled to the case 120 and may be at least partially surrounded by the case 120. For example, the bracket 130 may be fixed to the case 120, and the case 120 and the bracket 130 may be movable relative to the second structure 140 depending on a sliding operation of the second structure 140. The case 120 and the bracket 130 may be used as the basis for sliding movement of the second structure 140 and the display 150.

In an embodiment, the case 120 may form at least a portion of an outer surface of the electronic device 100. The case 120 may include a first side member 121, a second side member 122, and a rear member 123. The first side member 121 and the second side member 122 may be disposed to face each other in a direction substantially perpendicular to sliding directions of the second structure 140 (e.g., the first direction D1 and the second direction D2). The rear member 123 may be disposed between the first side member 121 and the second side member 122 and may be connected to the first side member 121 and the second side member 122. The first side member 121, the second side member 122, and the rear member 123 may be coupled together to form a space in which at least some of the other components (e.g., the bracket 130, the second structure 140, and the circuit board 194) of the electronic device 100 are disposed.

In an embodiment, the rear member 123 may include a frame 124 and a cover 125. For example, the frame 124 may be coupled with the bracket 130. The cover 125 may be coupled to the frame 124 to form at least a portion of a rear surface of the electronic device 100. A space in which the second structure 140 and the extended region 150-2 of the display 150 are accommodated may be formed between the cover 125 and the bracket 130.

According to the illustrated embodiment, the first side member 121, the second side member 122, the frame 124, and/or the cover 125 may be formed as separate components and may be assembled or coupled together. However, the disclosure is not limited thereto, and according to various embodiments of the disclosure, the first side member 121, the second side member 122, the frame 124, and the cover 125 may be integrally formed and may be implemented as one part.

In an embodiment, the bracket 130 may be disposed to at least partially overlap the second structure 140. A first surface 131 of the bracket 130 (e.g., a surface facing in the +z-axis direction based on FIG. 3 or an upper surface) may face a plate part 141 of the second structure 140, and a second surface 132 of the bracket 130 (e.g., a surface facing in the −z-axis direction based on FIG. 3 or a lower surface) may face the circuit board 194. The circuit board 194 may be disposed on the second surface 132 of the bracket 130.

In an embodiment, the second structure 140 may be disposed to surround at least a portion of the bracket 130. The second structure 140 may include the plate part 141 supporting one portion of the default region 150-1 of the display 150 and a multi joint part 142 supporting another portion of the default region 150-1 and the extended region 150-2 of the flexible display 150. For example, the multi-joint part 142 may extend from the plate part 141 and may be a bendable portion. The multi joint part 142 may at least partially form a curved surface in response to a sliding operation of the second structure 140.

In an embodiment, the multi-joint part 142 may be coupled to the first roller 191. The multi joint part 142 may include a plurality of bars extending in a direction substantially parallel to a rolling axis R of the first roller 191. For example, the multi-joint part 142 may include a flexible track or a hinge rail. According to an embodiment, the plate part 141 may be configured to slide in the first direction D1 or the second direction D2. The multi-joint part 142 may be configured such that one portion is rotated by the first roller 191 and another portion slides in the first direction D1 or the second direction D2.

In an embodiment, the first roller 191 may be disposed on one side surface of the bracket 130. The first roller 191 may be coupled so as to be rotatable relative to the bracket 130. For example, the first roller 191 may be rotatable about the rolling axis R in opposite directions depending on a sliding operation of the second structure 140. The first roller 191 may be brought into contact with a portion of the multi joint part 142 of the second structure 140. For example, the second structure 140 may be disposed such that the multi joint part 142 surrounds at least a portion of the first roller 191. The first roller 191 may be configured to rotate a portion of the multi-joint part 142. The first roller 191 may be brought into contact with different regions of the multi-joint part 142 depending on a change of state of the electronic device 100.

In an embodiment, the second structure 140 may be slidably coupled to the bracket 130 by the tension belt 193 and the second roller 192. The tension belt 193 may connect an end portion of the plate part 141 and an end portion of the multi-joint part 142 of the second structure 140. The second roller 192 may be configured to rotate in the same direction as the first roller 191 depending on a sliding operation of the second structure 140. For example, between the plate part 141 and the multi-joint part 142, the tension belt 193 may provide tension to the multi joint part 142. According to an embodiment, when the plate part 141 moves in the first direction D1, one end portion of the tension belt 193 connected with the plate part 141 may move in the first direction D1, and an opposite end portion of the tension belt 193 connected with the multi-joint part 142 may move in the second direction D2. In contrast, when the plate part 141 moves in the second direction D2, the one end portion of the tension belt 193 may move in the second direction D2, and the opposite end portion of the tension belt 193 may move in the first direction D1. However, the illustrated embodiment is illustrative, and according to various embodiments of the disclosure, the electronic device 100 may not include at least one of the second roller 192 or the tension belt 193.

In an embodiment, the display 150 may be disposed in the second structure 140. For example, the display 150 may be coupled to the second structure 140 so as to slide relative to the first structure 110 together with the second structure 140. The display 150 may include the default region 150-1 and the extended region 150-2 extending from the default region 150-1. For example, the default region 150-1 may refer to a region visually exposed on the front surface of the electronic device 100 in the first state. The second region 150-2 may refer to a region that is located inside the electronic device 100 in the first state and that moves out of the electronic device 100 and is at least partially visually exposed on the front surface of the electronic device 100 as the electronic device 100 is changed to the second state.

The electronic device 100 according to an embodiment may be configured such that in the first state, the default region 150-1 forms at least a portion of the front surface of the electronic device 100 and in the second state, at least a portion of the extended region 150-2 forms at least a portion of the front surface of the electronic device 100 together with the default region 150-1. The extended region 150-2 may be changed in position as at least a portion thereof rotates together by rotation of the first roller 191. For example, the extended region 150-2 may form the front surface of the electronic device 100 together with the default region 150-1 as the second structure 140 moves in the first direction D1 relative to the first structure 110. Furthermore, the extended region 150-2 may be accommodated in the space between the bracket 130 and the rear member 123 as the second structure 140 moves in the second direction D2 relative to the first structure 110.

In an embodiment, the circuit board 194 may be disposed in the first structure 110. The circuit board 194 may be disposed between the bracket 130 and the rear member 123. For example, the circuit board 194 may be supported by the bracket 130 and may be disposed inside the electronic device 100. The circuit board 194 may be coupled to at least a partial region of the second surface 132 of the bracket 130 and may be fixed to the first structure 110. The circuit board 194, together with the first structure 110, may move relative to the second structure 140 when the second structure 140 slides.

In an embodiment, the circuit board 194 may include a printed circuit board (PCB), a flexible PCB (FPCB), or a rigid-flexible PCB (RFPCB). Various electronic parts included in the electronic device 100 may be electrically connected to the circuit board 194. A processor (not illustrated), a memory (not illustrated), and/or an interface (not illustrated) may be disposed on the circuit board 194. For example, the processor may include a main processor and/or an auxiliary processor, and the main processor and/or the auxiliary processor may include one or more of a central processing unit, an application processor, a graphic processing unit, an image signal processor, a sensor hub processor, or a communication processor. For example, the memory may include a volatile memory or a non-volatile memory. For example, the interface may include a high definition multimedia interface (HDMI), a universal serial bus (USB) interface, an SD card interface, and/or an audio interface. Furthermore, the interface may electrically or physically connect the electronic device 100 with an external electronic device and may include a USB connector, an SD card/MMC connector, or an audio connector.

In an embodiment, a battery (not illustrated) may supply power to at least one component of the electronic device 100. The battery may be integrally disposed inside the electronic device 100, or may be disposed so as to be detachable from the electronic device 100. According to various embodiments of the disclosure, the battery may be supported by the bracket 130 together with the circuit board 194 and may be disposed inside the electronic device 100. The battery may be coupled to at least a partial region of the second surface 132 of the bracket 130. The battery may be disposed on substantially the same plane as the circuit board 194. The battery, together with the first structure 110, may move relative to the second structure 140 when the second structure 140 slides.

The electronic device 100 illustrated in FIGS. 3, 4A and 4B may be an example of a slidable (or, rollable) electronic device, and the structure of the electronic device 100 according to various embodiments of the disclosure is not limited to the illustrated embodiment. For example, the electronic device 100 according to various embodiments of the disclosure may be implemented with various forms of slidable (or, rollable) electronic devices that include a fixed structure and a movable structure movable relative to the fixed structure and in which a display region is extended or reduced as a flexible display moves together with the movable structure.

Figure 5A:
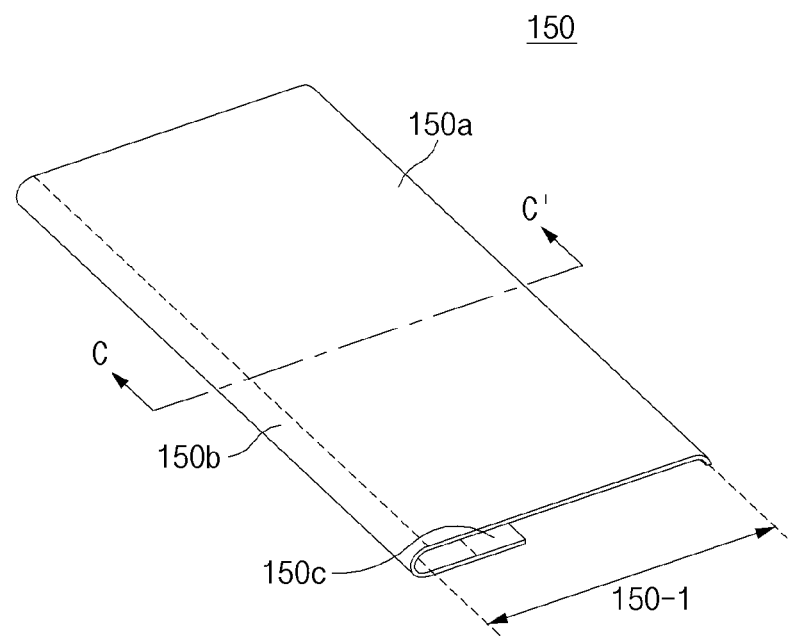
FIGS. 5A and 5B are perspective views illustrating a display of the electronic device according to various embodiments.
Figure 5B:
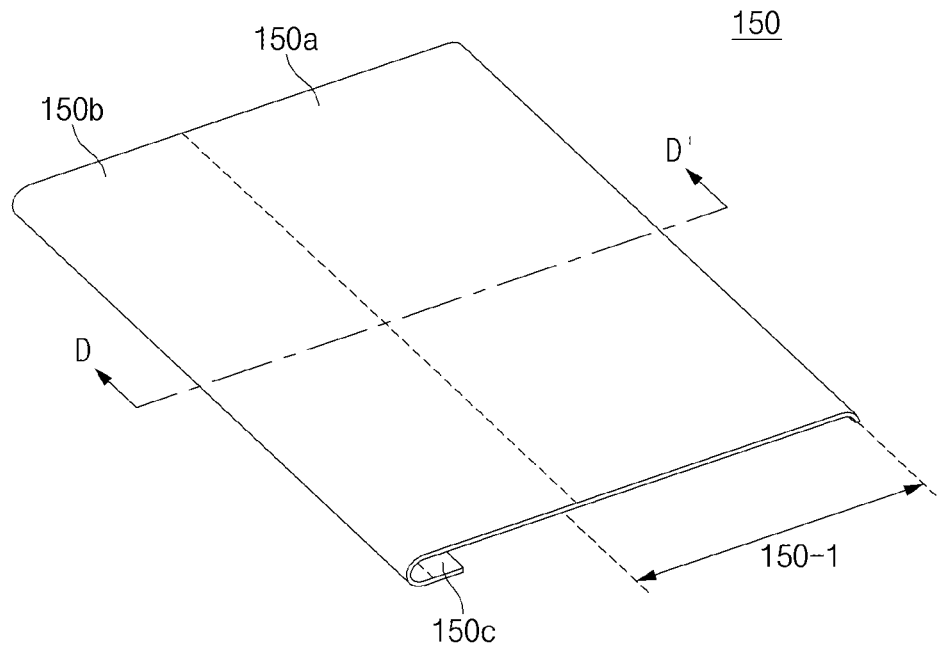

FIGS. 5A and 5B are perspective views illustrating the display of the electronic device according to various embodiments.

FIG. 5A illustrates the form of the display when the electronic device is in the first state. FIG. 5B illustrates the form of the display when the electronic device is in the second state.

Referring to FIGS. 5A and 5B, the display 150 of the electronic device according to an embodiment (e.g., the electronic device 100 of FIGS. 1 to 4) may include a base part 150*a*, a rollable part 150*b* extending from the base part 150*a*, and an extending part 150*c* extending from the rollable part 150*b*.

In an embodiment, the base part 150*a* may form the front surface of the electronic device 100, and the form of the base part 150*a* may be maintained and/or fixed irrespective of a state of the electronic device 100. The rollable part 150*b* may flexibly extend from the base part 150*a* to have shape variability and may be deformed depending on a change of state of the electronic device 100. The extending part 150*c* may face the base part 150*a* or the rollable part 150*b* depending on a state of the electronic device 100 and may remain flat.

According to the illustrated embodiment, the rollable part 150*b* may be disposed between the base part 150*a* and the extending part 150*c*, and the extending part 150*c* may be formed to be smaller than the base part 150*a* and the rollable part 150*b*. However, the structure of the display 150 is not limited to the illustrated embodiment and may be changed according to various embodiments of the disclosure. For example, the display 150 may not include the extending part 150*c*, or the extending part 150*c* may extend from the rollable part 150*b* so as to be shorter. Alternatively, for example, the extending part 150*c* may extend so as to partially face the base part 150*a* (e.g., refer to FIG. 4) when the electronic device 100 is in the second state (e.g., FIG. 5(*b*)).

In an embodiment, the base part 150*a* and the extending part 150*c* may be formed to be substantially flat. The rollable part 150*b* may be partially deformed to be curved or flat in response to a state of the electronic device 100. For example, in the first state and the second state, the base part 150*a* may remain flat. In the first state, one portion of the rollable part 150*b* adjacent to the base part 150*a* may be curved, and the remaining portion of the rollable part 150*b* may be flat while facing the base part 150*a*. In the second state, one portion of the rollable part 150*b* adjacent to the base part 150*a* may be disposed side by side with the base part 150*a* and may be flat, and the remaining portion of the rollable part 150*b* may be curved. In the first state and the second state, the extending part 150*c* may be parallel to the base part 150*a* and may remain flat.

In an embodiment, the base part 150*a* may form the default region 150-1 together with one portion of the rollable part 150*b*. The remaining portion of the rollable part 150*b* may form the extended region (e.g., the extended region 150-2 of FIGS. 1 to 4) together with the extending part 150*c*. For example, the base part 150*a* may be included in the default region 150-1. The one portion of the rollable part 150*b* adjacent to the base part 150*a* may be included in the default region 150-1, and the remaining portion of the rollable part 150*b* may be included in the extended region 150-2. However, the illustrated embodiment is illustrative, and according to various embodiments of the disclosure, in the first state, the rollable part 150*b* may be hidden by another structure so as not to be exposed on the front surface of the electronic device 100. In this case, it may be understood that the default region 150-1 is formed by the base part 150*a* and the extended region 150-2 is formed by the rollable part 150*b*.

Figure 6A:
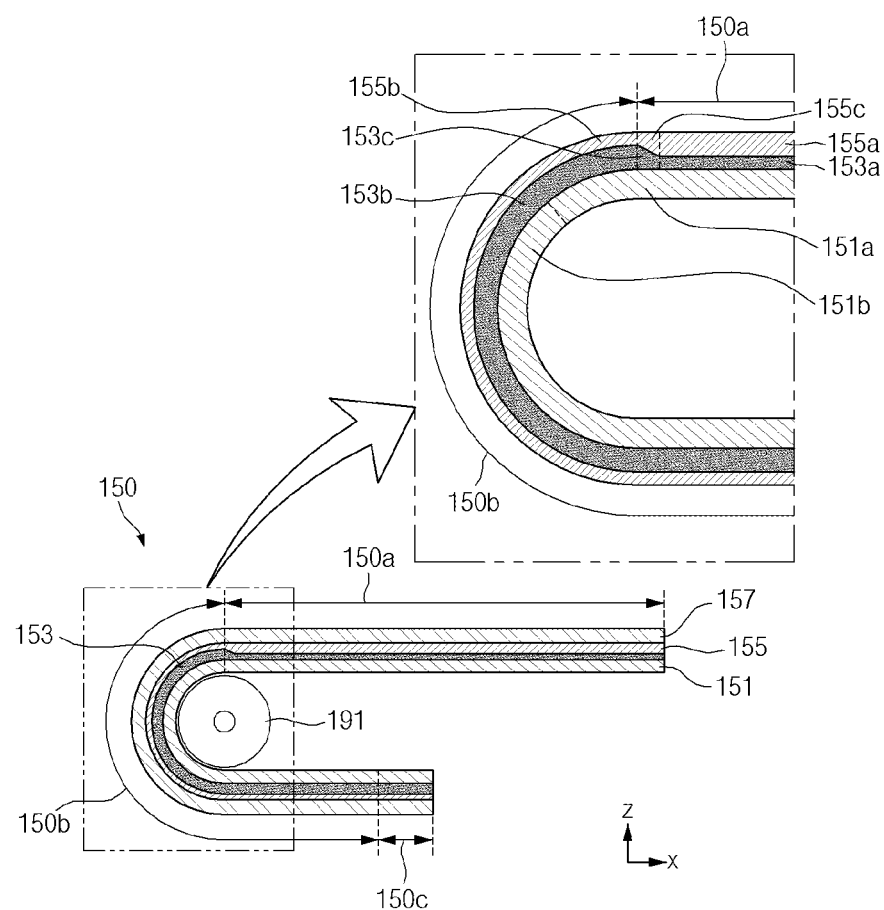
FIGS. 6A and 6B are partial cross-sectional views of the display of the electronic device according to various embodiments.
Figure 6B:
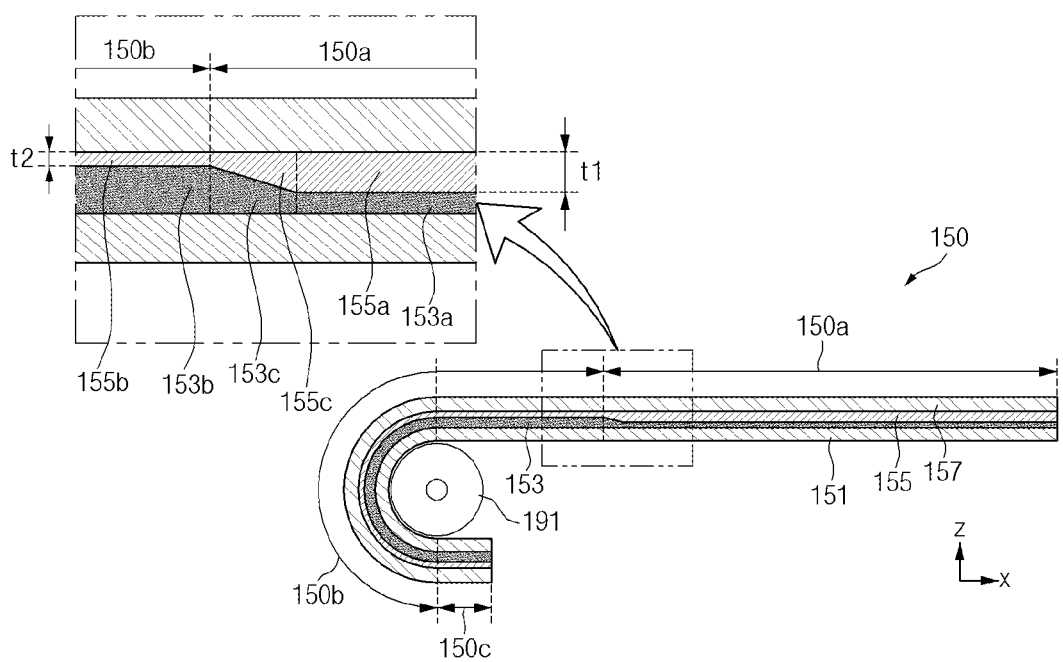

FIGS. 6A and 6B are partial cross-sectional views illustrating the display of the electronic device according to various embodiments.

FIG. 6A illustrates the form of the display when the electronic device is in the first state. FIG. 6B illustrates the form of the display when the electronic device is in the second state. FIG. 6A illustrates a sectional view of the display taken along line C-C' in FIG. 5A. FIG. 6B illustrates a sectional view of the display taken along line D-D' in FIG. 5B.

Referring to FIGS. 6A and 6B, the display 150 of the electronic device according to an embodiment (e.g., the electronic device 100 of FIGS. 1 to 4) may include a plurality of layers 151, 153, 155, and 157 extending from the base part 150*a* to the extending part 150*c* across the rollable part 150*b*. The plurality of layers of the display 150 may include the panel layer 151, the reinforcement layer 153, the cover layer 155, and the protective layer 157.

In an embodiment, the base part 150*a* of the display 150 may be flat in the first state and the second state. The rollable part 150*b* of the display 150 may surround at least a portion of the first roller 191 and may partially perform a rotational motion and a linear motion as the first roller 191 rotates about the rolling axis. When the electronic device 100 is changed from the first state to the second state or from the second state to the first state, the rollable part 150*b* may be moved by the first roller 191, and thus the positions in which a curved surface and a flat surface are formed may be changed.

In an embodiment, the panel layer 151 may display a specified screen and/or image in relation to an operation of the electronic device 100. The panel layer 151 may include a pixel layer (not illustrated) that includes a plurality of light emitting elements, an encapsulation layer (not illustrated) that seals the light emitting elements, a touch sensor layer (not illustrated) that includes touch electrodes, a wiring layer (not illustrated) that includes transistors electrically connected with the light emitting elements, and/or a polarization layer (not illustrated) that prevents and/or reduces reflection of external light to secure visibility. For example, the polarization layer may include a poly ethylene terephthalate (PET) film, a tri-acetyl cellulose (TAC) film, a cycle-olefin polymer (COP) film, or a poly-vinyl alcohol (PVA) film.

In an embodiment, the panel layer 151 may include at least one of a liquid crystal display (LCD) panel, a light emitting diode (LED) display panel, an organic light emitting diode (OLED) display panel, a microelectromechanical systems (MEMS) display panel, or an electronic paper display panel.

In an embodiment, the panel layer 151 may include a first panel region 151*a* that displays (or, outputs) a screen in the first state and a second panel region 151*b* extending from the first panel region 151*a*. The first panel region 151*a* may extend over the base part 150*a* and at least a portion of the rollable part 150*b* of the display 150. For example, one portion of the first panel region 151*a* may be included in the base part 150*a*, and the remaining portion of the first panel region 151*a* may be included in the rollable part 150*b*. The second panel region 151*b* may not display a screen in the first state and may display a screen in the second state. For example, in the second state, at least a portion of the second panel region 151*b* may display a screen together with the first panel region 151*a*. The second panel region 151*b* may be included in the rollable part 150*b* and the extending part 150*c*. The electronic device 100 may further include an intermediate state defined between the first state and the second state. For example, the intermediate state may include any states between the first state and the second state. For example, the intermediate state may be understood as any state before the electronic device 100 is completely changed from the first state to the second state or from the second state to the first state. At least a portion of the second panel region 151*b* may be configured to display a screen together with the first panel region 151*a* in the intermediate state. For example, in the intermediate state, the second panel region 151*b* may display a screen based on a portion of the second panel region 151*b* that is visually exposed on the front surface of the electronic device 100.

In an embodiment, the second panel region 151*b* may include an active region (not illustrated) that displays a screen and an inactive region (not illustrated) that extends from the active region and does not display a screen. For example, one portion of the second panel region 151*b* included in the rollable part 150*b* may be an active region, and the remaining portion of the second panel region 151*b* included in the extending part 150*c* may be an inactive region. However, the disclosure is not limited to the illustrated embodiment, and according to various embodiments of the disclosure, the second panel region 151*b* may not include an inactive region, and the entire second panel region 151*b* may be formed of an active region that displays a screen. Furthermore, according to various embodiments, the inactive region may extend over the extending part 150*c* and a portion of the rollable part 150*b*.

In an embodiment, the reinforcement layer 153 and the cover layer 155 may be disposed between the panel layer 151 and the protective layer 157. The reinforcement layer 153 may be disposed between the panel layer 151 and the cover layer 155, and the cover layer 155 may be disposed between the reinforcement layer 153 and the protective layer 157. The reinforcement layer 153 may be attached with the panel layer 151 through an adhesive member. The cover layer 155 may be attached with the protective layer 157 through an adhesive member. The reinforcement layer 153 and the cover layer 155 may be formed of a light transmissive material capable of passing light emitted from the panel layer 151.

In an embodiment, the cover layer 155 may include a polymer film or a glass material. The cover layer 155 may include a PI material, a PET material, or an ultra thin glass (UTG) material. To secure the strength of the display 150 in the first state and to secure the flexibility of the display 150 in a process in which the electronic device 100 is changed from the first state to the second state, the cover layer 155 may have different thicknesses to correspond to the base part 150*a* and the rollable part 150*b* of the display 150.

In an embodiment, between the cover layer 155 and the panel layer 151, the reinforcement layer 153 may compensate for a thickness difference of the cover layer 155 and may improve the strength of the display 150. The reinforcement layer 153 may have different thicknesses to correspond to the shape of the cover layer 155. The reinforcement layer 153 may compensate for a change in thickness of the cover layer 155 such that an empty space (e.g., an air gap or an air layer) is not formed between the panel layer 151 and the cover layer 155. Accordingly, the visibility of the panel layer 151 may be improved and/or supplemented.

In an embodiment, the protective layer 157 may form one surface of the display 150. The protective layer 157 may be disposed on (or, attached to) one surface of the cover layer 155 and may protect the other layers included in the display 150 (e.g., the cover layer 155, the reinforcement layer 153, and the panel layer 151) from an external impact. For example, the protective layer 157 may protect the thin cover layer 155 and may prevent and/or reduce scattering when the cover layer 155 is cracked. The protective layer 157 may include a glass material, or may be implemented with a film layer or a coating layer. The protective layer 157 may include a flexible material. The protective layer 157 may be formed of a transparent material having a high light transmittance.

In an embodiment, the protective layer 157 may prevent and/or reduce the cover layer 155 from being contaminated by dust or oil. For example, the protective layer 157 may include an anti-smudge coating or an anti-fingerprint coating that prevents and/or reduces a mark, such as a fingerprint due to user contact, from being formed on a surface of the cover layer 155.

In the display 150 according to an embodiment, the structure (or, thickness) of the cover layer 155 may be differently formed depending on a part (e.g., the base part 150*a*) that maintains the form (or, shape) irrespective of a state of the electronic device 100 and a part (e.g., the rollable part 150*b*) that is deformed in response to a state of the electronic device 100. Accordingly, the strength and flexibility of the display 150 may be improved.

In an embodiment, the cover layer 155 may include a first portion 155a having a first thickness t1, a second portion 155b having a second thickness t2 smaller than the first thickness t1, and a third portion 155c disposed between the first portion 155a and the second portion 155b. The third portion 155c may be a variable thickness region between the first portion 155a and the second portion 155b, and the thickness of the third portion 155c may be gradually decreased toward the second portion 155b from the first thickness t1 to the second thickness t2. The third portion 155c may extend from the first portion 155a, and the second portion 155b may extend from the third portion 155c. The thickness of the first portion 155a may be uniformly maintained at the first thickness t1, and the thickness of the second portion 155b may be uniformly maintained at the second thickness t2. In various embodiments, the first thickness t1 of the first portion 155a may range from about 0.01 mm to about 0.2 mm, preferably from about 0.09 mm to about 0.15 mm. In various embodiments, the second thickness t2 of the second portion 155b may range from about 0.01 mm to about 0.1 mm, preferably from about 0.06 mm to about 0.09 mm. In an embodiment, the second thickness t2 of the second portion 155b may be changed depending on the radius of curvature of a curved surface formed by the rollable part 150b. For example, in a case in which the curved surface formed by the rollable part 150b has a small radius of curvature (or, a large curvature), the flexibility may be further secured by decreasing the second thickness t2.

In an embodiment, the first portion 155a and the third portion 155c may be included in the base part 150a of the display 150, and the second portion 155b may be included in the rollable part 150b (or, the rollable part 150b and the extending part 150c) of the display 150. For example, the boundary between the second portion 155b and the third portion 155c may be located on substantially the same line as the boundary between the base part 150a and the rollable part 150b. The first portion 155a and the third portion 155c may overlap the base part 150a when the base part 150a of the display 150 is viewed from above.

In an embodiment, the third portion 155c may face the first panel region 151a of the panel layer 151 with the reinforcement layer 153 therebetween. The third portion 155c may be disposed over the first panel region 151a. For example, the first panel region 151a of the panel layer 151 may overlap the first portion 155a, the third portion 155c, and part of the second portion 155b of the cover layer 155 when the base part 150a of the display 150 is viewed from above.

In an embodiment, opposite surfaces of the reinforcement layer 153 between the cover layer 155 and the panel layer 151 may be attached to the cover layer 155 and the panel layer 151. The reinforcement layer 153 may be formed in a shape corresponding to the thickness of the cover layer 155 to fill the space between the cover layer 155 and the panel layer 151. For example, the reinforcement layer 153 may include a first thickness compensating portion 153a corresponding to the first portion 155a, a second thickness compensating portion 153b corresponding to the second portion 155b, and a third thickness compensating portion 153c corresponding to the third portion 155c. The second thickness compensating portion 153b may be formed to be thicker than the first thickness compensating portion 153a. The third thickness compensating portion 153c between the first thickness compensating portion 153a and the second thickness compensating portion 153b may have a gradually increasing thickness toward the second thickness compensating portion 153b.

In an embodiment, the reinforcement layer 153, together with the cover layer 155, may form one layer having a uniform thickness. For example, the sum of the first thickness t1 of the first portion 155a of the cover layer 155 and the thickness of the first thickness compensating portion 153a of the reinforcement layer 153 may be substantially the same as the sum of the second thickness t2 of the second portion 155b of the cover layer 155 and the thickness of the second thickness compensating portion 153b of the reinforcement layer 153. The reinforcement layer 153 may compensate for the thickness difference of the cover layer 155, and thus an air layer (e.g., an air gap) may not be formed between the cover layer 155 and the panel layer 151 when the cover layer 155 is attached to the panel layer 151.

In an embodiment, the reinforcement layer 153 may compensate for a change in refractive index depending on the thickness difference of the cover layer 155. The reinforcement layer 153 may include a soft material to reinforce strength and elasticity when at least a portion of the rollable part 150b is deformed while being rolled by the first roller 191. The reinforcement layer 153 may be formed of a material more ductile than the cover layer 155. The reinforcement layer 153 may be implemented using a synthetic resin, and the synthetic resin may include acryl, epoxy, silicone, or urethane. For example, the reinforcement layer 153 may include an optical clear resin (OCR).

In an embodiment, in relation to the stacked structure of the plurality of layers of the display 150, an adhesive member (not illustrated) may be disposed between at least some of the plurality of layers. For example, the adhesive member may be disposed between the protective layer 157 and the cover layer 155 and between the reinforcement layer 153 and the panel layer 151. The adhesive member may include various types of adhesives and resins. For example, the adhesive member may include a pressure sensitive adhesive (PSA), an optical clear adhesive (OCA), or a photosensitive adhesive (e.g., a UV resin).

According to an embodiment, the cover layer 155 disposed in the base part 150a of the display 150 may be formed to be thicker than the relatively soft reinforcement layer 153, and thus the electronic device 100 may secure the strength of the display 150 in the first state. The second portion 155b of the cover layer 155 that corresponds to the rollable part 150b of the display 150 may be formed to be thin, and thus when the electronic device 100 is changed to the first state and the second state, the rollable part 150b may be flexibly deformed to be flat and curved, and a repulsive force may be reduced in the deformation of the rollable part 150b.

Figure 7A:
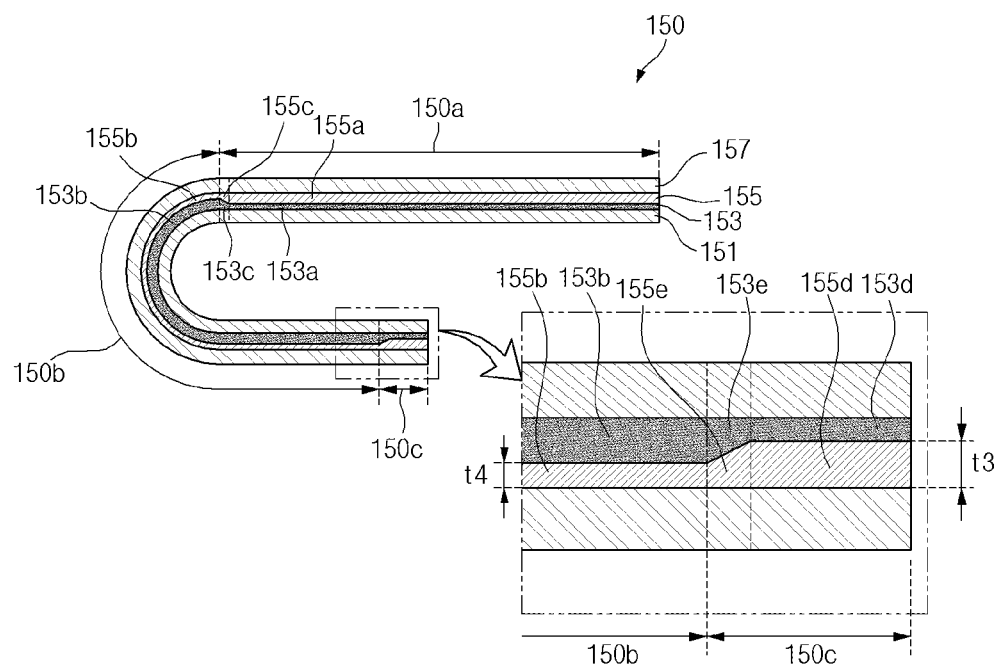
FIGS. 7A and 7B are partial cross-sectional views illustrating the display of the electronic device according to various embodiments.
Figure 7B:
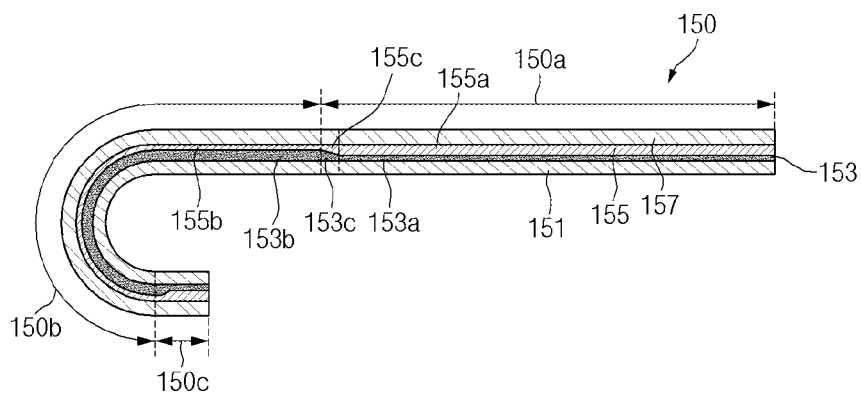

FIGS. 7A and 7B are partial cross-sectional views the display of the electronic device according to various embodiments.

FIG. 7A illustrates the form of the display when the electronic device is in the first state. FIG. 7B illustrates the form of the display when the electronic device is in the second state.

Referring to FIGS. 7A and 7B, the display 150 according to an embodiment may include the panel layer 151, the reinforcement layer 153, the cover layer 155, and the protective layer 157. Some of the components of the display 150 illustrated in FIG. 7 may be identical or similar to some of the components of the display 150 illustrated in FIG. 6.

FIG. 7 illustrates an embodiment in which when compared to the display 150 illustrated in FIG. 6, the display 150 further includes a fourth portion 155d and a fifth portion 155e extending from the second portion 155b of the cover layer 155 so as to be thick and thus the thickness of the cover layer 155 is increased again. Therefore, repetitive descriptions will hereinafter be omitted, and the following description will be focused on the difference.

In an embodiment, the cover layer 155 may include the first portion 155a, the second portion 155b having a smaller thickness t4 than the first portion 155a, the third portion 155c disposed between the first portion 155a and the second portion 155b, the fourth portion 155d having a greater thickness t3 than the second portion 155b, and the fifth portion 155e disposed between the second portion 155b and the fourth portion 155d. For example, the cover layer 155 may be formed in a form in which the third portion 155c extends from the first portion 155a, the second portion 155b extends from the third portion 155c, the fifth portion 155e extends from the second portion 155b, and the fourth portion 155d extends from the fifth portion 155e.

In an embodiment, the cover layer 155 may be formed in a form in which the relatively thin second portion 155b is disposed between the first portion 155a and the fourth portion 155d. Likewise to the third portion 155c, the fifth portion 155e may be a variable thickness portion between the second portion 155b and the fourth portion 155d. The fifth portion 155e may have a gradually increasing thickness from the second portion 155b toward the fourth portion 155d. The fourth portion 155d may have substantially the same thickness as the first portion 155a. For example, the thickness of the fourth portion 155d may be maintained at the first thickness (e.g., the first thickness t1 of FIG. 6). However, without being limited thereto, the fourth portion 155d may be formed to be thicker than the first portion 155a, or may be formed to be thinner than the first portion 155a and thicker than the second portion 155b.

In an embodiment, the first portion 155a and the third portion 155c may be included in the base part 150a of the display 150, the second portion 155b may be included in the rollable part 150b of the display 150, and the fourth portion 155d and the fifth portion 155e may be included in the extending part 150c of the display 150. For example, the boundary between the second portion 155b and the fifth portion 155e may be located on substantially the same line as the boundary between the rollable part 150b and the extending part 150c. The first portion 155a and the third portion 155c may overlap the extending part 150c when the extending part 150c of the display 150 is viewed from above.

In an embodiment, to correspond to the shape of the cover layer 155, the reinforcement layer 153 may be formed such that a region included in the extending part 150c is thinner than a region included in the rollable part 150b. The reinforcement layer 153 may further include a fourth thickness compensating portion 153d corresponding to the fourth portion 155d and a fifth thickness compensating portion 153e corresponding to the fifth portion 155e, in addition to the first thickness compensating portion 153a corresponding to the first portion 155a, the second thickness compensating portion 153b corresponding to the second portion 155b, and the third thickness compensating portion 153c corresponding to the third portion 155c.

In the display 150 according to an embodiment, the first portion 155a and the fourth portion 155d that are thicker than the second portion 155b may be disposed with the second portion 155b of the cover layer 155 therebetween. Accordingly, when the reinforcement layer 153 is formed through a process of filling the cover layer 155 with a resin, the filling of the cover layer 155 with the resin may be easily performed, and the resin may be easy to handle. Furthermore, the display 150 may be formed such that the first portion 155a and the fourth portion 155d, which are included (or, disposed) in the base part 150a and the extending part 150c that remain flat irrespective of a state of the electronic device (e.g., the electronic device 100 of FIGS. 1 to 4), are thicker than the second portion 155b included (or, disposed) in the rollable part 150b. Accordingly, when the state of the electronic device 100 is changed, the rigidities of the base part 150a and the extending part 150c that support opposite end portions of the rollable part 150b may be increased while the flexibility of the rollable part 150b is secured, and thus the strength of the display 150 may be secured.

Figure 8:
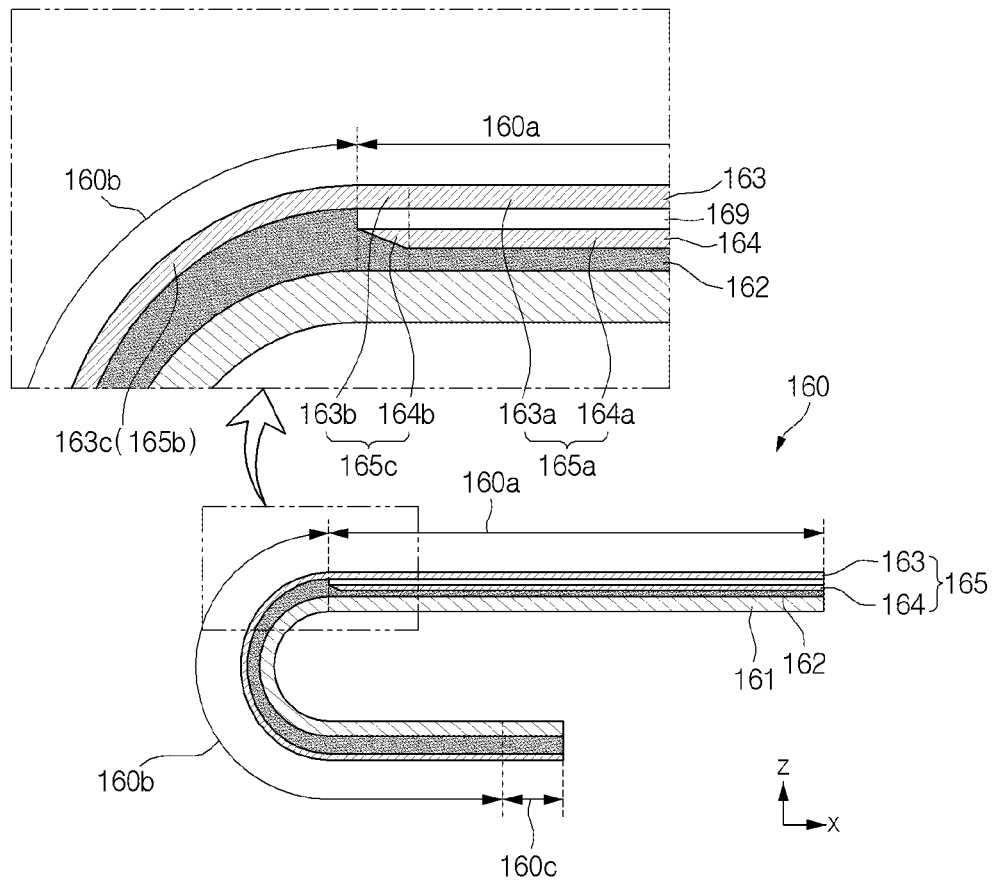
FIG. 8 is a partial cross-sectional view illustrating a display of an electronic device according to various embodiments.

FIG. 8 is a partial cross-sectional view illustrating a display of an electronic device according to various embodiments.

Referring to FIG. 8, the display 160 according to an embodiment may include a panel layer 161, a reinforcement layer 162, and a cover layer 165. Some of the components of the display 160 illustrated in FIG. 8 may be identical or similar to some of the components of the display illustrated in FIG. 6 (e.g., the display 150 of FIG. 6), and FIG. 8 may be a view in which a protective layer (e.g., the protective layer 157 of FIG. 6) is omitted.

FIG. 8 illustrates an embodiment in which the structure of the cover layer 165 is changed when compared to that of the display 160 illustrated in FIGS. 6A and 6B. Therefore, repetitive descriptions will hereinafter may not be repeated, and the following description will be focused on the differences.

According to the embodiment illustrated in FIG. 8, the display 160 may be configured such that the cover layer 165 at least partially has a structure in which a plurality of layers (e.g., a first layer 163 and a second layer 164) are stacked. The cover layer 165 may include the first layer 163 and the second layer 164 disposed on at least a portion of the first layer 163.

In an embodiment, the first layer 163 may be included in a base part 160a, a rollable part 160b, and an extending part 160c of the display 160. For example, the first layer 163 may extend over the base part 160a, the rollable part 160b, and the extending part 160c of the display 160. The first layer 163 may extend with a uniform thickness. Although not illustrated, a protective layer (e.g., the protective layer 157 of FIG. 6) may be disposed on one surface of the first layer 163. For example, one portion of the first layer 163 may be disposed between the protective layer 157 and the reinforcement layer 162, and the remaining portion of the first layer 163 may be disposed between the protective layer 157 and the second layer 164.

In an embodiment, the second layer 164 may be included in the base part 160a of the display 160. The second layer 164 may be stacked on a partial region of the first layer 163 so as to be disposed in the base part 160a. An adhesive member 169 may be disposed between the second layer 164 and the first layer 163. The second layer 164 may be attached to a region of the first layer 163 included in the base part 160a. For example, the second layer 164 may overlap the base part 160a of the display 160 and may not overlap the rollable part 160b. The second layer 164 may be formed to be thicker than the first layer 163. However, without being limited thereto, the second layer 164 may have substantially the same thickness as the first layer 164, or may be formed to be thinner than the first layer 163.

In an embodiment, the adhesive member 169 may attach the second layer 164 to the first layer 163. For example, the adhesive member 169 may include a pressure sensitive adhesive (PSA), an optical clear adhesive (OCA), or a photosensitive adhesive (e.g., a UV resin). According to various embodiments of the disclosure, the adhesive member 169 may be formed of a material substantially the same as that of the reinforcement layer 162. However, without being limited to the aforementioned examples, the adhesive member 169 may be implemented using various adhesives capable of attaching the first layer 163 and the second layer 164.

In an embodiment, the cover layer 165 may include a first portion 165a, a second portion 165b thinner than the first portion 165a, and a third portion 165c that is disposed between the first portion 165a and the second portion 165b and that has a variable thickness. The first portion 165a and the third portion 165c may be included in the base part 160a, and the second portion 165b may be included in the rollable part 160b. The first portion 165a and the third portion 165c of the cover layer 165 may be formed by a partial region of the first layer 163 (e.g., a third section 163a and a fourth section 163b) and the second layer 164. The second portion 165b of the cover layer 165 may be formed by the remaining partial region of the first layer 163 (e.g., a fifth section 163c).

In an embodiment, the second layer 164 may include a first section 164a having a uniform thickness and a second section 164b having a gradually decreasing thickness. The second section 164b may be formed in a chamfered and/or round shape. The first layer 163 may include the third section 163a overlapping the first section 164a, the fourth section 163b overlapping the second section 164b, and the fifth section 163c that is the remaining section other than the third section 163a and the fourth section 163b. The first portion 165a of the cover layer 165 may be formed by the first section 164a of the second layer 164 and the third section 163a of the first layer 163. The second portion 165b of the cover layer 165 may be formed by the fifth section 163c of the first layer 163. The third portion 165c of the cover layer 165 may be formed by the second section 164b of the second layer 164 and the fourth section 163b of the first layer 163.

According to an embodiment, the first portion 165a and the third portion 165c of the cover layer 165, which are included in the base part 160a of the display 160, may be implemented with the stacked structure of the first layer 163 and the second layer 164, and the second portion 165b may be implemented with a single layer of the first layer 163. Accordingly, the cover layer 165 may have different thicknesses to correspond to the base part 160a and the rollable part 160b of the display 160.

Figure 9:
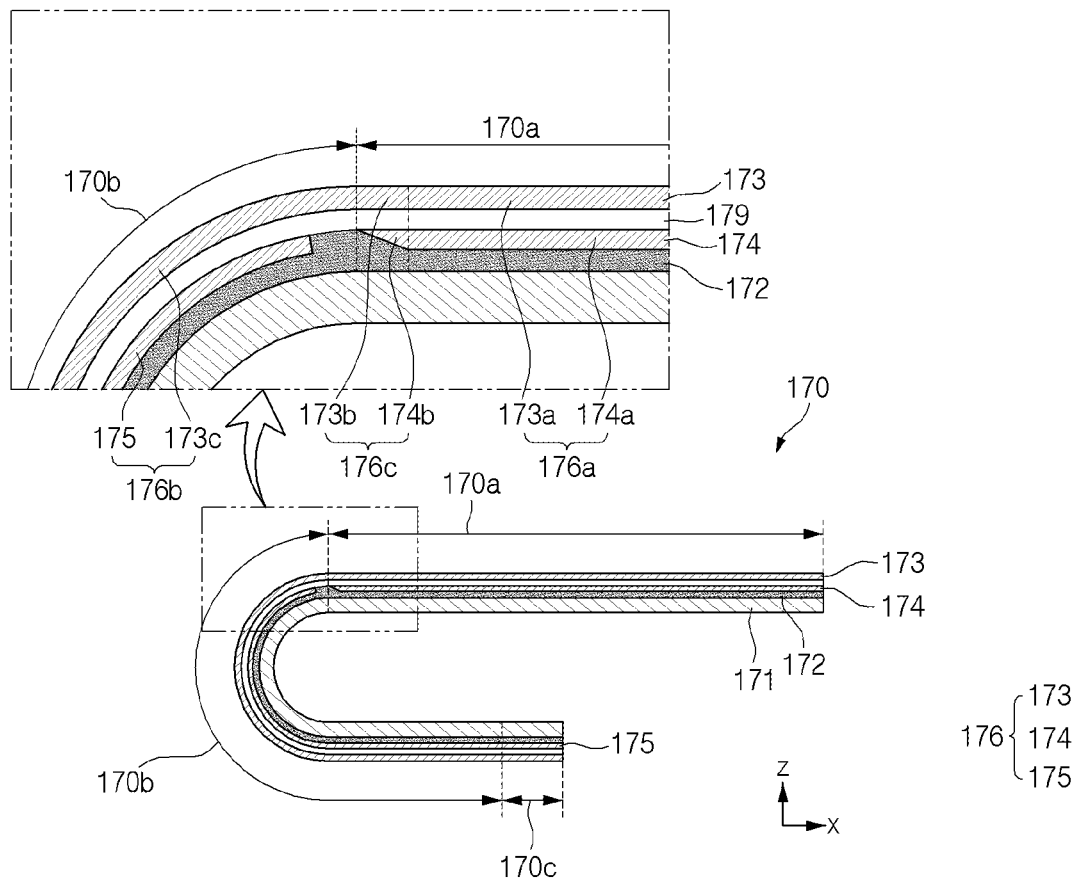
FIG. 9 is a partial cross-sectional view illustrating a display of an electronic device according to various embodiments.

FIG. 9 is a partial cross-sectional view illustrating a display of an electronic device according to various embodiments.

Referring to FIG. 9, the display 170 according to an embodiment may include a panel layer 171, a reinforcement layer 172, and a cover layer 176. Some of the components of the display 170 illustrated in FIG. 9 may be identical or similar to some of the components of the display illustrated in FIG. 6 (e.g., the display 150 of FIG. 6), and FIG. 9 may be a view in which a protective layer (e.g., the protective layer 157 of FIG. 6) is omitted.

FIG. 9 illustrates an embodiment in which the cover layer 176 (or, the cover layer 165 of FIG. 8) further includes a third layer 175 in the display illustrated in FIG. 8 (e.g., the display 160 of FIG. 8). Therefore, repetitive descriptions will hereinafter be omitted, and the following description will be focused on the difference.

According to the embodiment illustrated in FIG. 9, the display 170 may be configured such that the cover layer 176 at least partially has a structure in which a plurality of layers (e.g., a first layer 173, a second layer 174, and the third layer 175) are stacked. The cover layer 176 may include the first layer 173, the second layer 174 disposed on one portion of the first layer 173, and the third layer 175 disposed on another portion of the first layer 173.

In an embodiment, the first layer 173 may extend over a base part 170a, a rollable part 170b, and an extending part 170c of the display 170 so as to have a uniform thickness. The second layer 174 may be stacked on a partial region of the first layer 173 so as to be disposed in the base part 170a of the display 170. The third layer 175 may be stacked on the remaining partial region of the first layer 173 so as to be disposed in the rollable part 170b of the display 170. An adhesive member 179 may be disposed between the first layer 173 and the second layer 174 and between the first layer 173 and the third layer 175.

In an embodiment, the third layer 175 may be included in the rollable part 170b of the display 170. The third layer 175 may be attached to a region of the first layer 173 included in the rollable part 170b. For example, the third layer 175 may overlap the rollable part 170b of the display 170 and may not overlap the base part 170a. The third layer 175 may extend with a uniform thickness. The third layer 175 may be formed to be thinner than the second layer 174, or may be formed of a material having a lower rigidity than that of the second layer 174. According to the illustrated embodiment, the second layer 174 and the third layer 175 may be formed as separate parts, and end portions thereof may be spaced apart from each other. However, the disclosure is not limited to the illustrated embodiment, and according to various embodiments of the disclosure, the second layer 174 and the third layer 175 may be integrally formed with each other and may be implemented as one part.

In an embodiment, a first portion 176a of the cover layer 176 may be formed by a first section 174a of the second layer 174 and a third section 173a of the first layer 173. A second portion 176b of the cover layer 176 may be formed by a fifth section 173c of the first layer 173 and the third layer 175. A third portion 176c of the cover layer 176 may be formed by a second section 174b of the second layer 174 and a fourth section 173b of the first layer 173. As the third layer 175 is formed to be thinner than the second layer 174, the first portion 176a of the cover layer 176 of the cover layer 176 may be formed to be thicker than the second portion 176b.

According to an embodiment, the first portion 176a and the third portion 176c of the cover layer 176, which are included in the base part 170a of the display 170, may be implemented with the stacked structure of the first layer 173 and the second layer 174, and the second portion 176b may be implemented with the stacked structure of the first layer 173 and the third layer 175. Accordingly, the cover layer 176 may have different thicknesses to correspond to the respective parts of the display 170.

According to various embodiments of the disclosure, the third layer 175 may have the same thickness as the second layer 174 and may be formed of a material having a lower rigidity than that of the second layer 174. In this case, the second portion 176b of the cover layer 176 may have the same thickness as the first portion 176, but may have a lower rigidity than the first portion 176a. Accordingly, when the rollable part 170b of the display 170 is deformed, flexibility may be secured, and a repulsive force may be reduced.

Figure 10:
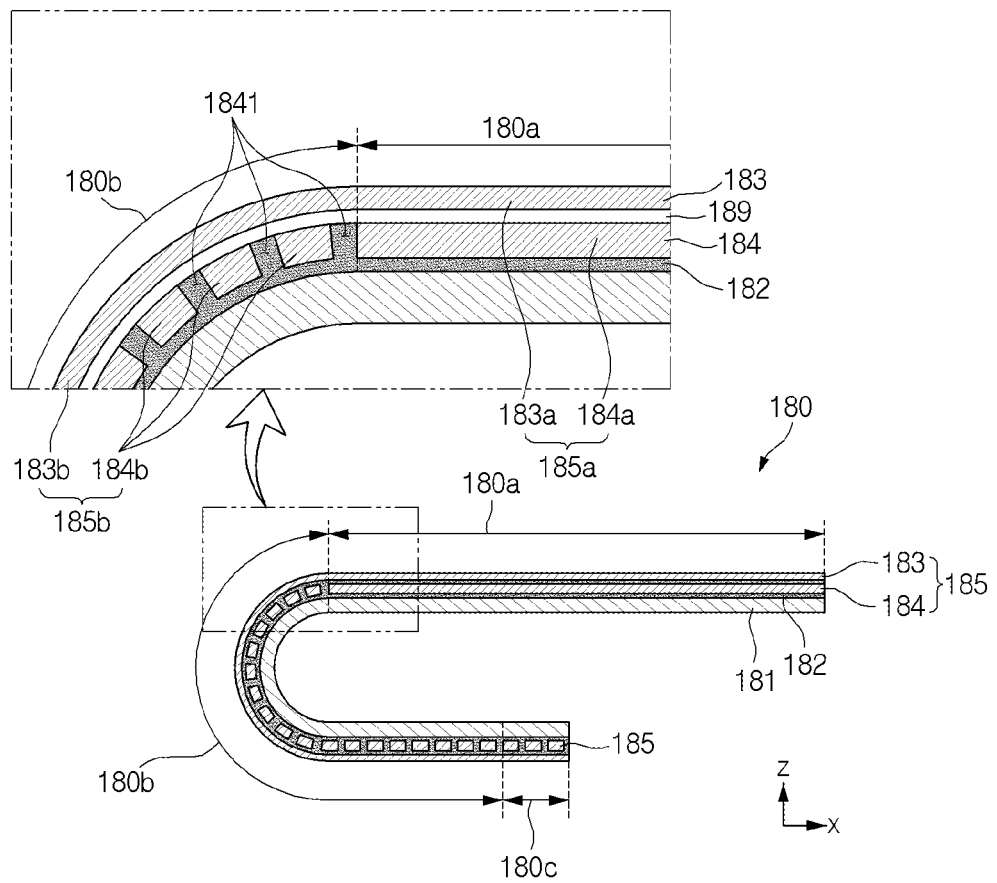
FIG. 10 is a partial cross-sectional view illustrating a display of an electronic device according to various embodiments.

FIG. 10 is a partial cross-sectional view illustrating a display of an electronic device according to various embodiments.

Referring to FIG. 10, the display 180 according to an embodiment may include a panel layer 181, a reinforcement layer 182, and a cover layer 185. Some of the components of the display 180 illustrated in FIG. 10 may be identical or similar to some of the components of the display illustrated in FIG. 6 (e.g., the display 150 of FIG. 6), and FIG. 10 may be a view in which a protective layer (e.g., the protective layer 157 of FIG. 6) is omitted.

FIG. 10 illustrates an embodiment in which the structure of the cover layer 185 is changed when compared to that of the display illustrated in FIG. 6 (e.g., the display 150 of FIG. 6). Therefore, repetitive descriptions will hereinafter may not be repeated, and the following description will be focused on the differences.

According to the embodiment illustrated in FIG. 10, the display 180 may be configured such that the cover layer 185 has a structure in which a plurality of layers (e.g., a first layer 183 and a second layer 184) are stacked and a plurality of through-holes 1841 are formed in at least one of the plurality of layers.

In the displays described above with reference to FIGS. 6 to 9 (e.g., the display 150 of FIGS. 6 and 7, the display 160 of FIG. 8, or the display 170 of FIG. 9), the cover layer 185 has different thicknesses to secure the flexibility of the rollable part, whereas the cover layer 185 of the display 180 according to the embodiment of FIG. 10 may have different rigidities (or, densities) through the holes formed in the cover layer 185, and thus the flexibility of a rollable part 180b may be secured.

In an embodiment, the cover layer 185 may include the first layer 183 and the second layer 184 that has the plurality of through-holes 1841 formed in at least a portion thereof and that is stacked on the first layer 183. An adhesive member 189 may be disposed between the first layer 183 and the second layer 184. The second layer 184 may be formed to be thicker than the first layer 183. However, without being limited thereto, the second layer 184 may have substantially the same thickness as the first layer 183, or may be formed to be thinner than the first layer 183.

In an embodiment, the second layer 184 may include a first section 184a and a second section 184b extending from the first section 184a and having the plurality of through-holes 1841 formed therein. As the second section 184b has the plurality of through-holes 1841 formed therein, the second section 184b may have a lower rigidity (or, density) than the first section 184a. The reinforcement layer 182 may be disposed in the plurality of through-holes 1841. For example, the reinforcement layer 182 may be disposed between the panel layer 181 and the second layer 184 and may be at least partially located in the plurality of through-holes 1841. The reinforcement layer 182 may fill the plurality of through-holes 1841 to compensate for a refractive index difference caused by the formation of the plurality of through-holes 1841. Accordingly, the visibility of the display 180 may be improved.

In an embodiment, the plurality of through-holes 1841 may be formed in the second section 184b to have different sizes and/or shapes. For example, among the plurality of through-holes 1841, through-holes 1841 located adjacent to the first section 184a may be formed to be larger than through-holes 1841 located relatively far away from the first section 184a. In another example, among the plurality of through-holes 1841, the through-holes 1841 located adjacent to the first section 184a may be formed to be smaller than the through-holes 1841 located relatively far away from the first section 184a. According to various embodiments of the disclosure, in a section of the second layer 184 where flexibility is relatively required, the through-holes 1841 may be formed to be large, and in a section of the second layer 184 where rigidity is relatively required, the through-holes 1841 may be formed to be small.

According to the illustrated embodiment, the rigidity (or, density) of the cover layer 185 may be changed by forming the plurality of through-holes 1841 in a partial region of the second layer 184. However, the disclosure is not limited to the illustrated embodiment, and according to various embodiments of the disclosure, the rigidity (or, density) of the cover layer 185 may be changed by forming a plurality of recesses (not illustrated) instead of the plurality of through-holes 1841 on a partial region of the second layer 184.

In an embodiment, the first section 184a of the second layer 184 may be disposed in a base part 180a of the display 180, and the second section 184b may be disposed in the rollable part 180b of the display 180. The first layer 183 may include a third section 183a overlapping the first section 184a and a fourth section 183b overlapping the second section 184b. For example, a first portion 185a of the cover layer 185 may be formed by the first section 184a of the second layer 184 and the third section 183a of the first layer 183. A second portion 185b of the cover layer 185 may be formed by the second section 184b of the second layer 184 and the fourth section 183b of the first layer 183.

According to an embodiment, since the plurality of through-holes 1841 are formed in the second portion 185b of the cover layer 185 included in the rollable part 180b of the display 180, the second portion 185b may have a lower rigidity than the first portion 185a of the cover layer 185 included in the base part 180a of the display 180. Accordingly, when the rollable part 180b of the display 180 is deformed, flexibility may be secured, and a repulsive force may be reduced.

Figure 11A:
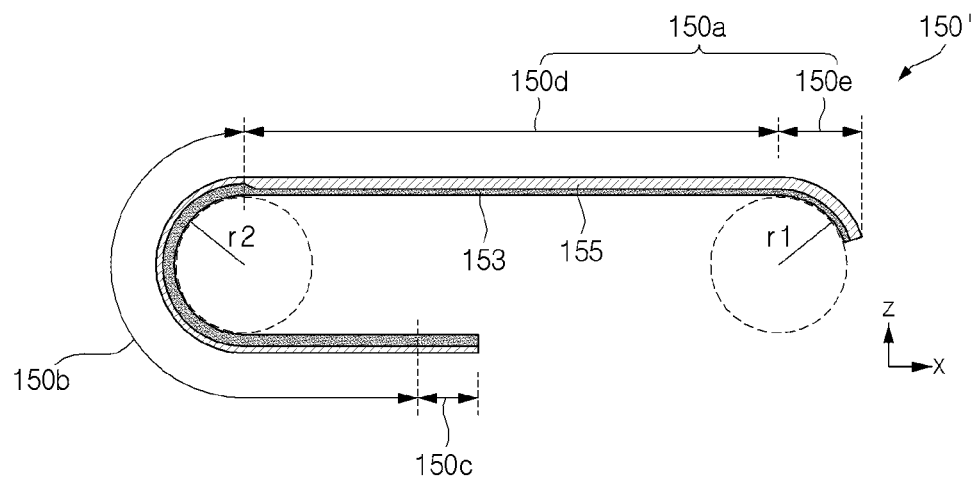
FIGS. 11A, 11B and 11C are cross-sectional views illustrating displays of electronic devices according various embodiments.
Figure 11B:
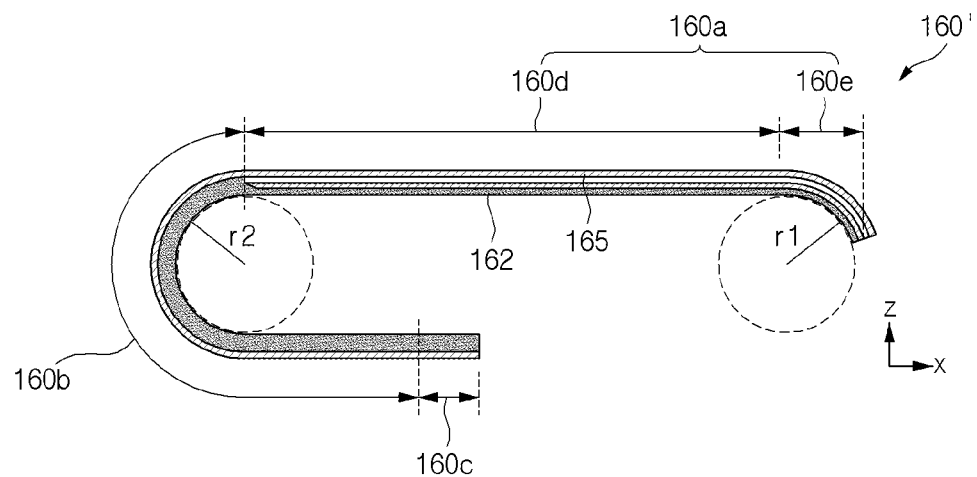
Figure 11C:
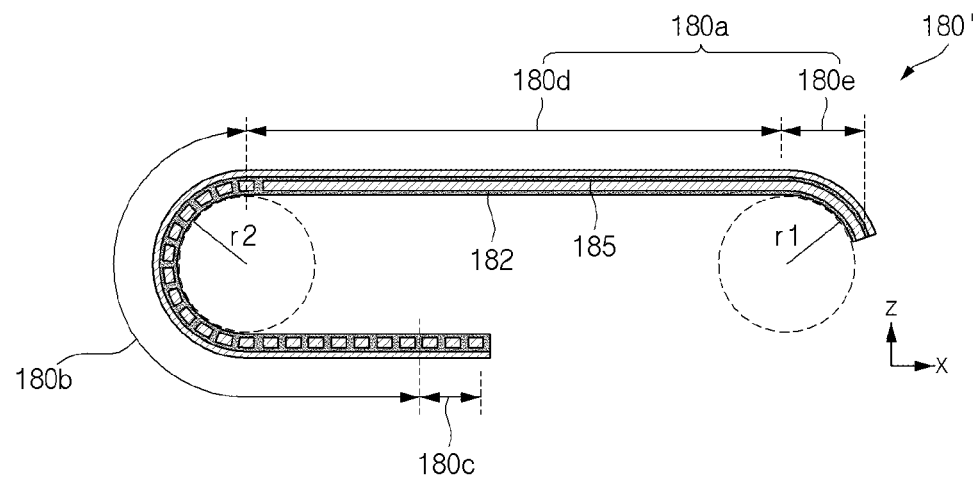

FIGS. 11A, 11B and 11C are cross-sectional views illustrating displays of electronic devices according to various embodiments.

Referring to FIGS. 11A, 11B and 11C, the displays 150', 160', and 180' according to embodiments may include cover layers 155, 165, and 185 and reinforcement layers 153, 162, and 182. Some of the components of the displays 150', 160', and 180' illustrated in FIGS. 11A, 11B and 11C may be identical or similar to some of the components of the displays illustrated in FIGS. 6 to 10 (e.g., the displays 150, 160, 170, and 180 of FIGS. 6 to 10), and therefore repetitive descriptions will hereinafter may not be repeated.

According to the embodiments illustrated in FIGS. 11A, 11B and 11C, the displays 150', 160', and 180' may include base parts 150a, 160a, and 180a, rollable parts 150b, 160b, and 180b extending from the base parts 150a, 160a, and 180a, and extending parts 150c, 160c, and 180c extending from the rollable parts 150b, 160b, and 180b. The forms of the base parts 150a, 160a, and 180a may be maintained and/or fixed irrespective of states (e.g., the first state and the second state) of the electronic devices (e.g., the electronic device 100 of FIGS. 1 to 4).

In an embodiment, the base parts 150a, 160a, and 180a of the displays 150', 160', and 180' may be formed such that end portions have a curved shape. The base parts 150a, 160a, and 180a may include flat portions 150d, 160d, and 180d and bending portions 150e, 160e, and 180e extending from the flat portions 150*d*, 160*d*, and 180*d*. The bending portions 150*e*, 160*e*, and 180*e* may curvedly extend from first ends of the flat portions 150*d*, 160*d*, and 180*d*. For example, the bending portions 150*e*, 160*e*, and 180*e* may extend from the first ends of the flat portions 150*d*, 160*d*, and 180*d*, and the rollable parts 150*b*, 160*b*, and 180*b* may extend from second ends of the flat portions 150*d*, 160*d*, and 180*d*.

In an embodiment, the bending portions 150*e*, 160*e*, and 180*e* may be formed to correspond to various embodiments of the displays 150', 160', and 180'. For example, FIG. 11A illustrates an embodiment in which in the display illustrated in FIG. 6 (e.g., the display 150 of FIG. 6), the base part 150*a* includes the bending portion 150*e*. FIG. 11B illustrates an embodiment in which in the display illustrated in FIG. 8 (e.g., the display 160 of FIG. 8), the base part 160*a* includes the bending portion 160*e*. FIG. 11 (*c*) illustrates an embodiment in which in the display illustrated in FIG. 10 (e.g., the display 180 of FIG. 10), the base part 180*a* includes the bending portion 1*e*0*e*. Although not illustrated, the shapes of the base parts 150*a*, 160*a*, and 180*a* illustrated in FIGS. 11A, 11B and 11C may be identically applied to the display illustrated in FIG. 9 (e.g., the display 170 of FIG. 9).

In an embodiment, as the base parts 150*a*, 160*a*, and 180*a* of the displays 150', 160', and 180' include the bending portions 150*e*, 160*e*, and 180*e*, the plurality of layers included in the displays 150', 160', and 180' may be formed in a shape in which end portions are curved to correspond to the bending portions 150*e*, 160*e*, and 180*e*. For example, the reinforcement layers 153, 162, and 182 and the cover layers 155, 165, and 185 may be formed in a shape in which end portions are curved to correspond to the bending portions 150*e*, 160*e*, and 180*e*. Furthermore, although not illustrated, protective layers and panel layers may be formed in a shape in which end portions are curved to correspond to the bending portions 150*e*, 160*e*, and 180*e*.

In an embodiment, the bending portions 150*e*, 160*e*, and 180*e* may be curved with a predetermined curvature from the flat portions 150*d*, 160*d*, and 180*d*. For example, the bending portions 150*e*, 160*e*, and 180*e* may have a first radius of curvature r1. The rollable parts 150*b*, 160*b*, and 180*b* may extend from the flat portions 150*d*, 160*d*, and 180*d* to have a second radius of curvature r2. The first radius of curvature r1 may be substantially the same as the second radius of curvature r2. Accordingly, end portions of the base parts 150*a*, 160*a*, and 180*a* may be bent with a curvature substantially the same as the curvature of the rollable parts 150*b*, 160*b*, and 180*b* extending from the base parts 150*a*, 160*a*, and 180*a*, and thus the finish and completeness of the electronic devices may be improved. Furthermore, in a case in which screens are displayed (or, output) on the base parts 150*a*, 160*a*, and 180*a* and portions of the rollable parts 150*b*, 160*b*, and 180*b*, the portions of the rollable parts 150*b*, 160*b*, and 180*b* may be symmetrical to the bending portions 150*e*, 160*e*, and 180*e* with respect to the flat portions 150*d*, 160*d*, and 180*d* when users view the displays 150', 160', and 180' from above.

According to the illustrated embodiments, the bending portions 150*e*, 160*e*, and 180*e* may be curved to have substantially the same radius of curvature as the rollable parts 150*b*, 160*b*, and 180*b*, but are not limited thereto. According to various embodiments of the disclosure, the first radius of curvature r1 of the bending portions 150*e*, 160*e*, and 180*e* may be larger or smaller than the second radius of curvature r2 of the rollable parts 150*b*, 160*b*, and 180*b*.

Figure 12A:
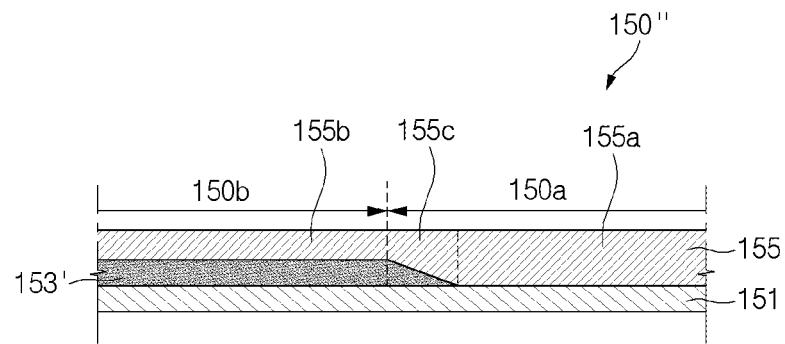
FIGS. 12A, 12B and 12C are cross-sectional views illustrating portions of displays according to various embodiments.
Figure 12B:
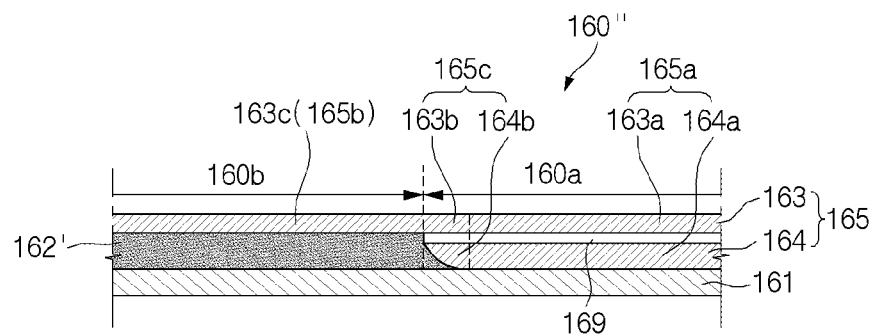
Figure 12C:
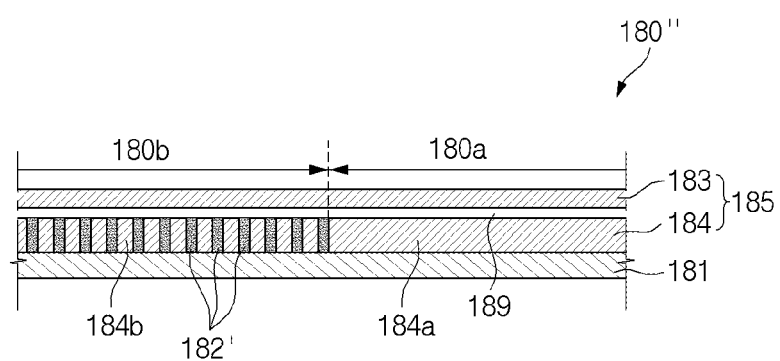

FIGS. 12A, 12B and 12C are cross-sectional views illustrating portions of displays according to various embodiments.

Referring to FIGS. 12A, 12B and 12C, the displays 150", 160", and 180" according to embodiments may include panel layers 151, 161, and 181, reinforcement layers 153', 162', and 182', and cover layers 155, 165, and 185. Some of the components of the displays 150", 160", and 180" illustrated in FIGS. 12A, 12B and 12C may be identical or similar to some of the components of the displays illustrated in FIGS. 6 to 10 (e.g., the displays 150, 160, 170, and 180 of FIGS. 6 to 10).

FIGS. 12A, 12B and 12C illustrate various embodiments in which the structures of the reinforcement layers 153', 162', and 182' are changed when compared to those of the displays illustrated in FIGS. 6 to 10 (e.g., the displays 150, 160, 170, and 180 of FIGS. 6 to 10). Therefore, repetitive descriptions may not be repeated, and the following description will be focused on the differences.

According to the embodiment illustrated in FIG. 12A, the reinforcement layer 153' may be disposed between a portion of the cover layer 155 and the panel layer 151.

In an embodiment, the reinforcement layer 153' may be disposed on a second portion 155*b* and a third portion 155*c* of the cover layer 155. For example, the reinforcement layer 153' may be disposed between the second portion 155*b* of the cover layer 155 and the panel layer 151 and between the third portion 155*c* of the cover layer 155 and the panel layer 151. The reinforcement layer 153' may not be disposed between a first portion 155*a* of the cover layer 155 and the panel layer 151.

In an embodiment, the reinforcement layer 153' may be disposed on the second portion 155*b* and the third portion 155*c* of the cover layer 155 and may compensate for a difference in thickness between the first portion 155*a* and the second portion 155*b* and a difference in thickness between the first portion 155*a* and the third portion 155*c*. For example, in a state in which the first portion 155*a* of the cover layer 155 is disposed on the panel layer 151, the reinforcement layer 153' may be disposed between the second portion 155*b* and the panel layer 151 and between the third portion 155*c* and the panel layer 151 such that a separation space (e.g., an air layer) is not formed between the panel layer 151 and the remaining regions of the cover layer 155 other than the first portion 155*a*.

According to the embodiment illustrated in FIG. 12B, the cover layer 165 may include a first layer 163 and a second layer 164. The reinforcement layer 162' may be disposed between a portion of the first layer 163 and the panel layer 161 and between a portion of the second layer 164 and the panel layer 161.

In an embodiment, the reinforcement layer 162' may be disposed on a second portion 165*b* and a third portion 165*c* of the cover layer 165. A portion of the reinforcement layer 162' may be disposed between a second section 164*b* of the second layer 164 and the panel layer 161. The remaining portion of the reinforcement layer 162' may be disposed between a fifth section 163*c* of the first layer 163 and the panel layer 161. For example, the reinforcement layer 162' may not be disposed between a first section 164*a* of the second layer 164 and the panel layer 161.

The reinforcement layers (e.g., the reinforcement layers 155 and 165 of FIGS. 6 and 8) of the displays illustrated in FIGS. 6 and 8 (e.g., the display 150 of FIG. 6 and the display 160 of FIG. 8) extend between the first portions (e.g., the first portions 155*a* and 165*a* of FIGS. 6 and 8) and the panel layers (e.g., the panel layers 151 and 161 of FIGS. 6 and 8), whereas in the displays 150" and 160" illustrated in FIGS. 12A and 12B, the reinforcement layers 153' and 162' may not be disposed between the first portions 155a and 165a and the panel layers 151 and 161, and the first portions 155a and 165a may be directly attached to the panel layers 151 and 161. Accordingly, the overall thicknesses of the displays 150" and 160" may be relatively reduced.

According to the embodiment illustrated in FIG. 12C, the cover layer 185 may include a first layer 183 and a second layer 184. The reinforcement layer 182' may be disposed between at least a portion of the first layer 183 and the panel layer 181.

In an embodiment, the reinforcement layer 182' may be disposed in a plurality of through-holes (e.g., the plurality of through-holes 1841 of FIG. 10) (or, a plurality of recesses) formed in the second layer 184. As the reinforcement layer 182' is disposed in the plurality of through-holes 1841, the reinforcement layer 182' may be at least partially disposed between the first layer 183 (or, an adhesive member 189) and the panel layer 181. For example, the reinforcement layer 182' may not be disposed between the second layer 184 and the panel layer 181.

The reinforcement layer (e.g., the reinforcement layer 182 of FIG. 10) of the display illustrated in FIG. 10 (e.g., the display 180 of FIG. 10) has one portion disposed in the plurality of through-holes (e.g., the plurality of through-holes 1841 of FIG. 10) and another portion disposed between the second layer 184 and the panel layer 181, whereas in the display 180" illustrated in FIG. 12 (c), the reinforcement layer 182' may be disposed only in the plurality of through-holes 1841, and a first section 184a and a second section 184b of the second layer 184 may be directly attached to the panel layer 181. Accordingly, the overall thickness of the display 180" may be relatively reduced.

Figures 13A, 13B:
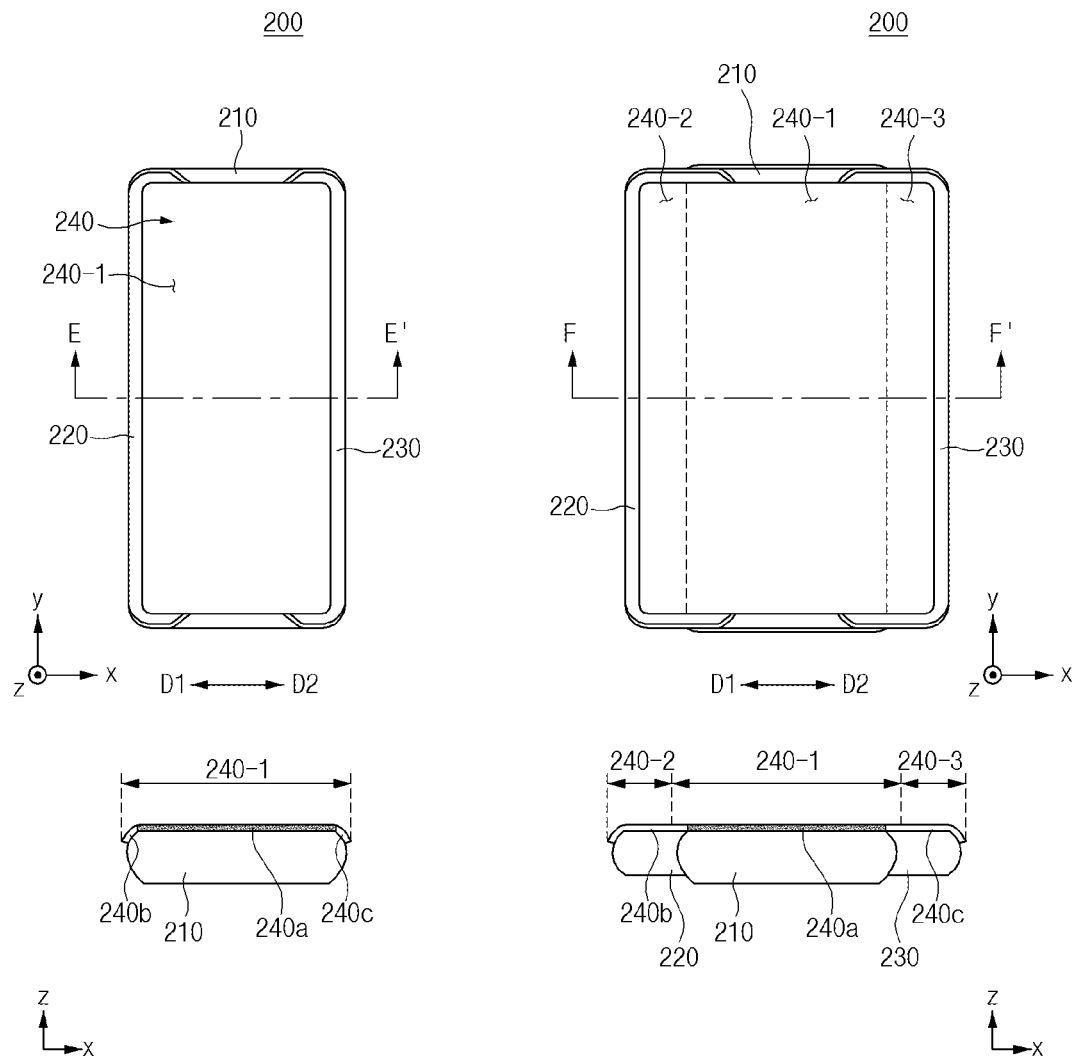
FIGS. 13A and 13B are diagrams a first state and a second state of an electronic device according to various embodiments.

FIGS. 13A and 13B are diagrams illustrating a first state and a second state of an electronic device according to various embodiments.

FIG. 13A illustrates the first state of the electronic device, and FIG. 13B illustrates the second state of the electronic device.

Referring to FIGS. 13A and 13B, the electronic device 200 according to an embodiment may include a first structure (e.g., first housing) 210 (e.g., the first structure 110 of FIGS. 1 to 4), a second structure (e.g., second housing) 220 (e.g., the second structure 140 of FIGS. 1 to 4), a third structure (e.g., third housing) 230, and a display 240 (e.g., the display 150 of FIGS. 1 to 4). Some of the components of the electronic device 200 illustrated in FIG. 13 may be identical or similar to some of the components of the electronic device illustrated in FIGS. 1 to 4 (e.g., the electronic device 100 of FIGS. 1 to 4).

In an embodiment, the electronic device 200 may include the first state (e.g., a closed state or a reduced mode) and the second state (e.g., an open state or an extended mode). The first state and the second state may be determined depending on the positions of the second structure 220 and the third structure 230 relative to the first structure 210.

In an embodiment, the first state may refer to a state in which the area (or, size) of the display 240 exposed (e.g., visible) on a front surface of the electronic device 200 is relatively reduced. The second state may refer to a state in which the area (or, size) of the display 240 exposed (e.g., visible) on the front surface of the electronic device 200 is relatively extended. Furthermore, the first state may be a closed state in which a portion of the second structure 220 (e.g., a lateral portion facing in the y-axis direction) and a portion of the third structure 230 (e.g., a lateral portion facing in the y-axis direction) are located inside the first structure 210 or located to overlap portions of the first structure 210 so that the second structure 220 and the third structure 230 are closed to the first structure 210. The second state may be an open state in which the portion of the second structure 220 and the portion of the third structure 230 move out of the first structure 210 so that the second structure 220 and the third structure 230 are open to the first structure 210.

In an embodiment, the second structure 220 and the third structure 230 may slide relative to the first structure 210. For example, the first structure 210 may be a fixed structure, and the second structure 220 and the third structure 230 may be structures movable relative to the second structure 220. The second structure 220 and the third structure 230 may be slidably coupled to opposite sides of the first structure 210. The second structure 220 may be coupled to one side of the first structure 210 (e.g., the −x-axis direction) so as to slide relative to the first structure 210 in opposite directions (e.g., the +x/−x-axis directions). The third structure 230 may be coupled to an opposite side of the first structure 210 (e.g., the +x-axis direction) so as to slide relative to the first structure 210 in opposite directions (e.g., the +x/−x-axis directions). For example, the second structure 220 and the third structure 230 may be disposed to face each other with the first structure 210 therebetween.

In an embodiment, the second structure 220 and the third structure 230 may be configured to independently slide relative to the first structure 210 or slide relative to the first structure 210 while interlocking with each other. In the case in which the second structure 220 and the third structure 230 slide independently of each other, only the third structure 230 may move relative to the first structure 210 without movement of the second structure 220, or only the second structure 220 may move relative to the first structure 210 without movement of the third structure 230. In the case in which the second structure 220 and the third structure 230 slide while interlocking with each other, when one of the second structure 220 and the third structure 230 moves relative to the first structure 210, the other one of the second structure 220 and the third structure 230 may move together (or, at the same time). For example, when the second structure 220 moves in a first direction D1 relative to the first structure 210, the third structure 230 may move in a second direction D2 relative to the second structure 220. In contrast, when the second structure 220 moves in the second direction D2 relative to the first structure 210, the third structure 230 may move in the first direction D1 relative to the first structure 210. In the case in which the second structure 220 and the third structure 230 interlock with each other, the electronic device 200 may include an interlocking structure (not illustrated) for interlocking the first structure 210, the second structure 220, and the third structure 230.

In an embodiment, the electronic device 200 may be changed to the first state and the second state as the second structure 220 and the third structure 230 slide relative to the first structure 210. For example, the first state may be a state in which the area of the display 240 exposed on the front surface of the electronic device 200 is reduced to a minimum. The second state may be a state in which the area of the display 240 exposed (e.g., visible) on the front surface of the electronic device 200 is extended to a maximum. The electronic device 200 may further include an intermediate state between the first state and the second state. For example, the intermediate state may be understood as any state before the electronic device 200 is completely changed from the first state to the second state or from the second state to the first state. In the intermediate state, the area of the display 240 exposed on the front surface of the electronic device 200 may be greater than the exposed area in the first state and may be smaller than the exposed (e.g., visible) area in the second state.

In an embodiment, the electronic device 200 may be changed from the first state (e.g., the state of FIG. 13A) to the second state (e.g., the state of FIG. 13B) as the second structure 220 moves in the first direction D1 relative to the first structure 210 and the second structure 220 moves in the second direction D2 relative to the first structure 210. In contrast, the electronic device 200 may be changed from the second state to the first state as the second structure 220 moves in the second direction D2 relative to the first structure 210 and the third structure 230 moves in the first direction D1 relative to the first structure 210.

In an embodiment, the size (or, area) of a region of the display 240 exposed on the front surface of the electronic device 200 may be changed in response to a sliding operation of the second structure 220 and the third structure 230. The exposed (e.g., visible) region of the display 240 may be extended or reduced depending on the sliding operation of the second structure 220 and the third structure 230 in a state in which the display 240 is supported by at least one of the first structure 210, the second structure 220, or the third structure 230.

In an embodiment, the display 240 may include a default region 240-1 and extended regions 240-2 and 240-3 extending from the default region 240-1. The default region 240-1 may remain exposed on the front surface of the electronic device 200. The areas of the extended regions 240-2 and 240-3 exposed on the front surface of the electronic device 200 may vary depending on the states of the electronic device 200. For example, the default region 240-1 may refer to a partial region of the display 240 visually exposed on the front surface of the electronic device 200 in the first state. The extended regions 240-2 and 240-3 may refer to regions that are located inside the electronic device 200 in the first state and that at least partially move out of the electronic device 200 in the second state and are visually exposed on the front surface of the electronic device 200.

In an embodiment, the extended regions 240-2 and 240-3 may be disposed on opposite sides of the default region 240-1. The extended regions 240-2 and 240-3 may include the first extended region 240-2 and the third extended region 240-3 facing each other with the default region 240-1 therebetween. For example, the first extended region 240-2 may extend from one side (e.g., an edge facing in the −x-axis direction) of the default region 240-1, and the second extended region 240-3 may extend from an opposite side (e.g., an edge facing in the +x-axis direction) of the default region 240-1. In the second state, the first extended region 240-2 may be supported by at least a portion of the second structure 220, and the second extended region 240-3 may be supported by at least a portion of the third structure 230.

According to the illustrated embodiment, the extended regions 240-2 and 240-3 may be paired to face each other with the default region 240-1 therebetween. However, this is illustrative, and the number and/or positions of extended regions 240-2 and 240-3 are not limited to the illustrated embodiment. According to various embodiments of the disclosure, the extended regions 240-2 and 240-3 may be disposed on only the one side of the default region 240-1.

In an embodiment, the first state may be a state in which the default region 240-1 forms the front surface of the electronic device 200 and the extended regions 240-2 and 240-3 are located inside the electronic device 200, and the second state may be a state in which at least portions of the extended regions 240-2 and 240-3 form the front surface of the electronic device 200 together with the default regions 240-1. The exposed area of the display 240 of the electronic device 200 may be extended as the extended regions 240-2 and 240-3 are additionally exposed (e.g., visible) on the front surface of the electronic device 200 in the second state. In the second state, the electronic device 200 may display a screen on the default region 240-1 and the portions of the extended regions 240-2 and 240-3 and thus may provide a screen display region that is extended when compared to that in the first state.

In an embodiment, the display 240 may include a base part 240a that remains flat irrespective of a state of the electronic device 200 and rollable parts 240b and 240c that extend from opposite sides of the base part 240a and that are deformed to be curved or flat depending on the state of the electronic device 200. The rollable parts 240b and 240c may include the first rollable part 240b extending from the base part 240a in the first direction D1 and the second rollable part 240c extending from the base part 240a in the second direction D2. A detailed configuration of the display 240 will be described below in greater detail below with reference to FIGS. 14A and 14B.

According to the illustrated embodiment, the default region 240-1 may be formed by the base part 240a and portions of the rollable parts 240b and 240c, and the extended regions 240-2 and 240-3 may be formed by the remaining portions of the rollable parts 240b and 240c that are not included in the default region 240-1. For example, the default region 240-1 may have a larger area than the base part 240a when the display 240 is viewed from above. However, the disclosure is not limited to the illustrated embodiment, and according to various embodiments of the disclosure, the default region 240-1 may have substantially the same area as the base part 240a. For example, in the first state, the base part 240a of the display 240 may be exposed (e.g., visible) on the front surface of the electronic device 200, and the rollable parts 240b and 240c may be located inside the electronic device 200. Accordingly, the default region 240-1 may be formed by the base part 240a.

FIGS. 14A and 14B are cross-sectional views illustrating the display of the electronic device according to various embodiments.

FIG. 14A illustrates the form of the display when the electronic device is in the first state, and FIG. 14B illustrates the form of the display when the electronic device is in the second state. FIG. 14A illustrates a sectional view of the display taken along line E-E' in FIG. 13A, and FIG. 14B illustrates a sectional view of the display taken along line F-F' in FIG. 13B.

Referring to FIGS. 14A and 14B, the display 240 of the electronic device according to an embodiment (e.g., the electronic device 200 of FIG. 13) may include the base part 240a and the rollable parts 240b and 240c extending from the base part 240a. The base part 240a may form the front surface of the electronic device 200, and the form of the base part 240a may be maintained and/or fixed irrespective of a state of the electronic device 200. The rollable parts 240b and 240c may flexibly extend from the base part 240a to have shape variability and may be deformed depending on a change of state of the electronic device 200.

In an embodiment, the base part 240a may be formed to be substantially flat. The rollable parts 240b and 240c may be partially deformed to be curved or flat in response to a state of the electronic device 200. For example, the base part 240a may remain flat in the first state (e.g., the state of FIG.

13A) and the second state (e.g., the state of FIG. 13B). In the first state, portions of the rollable parts 240b and 240c adjacent to the base part 240a may be curved, and the remaining portions of the rollable parts 240b and 240c may be flat while facing the base part 240a. In the second state, portions of the rollable parts 240b and 240c adjacent to the base part 240a may be disposed side by side with the base part 240a and may be flat, and the remaining portions of the rollable parts 240b and 240c may be curved.

In an embodiment, the rollable parts 240b and 240c may include the first rollable part 240b extending from one end portion (e.g., an end portion in the −x-axis direction) of the base part 240a in the first direction D1 and the second rollable part 240c extending from an opposite end portion (e.g., an end portion in the +x-axis direction) of the base part 240a in the second direction D2. The first rollable part 240b and the second rollable part 240c may be symmetrical to each other with respect to the base part 240a. In the first state, the first rollable part 240b may curvedly extend from the one end portion of the base part 240a, and the second rollable part 240c may curvedly extend from the opposite end portion of the base part 240a. In the second state, the first rollable part 240b may extend in parallel from the one end portion of the base part 240a and may be curved from a middle portion, and the second rollable part 240c may extend in parallel from the opposite end portion of the base part 240a and may be curved from a middle portion.

In an embodiment, the display 240 may further include a first extending part 240d extending from the first rollable part 240b and a second extending part 240e extending from the second rollable part 240c. The first extending part 240d and the second extending part 240e may remain flat while being parallel to the base part 240a irrespective of a state of the electronic device 200. The first extending part 240d may face the base part 240a in the first state and may face portions of the rollable parts 240b and 240c in the second state. The second extending part 240e may face the base part 240a in the first state and may face a portion of the second rollable part 240c in the second state. However, the structure of the display 240 is not limited to the illustrated embodiment and may be changed according to various embodiments of the disclosure. For example, the display 240 may not include the first extending part 240d or the second extending part 240e. Furthermore, the first extending part 240d or the second extending part 240e may extend shorter from the rollable parts 240b and 240c, or may extend longer to face the base part 240a in the second state.

In an embodiment, the display 240 may include a plurality of layers 241, 243, 245, and 247 extending from the base part 240a to the first extending part 240d and the second extending part 240e across the rollable parts 240b and 240c. The plurality of layers of the display 240 may include the panel layer 241 (e.g., the panel layer 151 of FIG. 6), the reinforcement layer 243 (e.g., the reinforcement layer 153 of FIG. 6), the cover layer 245 (e.g., the cover layer 155 of FIG. 6), and the protective layer 247 (e.g., the protective layer 157 of FIG. 6). Some of the components of the display 240 illustrated in FIG. 14 may be identical or similar to some of the components of the display illustrated in FIG. 6 (e.g., the display 150 of FIG. 6).

In an embodiment, the cover layer 245 may include a first portion 245a, a second portion 245b and a fourth portion 245c having a smaller thickness than the first portion 245a, a third portion 245d disposed between the first portion 245a and the second portion 245b, and a fifth portion 245e disposed between the first portion 245a and the fourth portion 245c. For example, the third portion 245d may extend from the first portion 245a in the first direction D1, and the second portion 245b may extend from the third portion 245d. The fifth portion 245e may extend from the first portion 245a in the second direction D2, and the fourth portion 245c may extend from the fifth portion 245e. The third portion 245d may be a variable thickness portion between the first portion 245a and the second portion 245b and may have a gradually decreasing thickness toward the second portion 245b. The fifth portion 245e may be a variable thickness portion between the first portion 245a and the fourth portion 245c and may have a gradually decreasing thickness toward the fourth portion 245c.

In an embodiment, the first portion 245a, the third portion 245d, and the fifth portion 245e may be included in the base part 240a of the display 240. The second portion 245b may be included in the first rollable part 240b (or, the first rollable part 240b and the first extending part 240d) of the display 240. The fourth portion 245c may be included in the second rollable part 240c (or, the second rollable part 240c and the second extending part 240e). For example, the boundary between the second portion 245b and the third portion 245d may be located on substantially the same line as the boundary between the base part 240a and the first rollable part 240b. The boundary between the fourth portion 245c and the fifth portion 245e may be located on substantially the same line as the boundary between the base part 240a and the second rollable part 240c.

In an embodiment, the reinforcement layer 243 may be formed in a shape corresponding to the thickness of the cover layer 245 to fill the space between the cover layer 245 and the panel layer 241. For example, the reinforcement layer 243 may include a first thickness compensating portion 243a corresponding to the first portion 245a, a second thickness compensating portion 243b corresponding to the second portion 245b, a third thickness compensating portion 243d corresponding to the third portion 245d, a fourth thickness compensating portion 243c corresponding to the fourth portion 245c, and a fifth thickness compensating portion 243e corresponding to the fifth portion 245e.

In an embodiment, the first thickness compensating portion 243a may be thinner than the second thickness compensating portion 243b and the fourth thickness compensating portion 243c. The third thickness compensating portion 243d between the first thickness compensating portion 243a and the second thickness compensating portion 243b may have a gradually increasing thickness toward the second thickness compensating portion 243b. The fifth thickness compensating portion 243e between the first thickness compensating portion 243a and the fourth thickness compensating portion 243c may have a gradually increasing thickness toward the fourth thickness compensating portion 243c.

In an embodiment, the reinforcement layer 243, together with the cover layer 245, may form one layer having a uniform thickness. The reinforcement layer 243 may compensate for the thickness difference of the cover layer 245, and thus an air layer (e.g., an air gap) may not be formed between the cover layer 245 and the panel layer 241 when the cover layer 245 is attached to the panel layer 241. The reinforcement layer 243 may compensate for a change in refractive index depending on the thickness difference of the cover layer 245. The reinforcement layer 243 may include a soft material to reinforce strength and elasticity when at least portions of the rollable parts 240b and 240c are deformed. The reinforcement layer 243 may be formed of a material more ductile than the cover layer 245.

According to the embodiment illustrated in FIGS. 14A and 14B, the display 240 may be formed such that the cover layer 245 is implemented as one part and has different thicknesses to correspond to the base part 240a and the rollable parts 240b and 240c of the display 240. However, a structure for securing the flexibilities of the rollable parts 240b and 240c is not limited to the illustrated embodiment. The structures of the displays according to the various embodiments described above with reference to FIGS. 7 to 10 may be identically applied to the display 240 illustrated in FIG. 14. For example, as in the embodiment of FIG. 7 (e.g., the display 150 of FIG. 7), the thickness of the cover layer 245 may be increased again to correspond to the first extending part 240d and the second extending part 240e. Furthermore, as in the embodiments of FIGS. 8 and 9 (e.g., the displays 160 and 170 of FIGS. 8 and 9), the cover layer 245 may have a structure in which a plurality of layers (e.g., the first layer 163 and the second layer 164 of FIG. 8, or the first layer 173, the second layer 174, and the third layer 175 of FIG. 9) are stacked. Moreover, as in the embodiment of FIG. 10 (e.g., the display 180 of FIG. 10), through-holes (e.g., the plurality of through-holes 1841 of FIG. 10) (or, recesses) may be formed in at least a portion of the cover layer 245, and thus regions corresponding to the rollable parts 240b and 240c may be flexibly deformed.

Figures 15A, 15B:
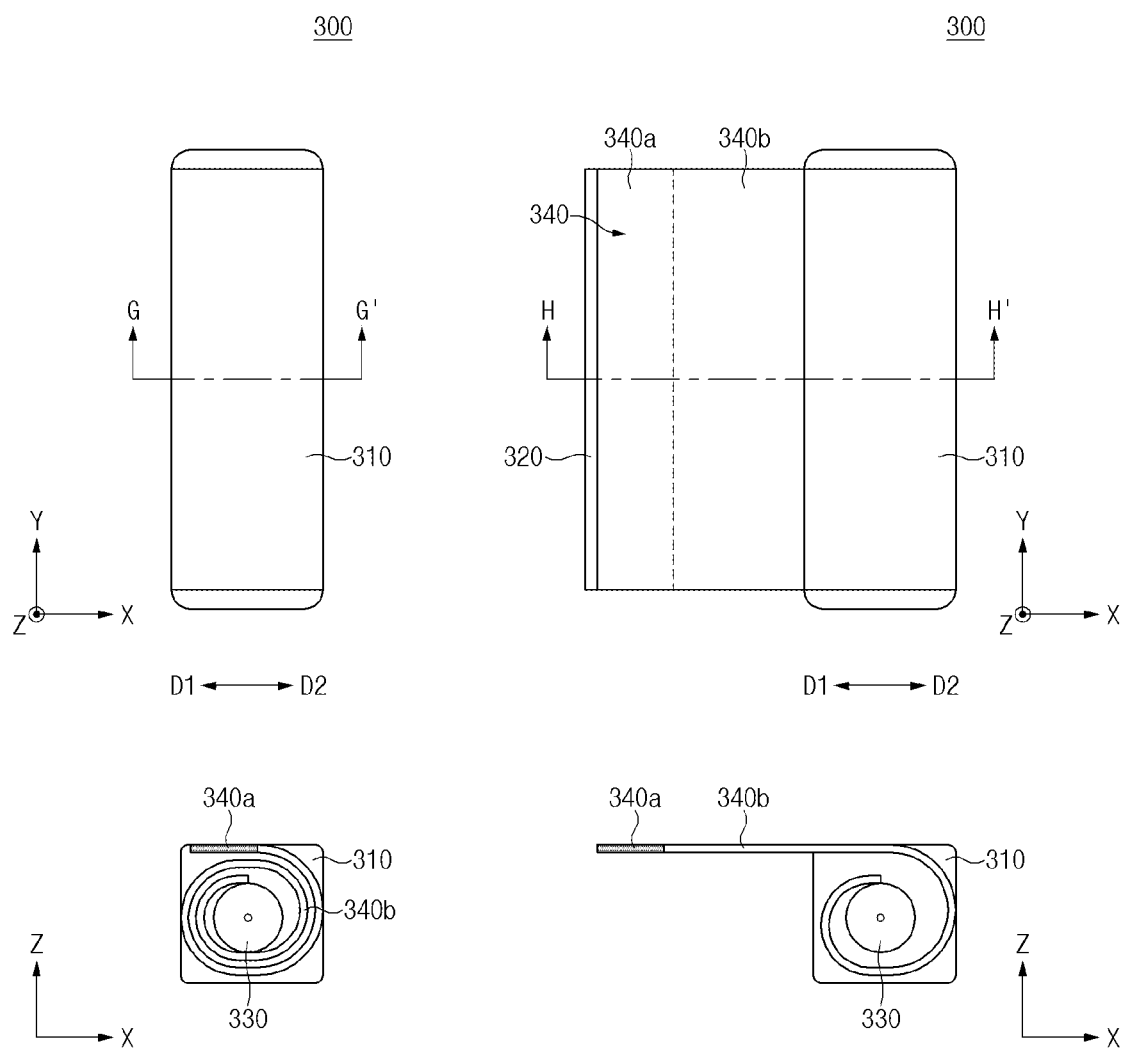
FIGS. 15A and 15B are diagrams illustrating a first state and a second state of an electronic device according to various embodiments.

FIGS. 15A and 15B are diagrams illustrating a first state and a second state of an electronic device according to various embodiments.

FIG. 15A illustrates the first state of the electronic device, and FIG. 15B illustrates the second state of the electronic device.

Referring to FIGS. 15A and 15B, the electronic device 300 according to an embodiment may include a housing 310, a display 340, and a roller member (e.g., roller) 330.

In an embodiment, the electronic device 300 may have a structure in which the display 340 is disposed in the housing 310 in a state of being wound around the roller member 330 and is moved out of the housing 310 by a user operation or a mechanical operation to provide a screen display region. The electronic device 300 may include the first state (e.g., a closed state or a reduced mode) and the second state (e.g., an open state or an extended mode) depending on whether the display 340 is exposed (e.g., visible). For example, the first state may be a state in which the display 340 is accommodated in the housing 310 and is not exposed (e.g., visible) outside the housing 310. The second state may be a state in which the display 340 is exposed outside the housing 310. The second state may be a state in which the area of the display 340 exposed (e.g., visible) outside the housing 310 is maximized and/or increased. The electronic device 300 may include an intermediate state between the first state and the second state depending on the degree to which the display 340 is exposed. For example, the intermediate state may be understood as any state before the electronic device 300 is completely changed from the first state to the second state or from the second state to the first state. In the intermediate state, the area of the display 340 exposed (e.g., visible) outside the housing 310 may be smaller than the area in the second state.

In an embodiment, the housing 310 may have, on one side thereof, an opening (not illustrated) through which the display 340 moves. The display 340 may move out of the housing 310 through the opening and may be exposed (e.g., visible), or may be accommodated in the housing 310 through the opening. The roller member 330 may be rotatably coupled to the inside of the housing 310. The roller member 330 may be surrounded by the display 340. The display 340 may move out of or into the housing 310 as the roller member 330 in the housing 310 rotates relative to the housing 310.

In an embodiment, the display 340 may be wound around the roller member 330. One end of the display 340 may be connected to the roller member 330, and an opposite end of the display 340 may be connected to a gripping part 320. The display 340 may be directly connected to the roller member 330, or may be indirectly connected to the roller member 330 through a medium (not illustrated) that performs signal transmission between the display 340 and the electronic device 300. A user may take the display 340 out of the housing 310 using the gripping part 320, or may place the display 340 in the housing 310 using the gripping part 320. The display 340, when unwound from the roller member 330, may be exposed (or, extended) to the outside the housing 310 through the opening (not illustrated). The display 340 may be accommodated (or, received) in the housing 310 through the opening (not illustrated) while being wound around the roller member 330.

In an embodiment, the display 340 may be wound around or unwound from the roller member 330 by a rotation operation of the roller member 330. For example, when the gripping part 320 moves in a first direction D1, the roller member 330 may rotate in the counterclockwise direction, and the display 340 may move out of the housing 310 while being unwound from the roller member 330. When the gripping part 320 moves in a second direction D2, the roller member 330 may rotate in the clockwise direction, and the display 340 may move into the housing 310 while being wound around the roller member 330.

In an embodiment, the display 340 may include a base part 340a and a rollable part 340b extending from the base part 340a. The form of the base part 340a may be maintained and/or fixed irrespective of a state of the electronic device 300 of the display 340. The rollable part 340b may flexibly extend from the base part 340a to have shape variability and may be deformed depending on a state of the electronic device 300. For example, the base part 340a may remain flat irrespective of whether the display 340 is exposed (or, extended). The rollable part 340b may be partially deformed to be curved or flat depending on whether the display 340 is exposed (e.g., visible). A portion of the rollable part 340b that is curved in the first state may differ from a portion of the rollable part 340b that is curved in the second state. Furthermore, a portion of the rollable part 340b that is flat in the first state may differ from a portion of the rollable part 340b that is flat in the second state. A detailed configuration of the display 340 will be described below in greater detail with reference to FIG. 16.

Figure 16:
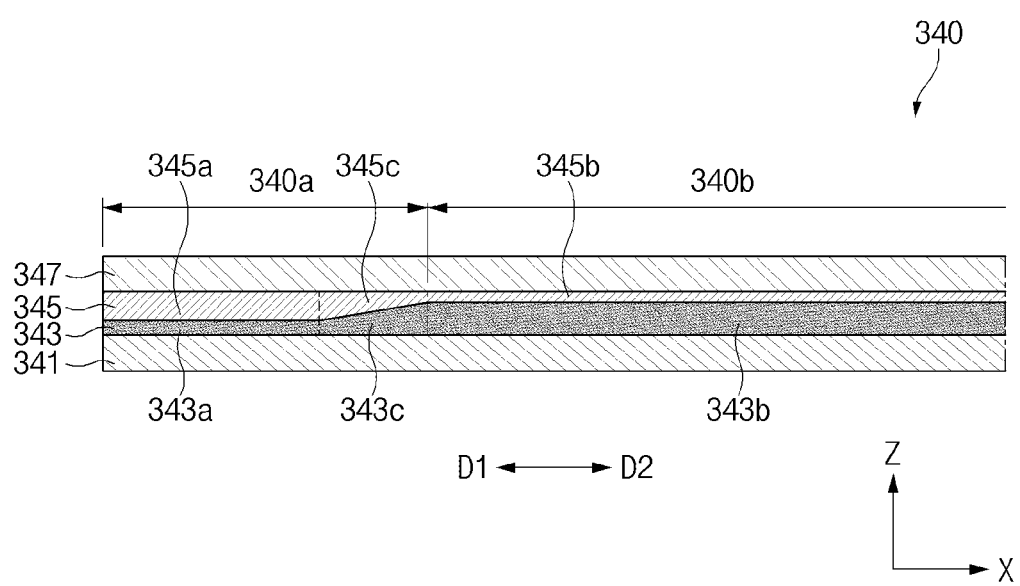
FIG. 16 is a cross-sectional view of a portion of the display according to various embodiments.

FIG. 16 is a cross-sectional view of a portion of the display according to various embodiments.

FIG. 16 illustrates a sectional view of the display of the electronic device taken along line G-G' in FIG. 15A or a sectional view of the display of the electronic device taken along line H-H' in FIG. 15B. FIG. 16 is a sectional view of a portion of the display when the electronic device illustrated in FIG. 15 is in the second state.

Referring to FIG. 16, the display 340 of the electronic device according to an embodiment (e.g., the electronic device 300 of FIG. 15) may include a plurality of layers 341, 343, 345, and 347 extending from the base part 340a to the rollable part 340b.

In an embodiment, the plurality of layers of the display 340 may include the panel layer 341 (e.g., the panel layer 151 of FIG. 6), the reinforcement layer 343 (e.g., the reinforcement layer 153 of FIG. 6), the cover layer 345 (e.g., the cover layer 155 of FIG. 6), and the protective layer 347 (e.g., the protective layer 157 of FIG. 6). Some of the components of the display 340 illustrated in FIG. 16 may be identical or similar to some of the components of the display illustrated in FIG. 6 (e.g., the display 150 of FIG. 6), and repetitive descriptions may not be repeated.

In an embodiment, the cover layer 345 may include a first portion 345a, a second portion 345b thinner than the first portion 345a, and a third portion 345c disposed between the first portion 345a and the second portion 345b. The third portion 345c may be a variable thickness portion between the first portion 345a and the second portion 345b and may have a gradually decreasing thickness toward the second portion 345b. The third portion 345c may extend from the first portion 345a, and the second portion 345b may extend from the third portion 345c.

In an embodiment, the first portion 345a and the third portion 345c may be included in the base part 340a of the display 340, and the second portion 345b may be included in the rollable part 340b of the display 340. For example, the boundary between the second portion 345b and the third portion 345c may be located on substantially the same line as the boundary between the base part 340a and the rollable part 340b. The first portion 345a and the third portion 345c may overlap the base part 340a when the base part 340a of the display 340 is viewed from above.

In an embodiment, opposite surfaces of the reinforcement layer 343 between the cover layer 345 and the panel layer 341 may be attached to the cover layer 345 and the panel layer 341. The reinforcement layer 343 may be formed in a shape corresponding to the thickness of the cover layer 345 to fill the space between the cover layer 345 and the panel layer 341. For example, the reinforcement layer 343 may include a first thickness compensating portion 343a corresponding to the first portion 345a, a second thickness compensating portion 343b corresponding to the second portion 345b, and a third thickness compensating portion 343c corresponding to the third portion 345c. The third thickness compensating portion 343c between the first thickness compensating portion 343a and the second thickness compensating portion 343b may have a gradually increasing thickness toward the second thickness compensating portion 343b.

In an embodiment, the reinforcement layer 343, together with the cover layer 345, may form one layer having a uniform thickness. The reinforcement layer 343 may compensate for the thickness difference of the cover layer 345, and thus an air layer (e.g., an air gap) may not be formed between the cover layer 345 and the panel layer 341 when the cover layer 345 is attached to the panel layer 341. The reinforcement layer 343 may compensate for a change in refractive index depending on the thickness difference of the cover layer 345, thereby improving visibility. The reinforcement layer 343 may include a soft material to reinforce strength and elasticity when at least a portion of the rollable part 340b is deformed while being wound around the roller member (e.g., the roller member 330 of FIG. 15) or unwound from the roller member 330. The reinforcement layer 343 may be formed of a material more ductile than the cover layer 345.

According to an embodiment, to correspond to the base part 340a and the rollable part 340b, the cover layer 345 disposed in the rollable part 340b of the display 340 may be formed to be relatively thin, and thus when the rollable part 340b is wound around or unwound from the roller member (e.g., the roller member 330 of FIG. 15), the rollable part 340b may be flexibly deformed to be flat and curved.

Furthermore, the display 340 may include the reinforcement layer 343 made of the soft material between the cover layer 345 and the panel layer 341 to compensate for the thickness difference of the cover layer 345 depending on the base part 340a and the rollable part 340b. Accordingly, a repulsive force may be reduced in a process in which the rollable part 340b is deformed.

S. 17A and 17B are cross-sectional views illustrating portions of displays according to various embodiments.

Figure 17A:
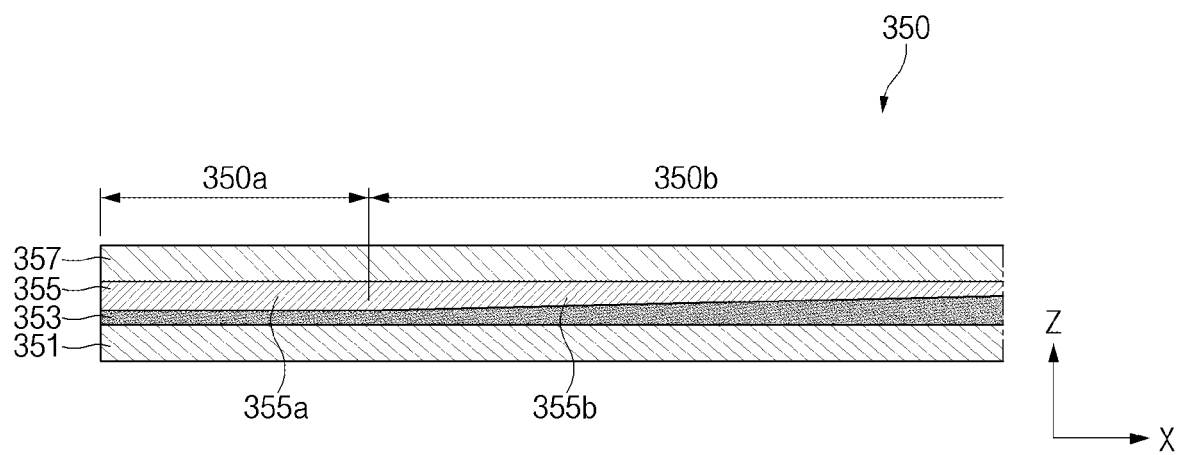
FIGS. 17A and 17B are cross-sectional views illustrating portions of displays according to various embodiments.
Figure 17B:
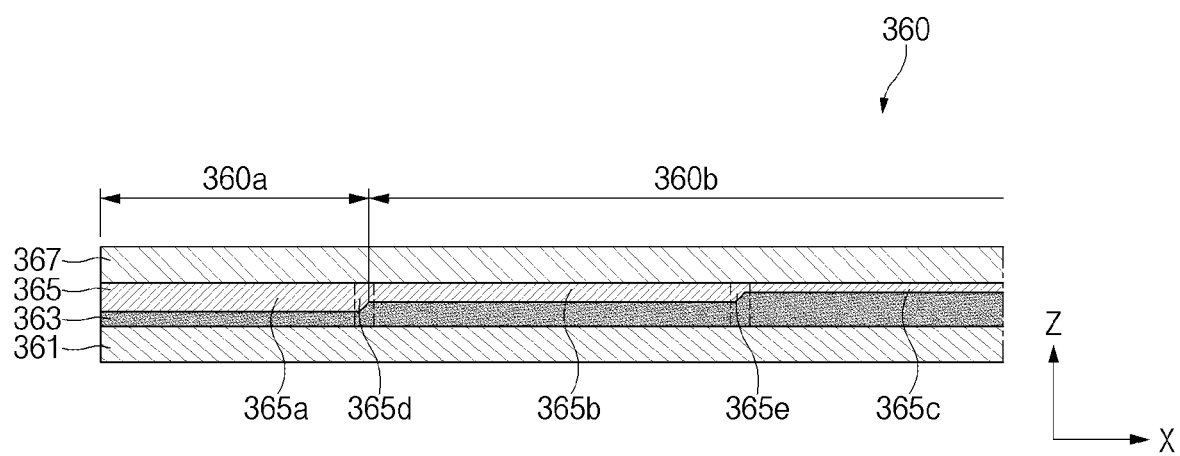

Referring to FIGS. 17A and 17B, the displays 350 and 360 according to embodiments may include panel layers 351 and 361, reinforcement layers 353 and 363, cover layers 355 and 365, and protective layers 357 and 367. Some of the components of the displays 350 and 360 illustrated in FIG. 17 may be identical or similar to some of the components of the display illustrated in FIG. 16 (e.g., the display 340 of FIG. 16).

FIGS. 17A and 17B illustrate embodiments in which the structures of the cover layers 355 and 365 are changed when compared to that of the display illustrated in FIG. 16 (e.g., the display 340 of FIG. 16). Therefore, repetitive descriptions may not be repeated, and the following description will be focused on the differences.

According to the embodiments illustrated in FIGS. 17A and 17B, the cover layers 355 and 365 may be formed in shapes in which the thicknesses are gradually decreased from first end portions toward second end portions of rollable parts 350b and 360b of the displays 350 and 360 (e.g., in the x-axis direction). The display illustrated in FIG. 16 (e.g., the display 340 of FIG. 16) may differ from the displays 350 and 360 illustrated in FIG. 17 in that the second portion (e.g., the second portion 345b of FIG. 16) of the cover layer (e.g., the cover layer 345 of FIG. 16) uniformly extends to have a smaller thickness than the first portion (e.g., the first portion 245a of FIG. 16), whereas the cover layers 355 and 365 have a gradually decreasing thickness or include a plurality of variable thickness portions.

Referring to FIG. 17A, the cover layer 355 may include a first portion 355a having a uniform thickness and a second portion 355b extending from the first portion 355a and having a gradually decreasing thickness. The first portion 355a may be included in a base part 350a of the display 350, and the second portion 355b may be included in the rollable part 350b of the display 350. The second portion 355b of the cover layer 355 may have a gradually decreasing thickness from the first end portion to the second end portion of the rollable part 350b. The boundary between the first portion 355a and the second portion 355b may be located on substantially the same line as the boundary between the base part 350a and the rollable part 350b. When the base part 350a of the display 350 is viewed from above, the first portion 355a may overlap the base part 350a, and the second portion 355b may overlap the rollable part 350b.

In the embodiment illustrated in FIG. 17A, the thickness of the cover layer 355 (e.g., the first portion 355a) disposed in the base part 350a may be uniformly maintained. However, the disclosure is not limited to the illustrated embodiment, and according to various embodiments of the disclosure, the cover layer 355 may not be divided into a portion (e.g., the first portion 355a) having a uniform thickness and a portion (e.g., the second portion 355b) having a gradually decreasing thickness and may be formed in a shape in which the overall thickness is gradually decreased.

Referring to FIG. 17B, the cover layer 365 may include two or more variable thickness portions. For example, the cover layer 365 may include a first portion 365a, a second portion 365b thinner than the first portion 365a, a third portion 365c thinner than the second portion 365b, a fourth portion 365d having a variable thickness between the first portion 365a and the second portion 365b, and a fifth portion 365e having a variable thickness between the second portion 365b and the third portion 365c.

In an embodiment, the first portion 365a and the fourth portion 365d may be included in a base part 360a of the display 360, and the second portion 365b, the third portion 365c, and the fifth portion 365e may be included in the rollable part 360b of the display 360. The boundary between the second portion 365b and the fourth portion 365d may be located on substantially the same line as the boundary between the base part 360a and the rollable part 360b.

Although not illustrated, the cover layer 365 may further include a plurality of portions (not illustrated) thinner than the third portion 365c, and correspondingly, variable thickness portions (not illustrated) may be disposed between the plurality of portions. For example, the cover layer 365 may further include a sixth portion (not illustrated) thinner than the third portion 365c and a seventh portion (not illustrated) having a variable thickness between the third portion 365c and the sixth portion (not illustrated).

The display 350 or 360 illustrated in FIGS. 17A and 17B may be configured such that a portion of the rollable part 350b or 360b located close to the roller member 330 is more flexibly deformed than a portion of the rollable part 350b or 360b located relatively far away from the roller member 330, with the display 350 or 360 wound around the roller member (e.g., the roller member 330) in the electronic device illustrated in FIG. 15 (e.g., the electronic device 300 of FIG. 15). When the display 350 or 360 is wound around the roller member 330, the rollable part 350b or 360b may have a decreasing radius of curvature from the first end portion connected to the base part 350a or 360a toward the second end portion connected to the roller member 330. When the radius of curvature is decreased, the rollable part 350b or 360b may be curved (or, bent) to a greater degree, and thus a stronger repulsive force may act. According to the illustrated embodiments, considering that the displays 350 and 360 are wound, the thicknesses of the cover layers 355 and 365 may be gradually decreased to correspond to the degrees to which the rollable parts 350b and 360b are curved, and thus the flexibilities of the rollable parts 350b and 360b may be further improved.

FIGS. 18A and 18B are cross-sectional views illustrating portions of displays according to various embodiments.

Referring to FIG. 18A, the display 400 according to an embodiment may include a panel layer 410, a reinforcement layer 420, a cover layer 430, and a protective layer 440. Some of the components of the display 400 illustrated in FIG. 18A may be identical or similar to some of the components of the display illustrated in FIG. 6 (e.g., the display 150 of FIG. 6).

FIG. 18A illustrates an embodiment in which the arrangement of the cover layer 430 and the reinforcement layer 420 is changed when compared to that in the display illustrated in FIG. 6 (e.g., the display 150 of FIG. 6). Therefore, repetitive descriptions may not be repeated, and the following description will be focused on the differences.

According to the embodiment illustrated in FIG. 18A, the cover layer 430 may be disposed on the panel layer 410, and the reinforcement layer 420 may be disposed between the cover layer 430 and the protective layer 440. The cover layer 430 may be attached to the panel layer 410 through an adhesive member (not illustrated). The protective layer 440 may be attached to the reinforcement layer 420 through an adhesive member (not illustrated).

In an embodiment, the thickness of the cover layer 430 disposed in a base part 400a of the display 400 may be greater than the thickness of the cover layer 430 disposed in a rollable part 400b of the display 400. The reinforcement layer 420 may be formed in a shape corresponding to the cover layer 430 to fill the space between the cover layer 430 and the protective layer 440 that is formed by the thickness difference of the cover layer 430. The reinforcement layer 420 may compensate for the thickness difference of the cover layer 430, and thus an air layer (e.g., an air gap) may not be formed between the protective layer 440 and the cover layer 430 when the protective layer 440 is stacked on the cover layer 430.

Referring to FIG. 18B, the display 500 according to an embodiment may include a panel layer 510, a cover layer 520, and a protective layer 530. Some of the components of the display 500 illustrated in FIG. 18A may be identical or similar to some of the components of the display 150 illustrated in FIG. 6.

FIG. 18B illustrates an embodiment in which the reinforcement layer 420 is not disposed between the cover layer 520 and the protective layer 530 when compared to that of the display 400 illustrated in FIG. 18 (a). Therefore, repetitive descriptions may not be repeated, and the following description will be focused on the differences.

According to the embodiment illustrated in FIG. 18B, the cover layer 520 may be disposed on the panel layer 510, and the protective layer 530 may be disposed on the cover layer 520. The cover layer 520 may be attached to the panel layer 510 through an adhesive member (not illustrated). The protective layer 530 may be attached to the panel layer 510 through an adhesive member (not illustrated).

In an embodiment, the cover layer 520 may have different thicknesses to correspond to a base part 500a and a rollable part 500b of the display 500. The protective layer 530 may have a uniform thickness, and at least a portion of the protective layer 530 may obliquely extend to correspond to a variable thickness portion (e.g., a third portion 525) of the cover layer 520.

In an embodiment, the protective layer 530 may include a first section 531 corresponding to a first portion 521 of the cover layer 520, a second section 533 corresponding to a second portion 523 of the cover layer 520, and a third section 535 corresponding to the third portion 525 of the cover layer 520. The first section 531, the second section 533, and the third section 535 of the protective layer 530 may extend to have a uniform thickness.

In an embodiment, the third section 535 of the protective layer 530 may obliquely extend downward from the first section 531 to correspond to the shape of the third portion 525 of the cover layer 520. The second section 533 may extend parallel to the first section 531 from the third section 535. According to the illustrated embodiment, an inclined portion may be exposed on a surface of the display 500 as the protective layer 530 extends to have a uniform thickness to correspond to the shape of the cover layer 520. In this case, by making the change in thickness of the third portion 525 fine (e.g., by making the slope gentle), the feeling of use of the display 500 may not be affected.

According to various embodiments of the disclosure, the structures of the displays 400 and 500 according to the embodiments of FIG. 18 may be applied to the displays that are included in the electronic device illustrated in FIGS. 1 to 4 (e.g., the electronic device 100 of FIGS. 1 to 4), the electronic device illustrated in FIG. 13 (e.g., the electronic device 200 of FIG. 13), and the electronic device illustrated in FIG. 15 (e.g., the electronic device 300 of FIG. 150), respectively.

Figure 19A:
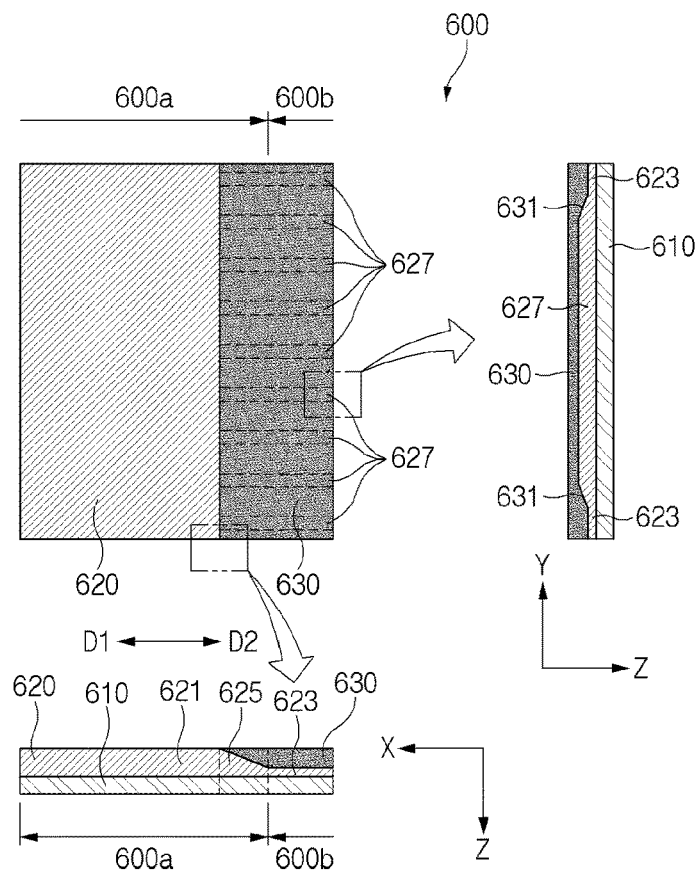
FIGS. 19A and 19B are diagrams illustrating a portion of a display of an electronic device according to various embodiments.
Figure 19B:
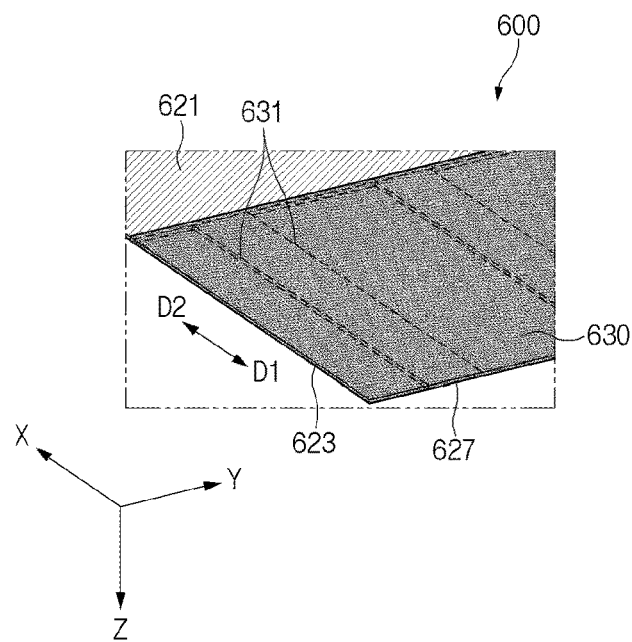

FIGS. 19A and 19B are diagrams illustrating a portion of a display of an electronic device according to various embodiments.

Referring to FIGS. 19A and 19B, the display 600 according to an embodiment may include a protective layer 610, a cover layer 620, and a reinforcement layer 630. Some of the components of the display 600 illustrated in FIG. 19 may be identical or similar to some of the components of the display illustrated in FIG. 6 (e.g., the display 150 of FIG. 6), and FIG. 19 may be a view in which a panel layer (e.g., the panel layer 151 of FIG. 6) is omitted.

In an embodiment, the cover layer 620 may include a first portion 621 and a third portion 625 that are disposed in a base part 600*a* of the display 600 and a second portion 623 disposed in a rollable part 600*b* of the display 600. The second portion 623 and the third portion 625 of the cover layer 620 may be disposed between the reinforcement layer 630 and the protective layer 610. As described above with reference to FIG. 12, the reinforcement layer 630 may not be disposed on the first portion 621 of the cover layer 620 (e.g., the display 150" of FIG. 12). The reinforcement layer 630 may be disposed to overlap the second portion 623 and the third portion 625 and may form substantially the same plane as the first portion 621. Accordingly, the reinforcement layer 630 may compensate for a thickness difference of the cover layer 620. However, the form of the cover layer 620 is illustrative, and the disclosure is not limited thereto.

In an embodiment, a plurality of protrusions 627 protruding toward the reinforcement layer 630 may be formed on a partial region of the cover layer 620. The plurality of protrusions 627 may be spaced apart from each other by a specified gap in a direction perpendicular to movement directions of the display 600 (e.g., a first direction D1 and a second direction D2).

In an embodiment, the plurality of protrusions 627 may be formed on the second portion 623 of the cover layer 620. The plurality of protrusions 627 may be disposed between a portion of the reinforcement layer 630 and a portion of the protective layer 610. The plurality of protrusions 627 may extend in a direction parallel to the movement directions of the display 600 (e.g., the first direction D1 and the second direction D2) by a predetermined length. As the plurality of protrusions 627 are formed on the second portion 623 of the cover layer 620, the second portion 623 of the cover layer 620 may have a shape in which thick portions alternate with thin portions in the direction (e.g., the y-axis direction) perpendicular to the movement directions of the display 600.

In an embodiment, regions of the reinforcement layer 630 that correspond to the protrusions 627 formed on the second portion 623 may be formed to be thinner than other regions of the reinforcement layer 630. At least a partial region of the reinforcement layer 630 may have a shape in which thick portions and thin portions alternate with one another in the direction (e.g., the y-axis direction) perpendicular to the movement directions of the display 600 to correspond to the plurality of protrusions 627. Stepped surfaces 631 whose thicknesses are varied may be formed on the reinforcement layer 630 to correspond to the shapes of the plurality of protrusions 627.

According to various embodiments of the disclosure, the structure (e.g., the plurality of protrusions 627) of the display 600 according to the embodiment of FIGS. 19A and 19B may be applied to the displays that are included in the electronic device illustrated in FIGS. 1 to 4 (e.g., the electronic device 100 of FIGS. 1 to 4), the electronic device illustrated in FIG. 13 (e.g., the electronic device 200 of FIG. 13), and the electronic device illustrated in FIG. 15 (e.g., the electronic device 300 of FIG. 150), respectively.

According to an embodiment, in the display 600, the plurality of protrusions 627 may be formed on the relatively thin second portion 623 of the cover layer 620 to correspond to the rollable part 600*b*. Accordingly, the rigidity of the thin second portion 623 of the cover layer 620 may be reinforced, and the strength of the rollable part 600*b* of the display 600 may be improved.

Figure 20A:
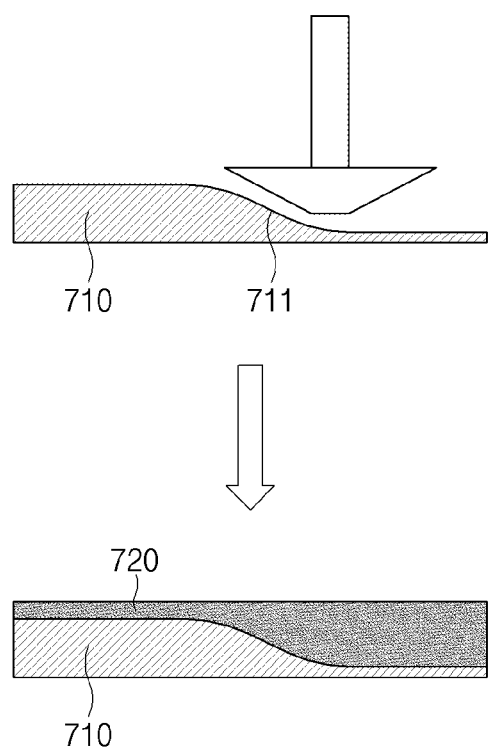
FIGS. 20A and 20B are diagrams illustrating example methods of manufacturing cover layers and reinforcement layers according to various embodiments.
Figure 20B:
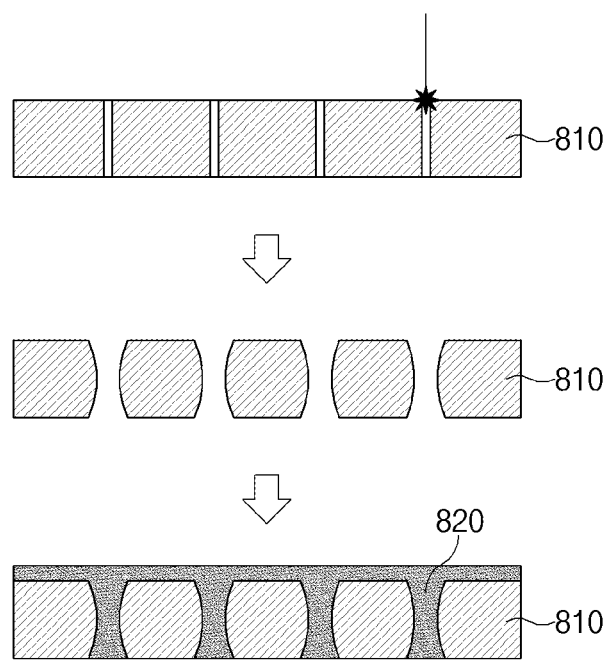

FIGS. 20A and 20B are diagrams illustrating example methods of manufacturing cover layers and reinforcement layers according to various embodiments.

In an embodiment, the cover layers 710 and 810 may be manufactured in predetermined shapes through various processes including etching, polishing, lathe machining (CNC machining), or laser machining. However, the aforementioned manufacturing processes are illustrative, and manufacturing methods of the cover layers 710 and 810 are not limited to the aforementioned manufacturing processes.

Referring to FIG. 20A, the cover layer 710 may be processed into a shape including a variable thickness portion 711 through CNC machining and etching. After the shape of the cover layer 710 is processed, a reinforcement layer 720 may be stacked on or attached to the cover layer 710 through a process of filling the cover layer 710 with a resin and/or curing the resin. For example, the reinforcement layer 720 may compensate for the variable thickness portion 711 of the cover layer 710 by filling the resin to correspond to the shape of the cover layer 710.

Referring to FIG. 20B, the cover layer 810 may be processed into a shape having a plurality of through-holes through laser machining. For example, the plurality of through-holes may be formed through an etching process after holes are formed in the cover layer 810 by applying a laser to the cover layer 810. After the shape of the cover layer 810 is processed, a reinforcement layer 820 may be stacked on or attached to the cover layer 810 through a process of filling the plurality of through-holes with a resin and/or curing the resin. For example, the reinforcement layer 820 may fill the plurality of through-holes formed in the cover layer 810 and may compensate for a variable density portion of the cover layer 810.

FIG. 21 is a diagram including a cross-sectional view illustrating a display of an electronic device according to various embodiments.

Referring to FIG. 21, the display 900 of the electronic device according to an embodiment (e.g., the electronic device 100 of FIGS. 1 to 4, the electronic device 200 of FIG. 13, and/or the electronic device 300 of FIG. 15) may be formed in a structure in which a plurality of layers are stacked.

The display 900 illustrated in FIG. 21 may be understood as being substantially the same as the displays included in the electronic devices 100, 200, and 300 described above. Some of the plurality of layers included in the display 900 of FIG. 21 may be substantially the same as or similar to some of the plurality of layers included in the display illustrated in FIGS. 5 and 6 (e.g., the display 150 of FIGS. 5 and 6).

In an embodiment, the plurality of layers of the display 900 may include a panel layer 910, a cover layer 920, a protective layer 930, a first adhesive layer 981, and a second adhesive layer 983. For example, the panel layer 910, the cover layer 920, and the protective layer 930 of FIG. 21 may be referred to as the panel layer illustrated in FIGS. 5 and 6

(e.g., the panel layer 151 of FIGS. 5 and 6), the cover layer illustrated in FIGS. 5 and 6 (e.g., the cover layer 155 of FIGS. 5 and 6), and the protective layer illustrated in FIGS. 5 and 6 (e.g., the protective layer 157 of FIGS. 5 and 6), respectively.

Hereinafter, the display 900 to be described in greater detail below with reference to FIG. 21 is not limited to a shape in which the cover layer 920 has different structures, shapes, thicknesses, and/or densities to correspond to a base part (e.g., the base part 150a of FIGS. 5 and 6) and a rollable part (e.g., the rollable part 150b of FIGS. 5 and 6) of the display 900. For example, the cover layer 920 of the display 900 illustrated in FIG. 21 may have a uniform thickness, or may have partially different thicknesses like the cover layer 155 of the display 150 illustrated in FIG. 6.

In an embodiment, the panel layer 910 may include a plurality of layers. Although not illustrated, for example, the panel layer 910 may be understood as including a pixel array (not illustrated) that includes a plurality of light emitting elements, an encapsulation layer (not illustrated) that seals the light emitting elements, a touch sensor layer (not illustrated) that includes touch electrodes, a wiring layer (not illustrated) that includes transistors electrically connected with the light emitting elements, a polarization layer (e.g., a polarizer (POL)) (not illustrated) that prevents and/or reduces reflection of external light to secure visibility, and/or a protective film (not illustrated) that forms an outer surface (e.g., a rear surface) of the panel layer 910 to protect the panel layer 910. In various embodiments, the cover layer 920, the protective layer 930, the first adhesive layer 981, and the second adhesive layer 983 may be formed of a light transmissive material capable of passing light emitted from the panel layer 910.

In an embodiment, the cover layer 920 may be attached to the top of the panel layer 910. For example, the panel layer 910 may include a first surface 910a visually exposed in a front direction of the electronic device 100 and a second surface 910b facing away from the first surface 910a. The cover layer 920 may be attached to the first surface 910a of the panel layer 910 by the first adhesive layer 981. The second surface 910b of the panel layer 910 may be configured to form a rear surface of the display 900. For example, referring to FIGS. 3 and 4 together, the second surface 910b of the panel layer 910 may refer to a surface that faces a plate part (e.g., the plate part 141 of FIGS. 3 and 4) and a multi joint part (e.g., the multi joint part 142 of FIGS. 3 and 4) of a second structure (e.g., the second structure 140 of FIGS. 3 and 4). According to various embodiments, the cover layer 920 may include a PI material, a PET material, or a glass material (e.g., ultra thin glass (UTG)).

In an embodiment, the protective layer 930 may be attached to the top of the cover layer 920. For example, the protective layer 930 may be disposed to face the panel layer 910 with the cover layer 920 therebetween. The protective layer 930 may be attached to an upper surface of the protective layer 930 (e.g., a surface facing in the same direction as the first surface 910a of the panel layer 910) by the second adhesive layer 983.

In an embodiment, the protective layer 930 for protecting the cover layer 920 may form a surface 900a (or, an outer surface) of the display 900. For example, the protective layer 930 may prevent and/or reduce damage to the cover layer 920 and may prevent and/or reduce scattering when the cover layer 920 is cracked. According to various embodiments, the protective layer 930 may include a PI material, a PET material, or a glass material.

In an embodiment, the first adhesive layer 981 may attach the panel layer 910 and the cover layer 920 to each other. The first adhesive layer 981 may be disposed between the panel layer 910 and the cover layer 920.

In an embodiment, the second adhesive layer 983 may attach the protective layer 930 and the cover layer 920 to each other. The second adhesive layer 983 may be disposed between the protective layer 930 and the cover layer 920.

In an embodiment, the first adhesive layer 981 and the second adhesive layer 983 may include various types of adhesives. For example, the first adhesive layer 981 and the second adhesive layer 983 may include a pressure sensitive adhesive (PSA) or an optical clear adhesive (OCA). In various embodiments, the first adhesive layer 981 and the second adhesive layer 983 may be implemented using a silicone-based adhesive material or an acrylate-based adhesive material. However, the types and/or materials of the first adhesive layer 981 and the second adhesive layer 983 are not limited to the above-described examples. The first adhesive layer 981 and the second adhesive layer 983 may be formed of the same adhesive material, or may be formed of different adhesive materials.

In an embodiment, the first adhesive layer 981 and the second adhesive layer 983 may have different moduli. In embodiments of the disclosure, a modulus may be an elastic modulus defined as the ratio of stress applied to a material to strain and may be understood as a value representing the stiffness of the material. For example, the stiffness may represent a property of resisting deformation. When the modulus is high, it may refer, for example, to the material not being relatively easily deformed due to high stiffness, and when the modulus is low, it may refer, for example, to the material being relatively easily deformed due to low stiffness.

In an embodiment, the moduli of the first adhesive layer 981 and the second adhesive layer 983 may refer, for example, to shear moduli. For example, the shear moduli of the first adhesive layer 981 and the second adhesive layer 983 may be obtained by Equation 1 below.

$$G = \frac{\tau}{\gamma} \quad\quad [\text{Equation 1}]$$

In Equation 1 above, "G" may refer to a modulus (e.g., a shear modulus), "τ" may refer to stress (e.g., shear stress) applied to the first adhesive layer 981 and/or the second adhesive layer 983, and "γ" may refer to strain (e.g., shear strain) by which the first adhesive layer 981 and/or the second adhesive layer 983 is deformed by the stress. For example, the modulus "G" may be expressed using Pascal (Pa [N/m2]) that is the unit of pressure.

In an embodiment, the second adhesive layer 983 may have a higher modulus than the first adhesive layer 981. For example, the second adhesive layer 983 may be formed of an adhesive having a higher modulus than the first adhesive layer 981. The first adhesive layer 981 may be more easily bent or deformed than the second adhesive layer 983.

In an embodiment, the first adhesive layer 981 may have a first modulus, and the second adhesive layer 983 may have a second modulus higher than the first modulus. For example, the modulus ratio G1/G2 of the first modulus G1 to the second modulus G2 may be less than 1.

In an embodiment, the first modulus of the first adhesive layer 981 may range from about 0.03 MPa to about 0.2 MPa. The second modulus of the second adhesive layer 983 may range from about 1 MPa to about 3 MPa. For example, the first modulus may preferably range from about 0.03 MPa to about 0.1 MPa, and the second modulus may preferably range from about 1 MPa to about 2.5 MPa. The first modulus and the second modulus may be numerical values measured at room temperature (e.g., about 25° C.). However, the first modulus and the second modulus are not limited to the aforementioned numerical ranges and may be changed according to various embodiments of the disclosure.

In an embodiment, the modulus ratio G1/G2 of the first modulus G1 to the second modulus G2 may range from about 0.012 to about 0.04. However, the relative ratio between the first modulus and the second modulus is not limited to the aforementioned numerical ranges and may be changed according to various embodiments of the disclosure.

In embodiments of the disclosure, the cover layer 920 of the display 900 may include a variable thickness portion (e.g., the third portion 155c of FIG. 6) like the cover layer illustrated in FIG. 6 (e.g., the cover layer 155 of FIG. 60. For example, in an embodiment in which the stacked structure of the display 900 illustrated in FIG. 21 is applied to the display illustrated in FIG. 6 (e.g., the display 150 of FIG. 6), the first adhesive layer 981 may be disposed between the panel layer (e.g., the panel layer 151 of FIG. 6) and the reinforcement layer (e.g., the reinforcement layer of FIG. 6) and may attach, to the panel layer 151, the cover layer 155 whose thickness change is compensated for, and the second adhesive layer 983 may be disposed between the cover layer 155 and the protective layer (e.g., the protective layer 157 of FIG. 6) and may attach the cover layer 155 and the protective layer to each other. In the other embodiment, the reinforcement layer 153 may be directly attached to or coated on the cover layer 155.

In the display 900 according to an embodiment, by making the modulus of the second adhesive layer 983, which is close to the surface 900a of the display 900 that forms the front surface of the electronic device 100, higher than that of the first adhesive layer 981, repulsive forces by the adhesive layers may be minimized and/or reduced, and the strength of the display 900 may be improved.

Figure 22A:
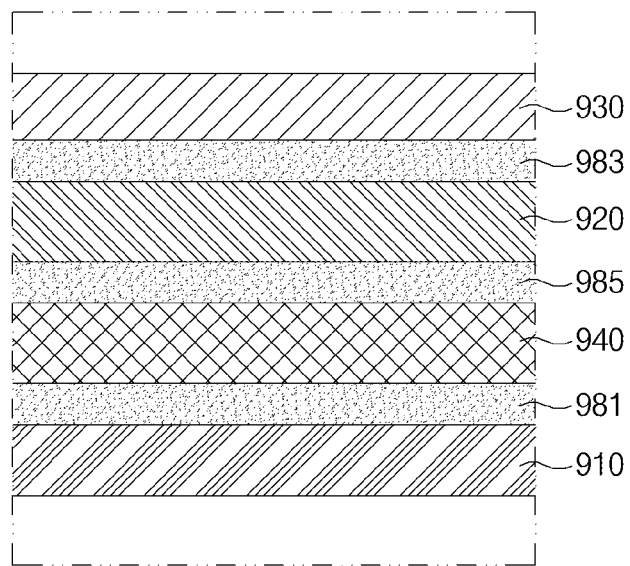
FIG. 22A is a cross-sectional view of a display of an electronic device according to various embodiments.
Figure 22B:
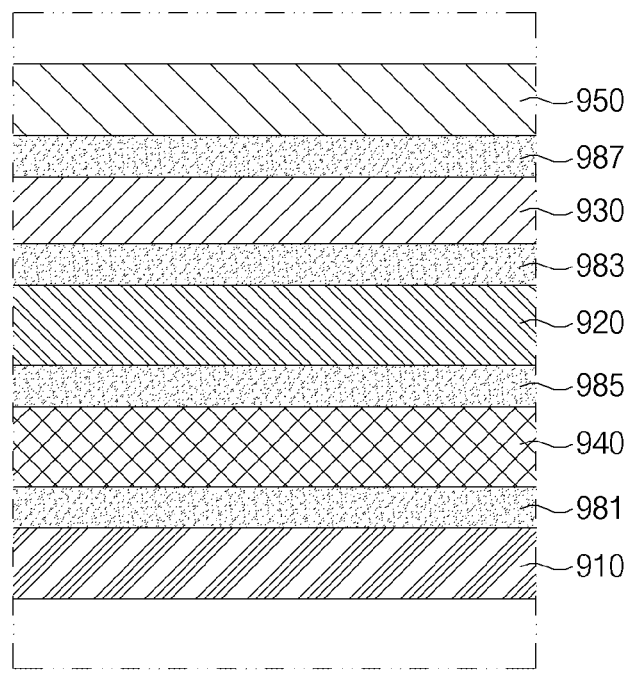
FIG. 22B is a cross-sectional view of a display of an electronic device according to various embodiments.

FIG. 22A is a sectional view of a display according to various embodiments. FIG. 22B is a sectional view of a display according to various embodiments.

FIGS. 22A and 22B may be views illustrating embodiments in which the plurality of layers in the display 900 illustrated in FIG. 21 additionally include other layers. Hereinafter, repetitive descriptions will be omitted.

Referring to FIG. 22A, the display 900 according to an embodiment may include the panel layer 910, the cover layer 920, the protective layer 930, a second reinforcement layer 940, the first adhesive layer 981, the second adhesive layer 983, and a third adhesive layer 985.

In an embodiment, the second reinforcement layer 940 may be disposed between the panel layer 910 and the cover layer 920. For example, the second reinforcement layer 940 may be attached with the panel layer 910 by the first adhesive layer 981 and may be attached with the cover layer 920 through the third adhesive layer 985. The second reinforcement layer 940 may be located between the panel layer 910 and the cover layer 920 and may improve the visibility and/or strength of the display 900. In various embodiments, the second reinforcement layer 940 may include a PET material or a PI material.

In various embodiments of the disclosure, the second reinforcement layer 940 may be a component distinguished from the reinforcement layer (e.g., the reinforcement layer 153 of FIG. 6) of the display illustrated in FIG. 6 (e.g., the display 150 of FIG. 6). For example, referring to the display 150 of FIG. 6, the reinforcement layer 153, which is disposed between the cover layer 155 and the panel layer 151 to compensate for the thickness change of the cover layer 155, may be understood as a component indispensably involved as the cover layer 155 has partially different thicknesses. In a case in which the stacked structure of the display 900 of FIG. 22A is applied to the display 150 illustrated in FIG. 6, it may be understood that the second reinforcement layer 940 is disposed between the panel layer 151 and the reinforcement layer 153, is attached with the panel layer 151 through the first adhesive layer 981, and is attached with the reinforcement layer 153 through the third adhesive layer 985.

In an embodiment, the third adhesive layer 985 may attach the second reinforcement layer 940 and the cover layer 920 to each other. The third adhesive layer 985 may be disposed between the second reinforcement layer 940 and the cover layer 920. The third adhesive layer 985 may be implemented with a type and/or material that is substantially the same as or similar to the first adhesive layer 981 and/or the second adhesive layer 983.

In an embodiment, the third adhesive layer 985 may have a lower modulus than the second adhesive layer 983. For example, the third adhesive layer 985 may be formed of an adhesive having a lower modulus than the second adhesive layer 983. The third adhesive layer 985 may have a modulus that is the same as or different from that of the first adhesive layer 981. Within such a range as to have a modulus lower than the modulus of the second adhesive layer 983, the third adhesive layer 985 may have a modulus that is the same as the modulus of the first adhesive layer 981, or may have a modulus different from the modulus of the first adhesive layer 981.

Referring to FIG. 22B, the display 900 according to an embodiment may further include a protective film 950 and a fourth adhesive layer 987.

In an embodiment, the protective film 950 may be attached with the protective layer 930 by the fourth adhesive layer 987. For example, the protective film 950 for protecting the protective layer 930 may form the outermost layer or the outer surface (e.g., the surface 900a) of the display 900. The protective film 950 may be attached to the upper surface of the protective layer 930 so as to be detachable. In various embodiments, the protective film 950 may include a PET material, a PI material, or a PU material.

In an embodiment, the fourth adhesive layer 987 may attach the protective film 950 and the protective layer 930 to each other. The fourth adhesive layer 987 may be disposed between the protective film 950 and the protective layer 930. The fourth adhesive layer 987 may be formed of an adhesive material by which the protective film 950 is detachable from the protective layer 930.

In an embodiment, the fourth adhesive layer 987 may have a lower modulus than the second adhesive layer 983. For example, the fourth adhesive layer 987 may be formed of an adhesive having a lower modulus than the second adhesive layer 983. The fourth adhesive layer 987 may have a modulus that is the same as or different from that of the first adhesive layer 981.

Figure 23:
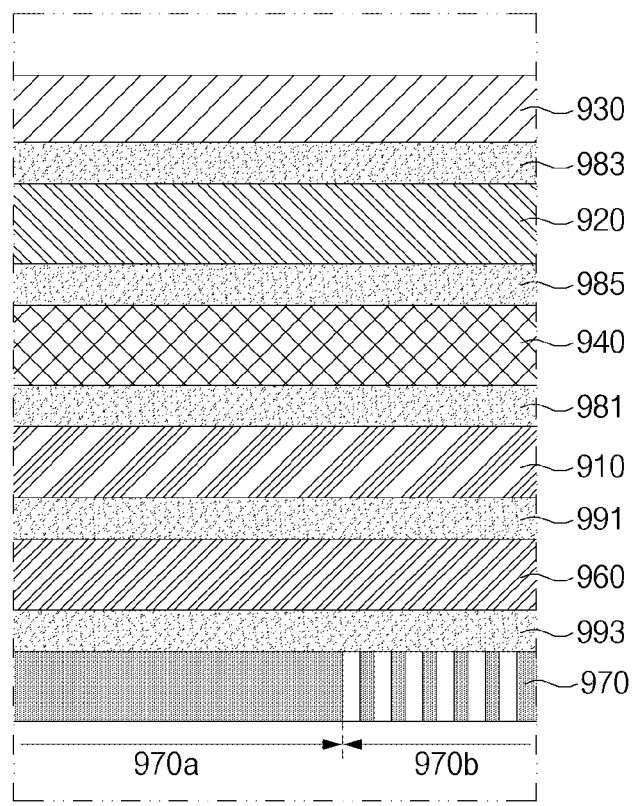
FIG. 23 is a cross-sectional view of a display of an electronic device according to various embodiments.

FIG. 23 is a sectional view of a display according to various embodiments.

FIG. 23 may be a view illustrating an embodiment in which the plurality of layers in the display 900 illustrated in FIG. 22A additionally include other layers. Hereinafter, repetitive descriptions may not be repeated.

Referring to FIG. 23, the display 900 according to an embodiment may include the panel layer 910, the cover layer 920, the protective layer 930, the second reinforcement layer 940, a barrier film 960, a support layer 970, the first adhesive layer 981, the second adhesive layer 983, the third adhesive layer 985, a fifth adhesive layer 991, and a sixth adhesive layer 993.

According to various embodiments, some of the plurality of layers illustrated in FIG. 23 may be omitted from the display 900. For example, the display 900 may not include one of the barrier film 960 and the support layer 970.

In an embodiment, the barrier film 960 may be attached to the rear surface of the panel layer 910 (e.g., the second surface 910b of FIG. 21) to protect the panel layer 910. The barrier film 960 may be disposed to face the second reinforcement layer 940 with the panel layer 910 therebetween. For example, the barrier film 960 may be attached to the rear surface of the panel layer 910 by the fifth adhesive layer 991. The barrier film 960 may protect the rear surface of the panel layer 910 and may improve the strength of the panel layer 910. In various embodiments, the barrier film 960 may include a PET material, a PI material, or a PU material.

In an embodiment, the fifth adhesive layer 991 may attach the barrier film 960 and the panel layer 910 to each other. The fifth adhesive layer 991 may be disposed between the panel layer 910 and the barrier film 960. The fifth adhesive layer 991 may be implemented with a type and/or material that is substantially the same as or similar to the first adhesive layer 981 to the third adhesive layer 985.

In an embodiment, the fifth adhesive layer 991 may have a lower modulus than the second adhesive layer 983. For example, the fifth adhesive layer 991 may be formed of an adhesive having a lower modulus than the second adhesive layer 983. The fifth adhesive layer 991 may have a modulus that is the same as or different from that of the first adhesive layer 981 and/or the third adhesive layer 985.

In an embodiment, the support layer 970 may be attached to the lower surface of the barrier film 960 to support the panel layer 910. When the display 900 is attached to another structure of the electronic device 100 (e.g., the second structure 140 of FIGS. 3 and 4), the support layer 970 may be disposed between the panel layer 910 (or, the barrier film 960) and the other structure and may support the panel layer 910. For example, the support layer 970 may be disposed to face the panel layer 910 with the barrier film 960 therebetween. The support layer 970 may be attached to the barrier film 960 by the sixth adhesive layer 993. In various embodiments, the display 900 may not include the barrier film 960. In this case, the support layer 970 may be attached to the rear surface of the panel layer 910 (e.g., the second surface 910b of FIG. 21).

In an embodiment, the support layer 970 may have a lattice or slit formed in at least a portion thereof to support bending and/or deformation of the display 900. For example, the support layer 970 may include a first region 970a that remains substantially flat and a second region 970b that is deformable. The second region 970b may extend from the first region 970a. The second region 970b may have a lattice or slit formed in at least a portion thereof and thus may be deformable. In various embodiments, the first region 970a may be a region corresponding to a base part of the display 900 (e.g., the base part 150a of FIGS. 5 and 6) whose shape is maintained irrespective of a state of the electronic device 100, and the second region 970b may be a region corresponding to a rollable part of the display 900 (e.g., the rollable part 150b of FIGS. 5 and 6) that is deformed depending on a state of the electronic device 100.

In an embodiment, the sixth adhesive layer 993 may attach the support layer 970 and the barrier film 960 to each other. The sixth adhesive layer 993 may be disposed between the barrier film 960 and the support layer 970. The sixth adhesive layer 993 may be implemented with a type and/or material that is substantially the same as or similar to the first adhesive layer 981 to the third adhesive layer 985.

In an embodiment, the sixth adhesive layer 993 may have a lower modulus than the second adhesive layer 983. For example, the fifth adhesive layer 991 may be formed of an adhesive having a lower modulus than the second adhesive layer 983. The fifth adhesive layer 991 may have a modulus that is the same as or different from that of the first adhesive layer 981 and/or the third adhesive layer 985.

Figure 24A:
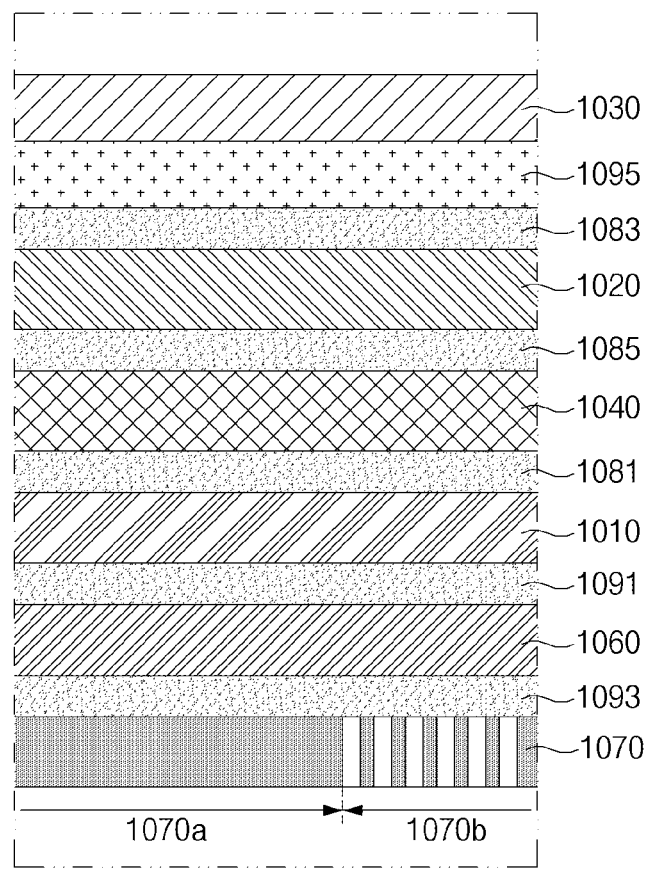
FIG. 24A is a cross-sectional view of a display of an electronic device according to various embodiments.
Figure 24B:
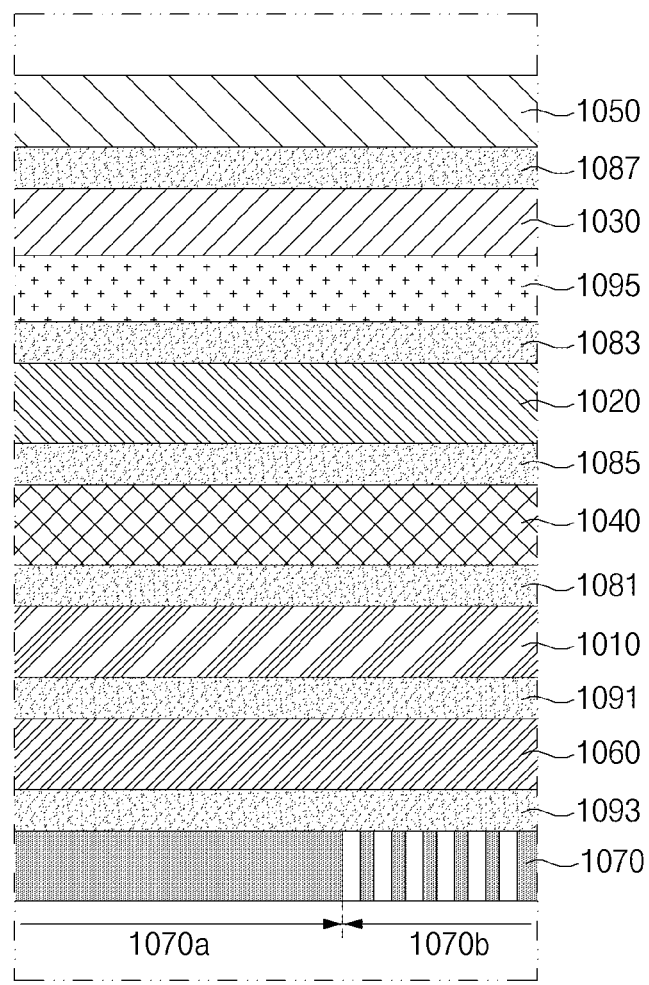
FIG. 24B is a cross-sectional view of the display of the electronic device according to various embodiments.

FIG. 24A is a sectional view of a display of an electronic device according to various embodiments. FIG. 24B is a sectional view of the display of the electronic device according to various embodiments.

FIGS. 24A and 24B may be views illustrating embodiments in which the plurality of layers in the display 900 illustrated in FIGS. 21 to 23 additionally include other layers.

The display 1000 of FIGS. 24A and 24B may have a structure and/or a property that is partially different from that of the display 900 of FIGS. 21 to 23. For example, in the display 900 of FIGS. 21 to 23, the adhesive layer (e.g., the second adhesive layer 983) close to the surface 900a may have a higher modulus than the other adhesive layers to provide an effect of minimizing and/or reducing a repulsive force and improving strength, whereas the display 1000 illustrated in FIGS. 24A and 24B may provide a similar effect through a separate additional layer rather than a difference in modulus between adhesive layers. Hereinafter, repetitive descriptions will be omitted, and the following description will be focused on the difference.

Referring to FIG. 24A, the display 1000 according to an embodiment may include a panel layer 1010, a cover layer 1020, a protective layer 1030, a second reinforcement layer 1040, a barrier film 1060, a support layer 1070, a first adhesive layer 1081, a second adhesive layer 1083, a third adhesive layer 1085, a fifth adhesive layer 1091, a sixth adhesive layer 1093, and a third reinforcement layer 1095.

In an embodiment, the support layer 1070 may have a lattice or slit formed in at least a portion thereof to support bending and/or deformation of the display 1000. For example, the support layer 1070 may include a first region 1070a that remains substantially flat and a second region 1070b that is deformable. The second region 1070b may extend from the first region 1070a. The second region 1070b may have a lattice or slit formed in at least a portion thereof and thus may be deformable. In various embodiments, the first region 1070a may be a region corresponding to a base part of the display 1000 (e.g., the base part 150a of FIGS. 5 and 6) whose shape is maintained irrespective of a state of the electronic device 100, and the second region 1070b may be a region corresponding to a rollable part of the display 1000 (e.g., the rollable part 150b of FIGS. 5 and 6) that is deformed depending on a state of the electronic device 100.

For example, the panel layer 1010, the cover layer 1020, the protective layer 1030, the second reinforcement layer 1040, the barrier film 1060, the support layer 1070, the first adhesive layer 1081, the second adhesive layer 1083, the third adhesive layer 1085, the fifth adhesive layer 1091, and the sixth adhesive layer 1093 of the display 1000 may be understood as being substantially the same as or similar to the panel layer 910, the cover layer 920, the protective layer 930, the second reinforcement layer 940, the barrier film 960, the support layer 970, the first adhesive layer 981, the second adhesive layer 983, the third adhesive layer 985, the fifth adhesive layer 991, and the sixth adhesive layer 993 of the display 900 illustrated in FIG. 23.

According to various embodiments, at least some of the plurality of layers may be omitted from the display 1000. For example, the display 1000 may be changed such that layers other than the panel layer 1010, the cover layer 1020, the protective layer 1030, the first adhesive layer 1081, the second adhesive layer 1083, and the third reinforcement layer 1095 are omitted. However, the disclosure is not limited thereto.

In an embodiment, the second adhesive layer 1083 may be disposed between the third reinforcement layer 1095 and the cover layer 1020. The second adhesive layer 1083 may be formed such that opposite surfaces have a predetermined adhesive force and may attach the third reinforcement layer 1095 to the cover layer 1020.

In an embodiment, the third reinforcement layer 1095 may be disposed between the protective layer 1030 and the second adhesive layer 1083. For example, the third reinforcement layer 1095 may be disposed on the rear surface of the protective layer 1030 and may be attached to the cover layer 1020 through the second adhesive layer 1083. The third reinforcement layer 1095 may be directly attached to or coated on the rear surface of the protective layer 1030. For example, the third reinforcement layer 1095 may be formed such that a surface facing the protective layer 1030 has an adhesive force. According to various embodiments, the third reinforcement layer 1095 may be formed in the form of an adhesive member PSA or a coating layer that has a relatively high modulus, but is not limited thereto.

In an embodiment, the third reinforcement layer 1095 may include a poly urethane (PU) material, an acryl material, or a poly urethane acrylate (PUA) material. For example, the third reinforcement layer 1095 may include a curable coating agent. However, the disclosure is not limited thereto.

In an embodiment, the modulus of the third reinforcement layer 1095 may be higher than the modulus of the second adhesive layer 1083 and may be lower than the modulus of the protective layer 1030. For example, the third reinforcement layer 1095 may have a modulus of about 1 MPa to about 500 MPa, but is not limited thereto.

In an embodiment, the adhesive layers 1081, 1083, 1085, 1091, and 1093 may have a modulus of about 0.1 MPa or less. Unlike in the display 900 described above with reference to FIGS. 21 to 23, the second adhesive layer 1083 included in the display 1000 of FIG. 24A is not limited to having a higher modulus than the other adhesive layers 1081, 1083, 1091, and 1093. For example, the adhesive layers 1081, 1083, 1085, 1091, and 1093 may have a modulus of about 0.03 MPa to about 0.1 MPa, but are not limited thereto.

In the display 1000 according to an embodiment, the third reinforcement layer 1095 having a relatively high modulus may be disposed on the rear surface of the protective layer 1030 of the display 1000 that forms the front surface of the electronic device 100, and thus the strength of the display 1000 may be improved. The third reinforcement layer 1095 may be attached to the cover layer 1020 through the second adhesive layer 1083 having a low modulus to reduce a repulsive force, and thus slipping or sliding of the display 1000 corresponding to an operation of the electronic device 100 may be smoothly performed.

Referring to FIG. 24B, the display 1000 according to an embodiment may further include a protective film 1050 and a fourth adhesive layer 1087. For example, the protective film 1050 and the fourth adhesive layer 1087 of the display 1000 may be understood as being substantially the same as or similar to the protective film 950 and the fourth adhesive layer 987 of the display 900 illustrated in FIG. 23.

In an embodiment, the protective film 1050 may be attached to the upper surface of the protective layer 1030 by the fourth adhesive layer 1087 so as to be detachable. In various embodiments, the protective film 950 may include a PET material, a PI material, or a PU material.

According to various embodiments, in the display 1000, a fourth reinforcement layer (not illustrated) that is the same as the third reinforcement layer 1095 may be added to the lower surface of the protective film 1050. For example, the fourth reinforcement layer may be coated on or directly attached to the protective film 1050 and may be attached to the protective layer 1030 through the fourth adhesive layer 1087. The fourth reinforcement layer may have substantially the same modulus as the third reinforcement layer 1095. The fourth reinforcement layer may be removed from the protective layer 1030 together with the protective film 1050 and the fourth adhesive layer 1087.

Figure 25:
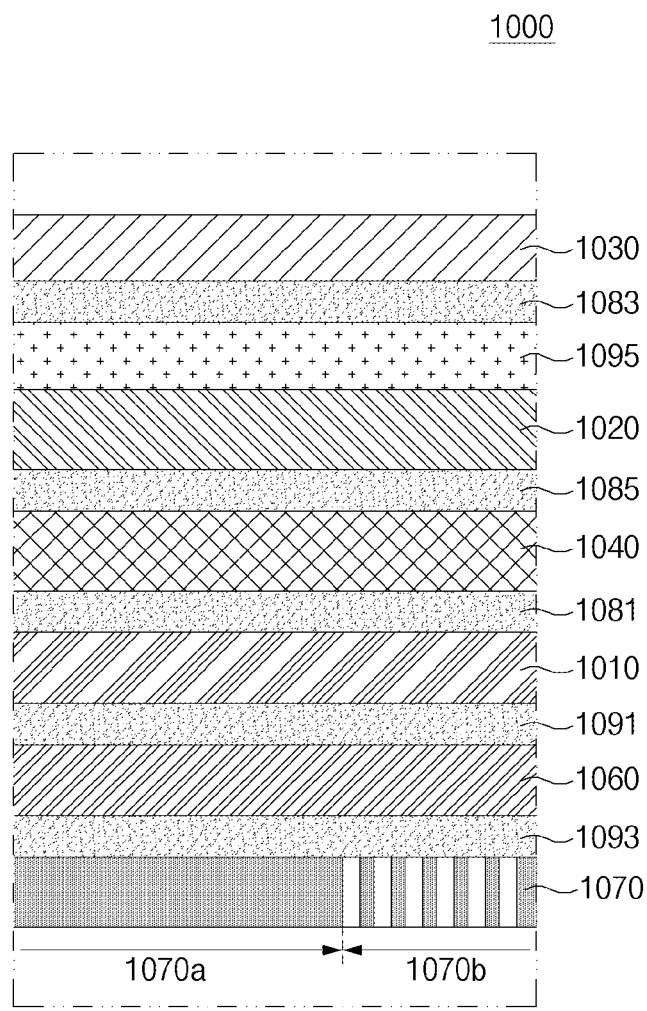
FIG. 25 is a cross-sectional view of a display of an electronic device according to various embodiments.

FIG. 25 is a sectional view of a display of an electronic device according to various embodiments.

FIG. 25 may be a view illustrating an embodiment in which the position of the third reinforcement layer 1095 is changed in the display 1000 illustrated in FIG. 24A. Hereinafter, repetitive descriptions may not be repeated, and the following description will be focused on the differences.

Referring to FIG. 25, the display 1000 according to an embodiment may include a panel layer 1010, a cover layer 1020, a protective layer 1030, a second reinforcement layer 1040, a barrier film 1060, a support layer 1070, a first adhesive layer 1081, a second adhesive layer 1083, a third adhesive layer 1085, a fifth adhesive layer 1091, a sixth adhesive layer 1093, and a third reinforcement layer 1095.

In an embodiment, the second adhesive layer 1083 may be disposed between the protective layer 1030 and the third reinforcement layer 1095. The second adhesive layer 1083 may be formed such that opposite surfaces have a predetermined adhesive force and may attach the third reinforcement layer 1095 to the protective layer 1030.

In an embodiment, the third reinforcement layer 1095 may be disposed between the cover layer 1020 and the second adhesive layer 1083. For example, the third reinforcement layer 1095 may be disposed on the upper surface of the cover layer 1030 and may be attached to the cover layer 1020 through the second adhesive layer 1083. The third reinforcement layer 1095 may be directly attached to or coated on the upper surface of the cover layer 1020. For example, the third reinforcement layer 1095 may be formed such that a surface facing the cover layer 1020 has an adhesive force. According to various embodiments, the third reinforcement layer 1095 may be formed in the form of an adhesive member PSA or a coating layer that has a relatively high modulus, but is not limited thereto.

An electronic device according to an embodiment of the disclosure may include a first housing, a second housing coupled to one side of the first housing and configured to slide in both directions, and a display including a plurality of layers, and a size of visible region of the display of a front surface of the electronic device may be changed in response to a sliding operation of the second housing. The display may include: a base part forming the front surface of the electronic device configured to maintain a shape based on the second housing sliding and a rollable part extending from the base part configured to be deformed to be flat or curved based on the sliding operation of the second housing. The plurality of layers may include a panel layer, a reinforcement layer disposed on one surface of the panel layer, and a cover layer disposed on one surface of the reinforcement layer and facing the panel layer with the reinforcement layer therebetween. The cover layer may include a first portion 55a included in the base part of the display and a second portion included in the rollable part of the display 150 when a section of the display is viewed. The first portion and the second portion may be different from each other in terms of at least one of a structure, a shape, or a property.

In various example embodiments, the electronic device may be configured in a first state in which the visible region has a first size and a second state in which the visible region has a second size greater than the first size. The panel layer may include a first panel region configured to display a screen in the first state and a second panel region extending from the first panel region, and at least a portion of the second panel region may be configured to display a screen together with the first panel region in the second state. The cover layer may be configured such that a partial region of the second portion and the first portion overlap the first panel region when the section of the display is viewed.

In various example embodiments, the cover layer may be configured such that the first portion has a first thickness and the second portion has a second thickness less than the first thickness.

In various example embodiments, the cover layer may further include a third portion located between the first portion and the second portion, wherein the third portion may have a gradually decreasing thickness from the first portion toward the second portion.

In various example embodiments, when the section of the display is viewed, the third portion may be included in the base part together with the first portion, and a boundary between the third portion and the second portion may be located on substantially a same line as a boundary between the base part and the rollable part.

In various example embodiments, the reinforcement layer may have a shape corresponding to a shape of the cover layer and is configured to fill a space between the cover layer and the panel layer.

In various example embodiments, the plurality of layers may further include a protective layer disposed on one surface of the cover layer and forming a portion of the front surface of the electronic device.

In various example embodiments, the plurality of layers may further include a first adhesive layer attaching the reinforcement layer to the panel layer and a second adhesive layer attaching the protective layer to the cover layer. The first adhesive layer may have a first modulus, and the second adhesive layer may have a second modulus greater than the first modulus.

In various example embodiments, a ratio of the first modulus to the second modulus may range from 0.012 to 0.04.

In various example embodiments, the cover layer may include a first layer and a second layer attached to a partial region of the first layer. When the section of the display is viewed, the first portion may include a portion of the first layer and the second layer, and the second portion may include another portion of the first layer.

In various example embodiments, the first layer may extend to be disposed over the base part and the rollable part, and the second layer may be attached to a partial region of the first layer to be disposed in the base part.

In various example embodiments, the first layer may have a uniform thickness, and the second layer may include a first section having a uniform thickness and a second section extending from the first section and having a gradually decreasing thickness.

In various example embodiments, the cover layer may include a first layer, a second layer attached to a region of the first layer, and a third layer attached to another region of the first layer. When the section of the display is viewed, the first portion may include a portion of the first layer and the second layer, and the second portion may include another portion of the first layer and the third layer.

In various example embodiments, the first layer may extend to be disposed over the base part and the rollable part, the second layer may be attached to region of the first layer to be disposed in the base part, and the third layer may be attached to another region of the first layer to be disposed in the rollable part.

In various example embodiments, the third layer may be thinner than the second layer.

In various example embodiments, the cover layer may include a first layer disposed in the base part and the rollable part and a second layer disposed between the first layer and the panel layer and having a plurality of through-holes in at least a partial region thereof.

In various example embodiments, the second layer may include a first section disposed in the base part and a second section disposed in the rollable part and having the plurality of through-holes therein. The cover layer may be configured such that the first portion is formed by the first section of the second layer and a portion of the first layer and the second portion is formed by the second section of the second layer and another portion of the first layer.

In various example embodiments, the electronic device may further include: a third housing coupled to an opposite side of the first housing from the second housing and configured to slide in both the directions. The display may be configured such that a size of a region visible on the front surface of the electronic device is changed in response to a sliding operation of the second housing and the third housing. The rollable part may include a first rollable part and a second rollable part extending from opposite end portions of the base part, respectively. The first rollable part may be configured to be partially deformed to be flat and curved in response to sliding of the second housing, and the second rollable part may be configured to be partially deformed to be flat and curved in response to sliding of the third housing.

In various example embodiments, the cover layer may include the first portion disposed in the base part and having a first thickness, the second portion disposed in the first rollable part and having a thickness less than the first thickness, a third portion disposed between the first portion and the second portion and having a gradually decreasing thickness, a fourth portion disposed in the second rollable part and having a thickness less than the first thickness, and a fifth portion disposed between the second portion and the fourth portion and having a gradually decreasing thickness.

An electronic device according to an example embodiment of the disclosure may include: a housing having an opening on one side thereof, a roller coupled to the inside of the housing and configured to be rotatable, and a display including a plurality of layers and having one end portion connected to the roller, the display being at least partially wound around the roller. The display may be visible outside the housing or accommodated in the housing through the opening in response to rotation of the roller. The display may include a base part configured to maintain a shape based on the roller rotating and a rollable part extending from the base part to be wound around the roller and deformed based on rotation of the roller. The plurality of layers may include a panel layer, a reinforcement layer disposed on one surface of the panel layer, and a cover layer disposed on one surface of the reinforcement layer and facing the panel layer with the reinforcement layer therebetween. At least one of the plurality of layers may extend over the base part and the rollable part and may be configured such that a portion included in the base part and a portion included in the rollable part are different from each other in terms of at least one of a structure, a shape, or a property.

In various example embodiments, the cover layer may include a first portion disposed in the base part and a second portion disposed in the rollable part, at least part of the second portion being thinner than the first portion.

In various example embodiments, at least a portion of the cover layer may have a gradually increasing thickness from the one end portion of the display connected to the roller toward an opposite end portion of the display.

An electronic device according to an example embodiment of the disclosure may include: a first housing, a second housing coupled to one side of the first housing and configured to slide in two directions, and a display including a plurality of layers, and a size of a visible region of the display of a front surface of the electronic device may be changed in response to a sliding operation of the second housing. The plurality of layers may include a panel layer including a first surface visible in a direction toward the front surface of the electronic device and a second surface facing away from the first surface, a cover layer attached to the first surface of the panel layer, a protective layer attached to the cover layer and facing the panel layer with the cover layer therebetween, a first adhesive layer disposed between the panel layer and the cover layer, and a second adhesive layer disposed between the cover layer and the protective layer. The first adhesive layer may have a first modulus, and the second adhesive layer may have a second modulus greater than the first modulus.

In various example embodiments, the first modulus may range from 0.03 MPa to 0.2 MPa, and the second modulus may range from 1 MPa to 3 MPa.

In various example embodiments, a ratio of the first modulus to the second modulus may range from 0.012 to 0.04.

An electronic device according to an example embodiment of the disclosure may include: a first housing, a second housing coupled to one side of the first housing and configured to slide in two directions, and a display including a plurality of layers, and a size of an visible region of the display of a front surface of the electronic device may be changed in response to a sliding operation of the second housing. The plurality of layers may include a panel layer including a first surface visible in a direction toward the front surface of the electronic device and a second surface facing away from the first surface, a cover layer attached to the first surface of the panel layer, a protective layer attached to the cover layer and facing the panel layer with the cover layer therebetween, a reinforcement layer (e.g., the third reinforcement layer 1095 of FIGS. 24A and 24B) disposed between the protective layer and the cover layer, and an adhesive layer (e.g., the second adhesive layer 1083 of FIGS. 24A and 24B) disposed between the reinforcement layer and the cover layer or between the protective layer and the reinforcement layer attaching the reinforcement layer to the cover layer or the protective layer. The reinforcement layer may have a modulus less than a modulus of the protective layer and greater than a modulus of the adhesive layer.

In various example embodiments, the modulus of the reinforcement layer may range from 1 MPa to 500 MPa, and the modulus of the adhesive layer may range from 0.03 MPa to 0.2 MPa.

In various example embodiments, the adhesive layer may be disposed between the reinforcement layer and the cover layer and may attach the reinforcement layer to the cover layer, and the reinforcement layer may be disposed between the adhesive layer and the protective layer and may be attached to or coated on a surface of the protective layer.

In various example embodiments, the adhesive layer may be disposed between the reinforcement layer and the protective layer and may attach the reinforcement layer to the protective layer, and the reinforcement layer may be disposed between the adhesive layer and the cover layer and may be attached to or coated on one surface of the cover layer.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software including one or more instructions that are stored in a storage medium that is readable by a machine (e.g., the electronic device 100, 200, 300). For example, a processor of the machine (e.g., the electronic device 100, 200, 300) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first housing;
a second housing slidably coupled to the first housing; and
a display including a plurality of layers, wherein a size of a region of the display exposed outside the electronic device is configured to be changed in response to a sliding operation of the second housing,
wherein the display includes a base part maintaining a shape regardless of the sliding operation of the second housing and a rollable part extending from the base part, wherein at least a portion of the rollable part is configured to be deformed according to the sliding operation of the second housing,
wherein the plurality of layers include:
a panel layer
a cover layer
including a first portion corresponding to the base part of the display and a second portion corresponding to the rollable part of the display; and
a reinforcement layer disposed between the panel layer and the cover layer and including a third portion corresponding to the first portion and a fourth portion corresponding to the second portion,
wherein the first portion of the cover layer has a first thickness and the second portion of the cover layer has a second thickness smaller than the first thickness, and
wherein the third portion of the reinforcement layer has a third thickness and a fourth portion of the reinforcement layer has a fourth thickness thicker than the third thickness such that a thickness difference of the cover layer is compensated.

2. The electronic device of claim 1, wherein the electronic device includes a first state in which the region has a first size and a second state in which the region has a second size greater than the first size,
wherein the panel layer includes a first panel region configured to display a screen in the first state and a second panel region extending from the first panel region, wherein at least a portion of the second panel region is configured to display a screen together with the first panel region in the second state, and
wherein the cover layer is configured such that a partial region of the second portion and the first portion overlap the first panel region when a section of the display is viewed.

3. The electronic device of claim 1, wherein the cover layer further includes a variable portion between the first portion and the second portion, and
wherein the variable portion has a decreasing thickness from the first portion toward the second portion.

4. The electronic device of claim 3, wherein when a section of the display is viewed, the variable portion is included in the base part together with the first portion, and a boundary between the variable portion and the second portion is on substantially a same line as a boundary between the base part and the rollable part.

5. The electronic device of claim 1, wherein the reinforcement layer has a shape corresponding to a shape of the cover layer and is configured to fill a space between the cover layer and the panel layer.

6. The electronic device of claim 1, wherein the plurality of layers further include a protective layer disposed on the cover layer and forming a portion of the display of the electronic device.

7. The electronic device of claim 6, wherein the plurality of layers further include a first adhesive layer attaching the reinforcement layer to the panel layer and a second adhesive layer attaching the protective layer to the cover layer,
wherein the first adhesive layer has a first modulus, and wherein the second adhesive layer has a second modulus greater than the first modulus.

8. The electronic device of claim 1, wherein the cover layer includes a first layer and a second layer attached to a partial region of the first layer, and wherein when a section of the display is viewed, the first portion includes a portion of the first layer and the second layer, and the second portion includes another portion of the first layer.

9. The electronic device of claim 8, wherein the first layer extends to be disposed over the base part and the rollable part, and a thickness of the first layer remains substantially uniform, and wherein the second layer includes a first section attached to a partial region of the first layer to be disposed in the base part and having a uniform thickness and a second section extending from the first section and having a decreasing thickness.

10. The electronic device of claim 1, wherein the cover layer includes:

a first layer disposed in the base part and the rollable part; and a second layer disposed between the first layer and the panel layer and having a plurality of through-holes in at least a partial region thereof.

11. The electronic device of claim 10, wherein the second layer includes a first section disposed in the base part and a second section disposed in the rollable part and having the plurality of through-holes therein, and wherein the cover layer is configured such that the first portion is formed by the first section of the second layer and a portion of the first layer and the second portion is formed by the second section of the second layer and another portion of the first layer.

12. The electronic device of claim 1, further comprising:

a third housing slidably coupled to the first housing, wherein a size of the region of the display is changed in response to a sliding operation of the second housing and/or the third housing, wherein the rollable part includes a first rollable part and a second rollable part extending from opposite end portions of the base part, respectively, wherein the first rollable part is configured to be partially deformed to be flat and curved in response to sliding of the second housing, wherein the second rollable part is configured to be partially deformed to be flat and curved in response to sliding of the third housing, and wherein the cover layer includes the first portion, the second portion, a first variable portion disposed between the first portion and the second portion and having a decreasing thickness from the first portion toward the second portion, a fifth portion disposed in the second rollable part and having a thickness less than the first thickness, and a second variable portion disposed between the second portion and the fourth portion and having a decreasing thickness from the first portion toward the fifth portion.

13. An electronic device comprising:

a first housing;

a second housing slidably coupled to the first housing; and a display including a plurality of layers, wherein a size of a region of the display exposed outside the electronic device is configured to be changed in response to a sliding operation of the second housing, wherein the display includes a base part maintaining a shape regardless of the sliding operation of the second housing and a rollable part extending from the base part, wherein a portion of the rollable part is configured to be deformed according to the sliding operation of the second housing, wherein the plurality of layers include:

a panel layer;

a cover layer including a first portion corresponding to the base part of the display and a second portion corresponding to the rollable part of the display;

a protective layer disposed on the cover layer and facing the panel layer with the cover layer therebetween;

a reinforcement layer disposed between the panel layer and the cover layer and including a third portion corresponding to the first portion and a fourth portion corresponding to the second portion;

a first adhesive layer disposed between the panel layer and the cover layer; and a second adhesive layer disposed between the cover layer and the protective layer, wherein the first portion of the cover layer has a first thickness and the second portion of the cover layer has a second thickness smaller than the first thickness, wherein the third portion of the reinforcement layer has a third thickness and a fourth portion of the reinforcement layer has a fourth thickness thicker than the third thickness such that a thickness difference of the cover layer is compensated, wherein the first adhesive layer has a first modulus, and wherein the second adhesive layer has a second modulus greater than the first modulus.

14. The electronic device of claim 13, wherein the first modulus ranges from 0.03 MPa to 0.2 MPa, and wherein the second modulus ranges from 1 MPa to 3 MPa.

15. The electronic device of claim 14, wherein a ratio of the first modulus to the second modulus ranges from 0.012 to 0.04.

16. An electronic device comprising:

a first housing;

a second housing slidably coupled to the first housing; and a display including a plurality of layers, wherein a size of a region of the display exposed outside the electronic device is configured to be changed in response to a sliding operation of the second housing, wherein the display includes a base part maintaining a shape regardless of the sliding operation of the second housing and a rollable part extending from the base part, wherein a portion of the rollable part is configured to be deformed according to the sliding operation of the second housing, wherein the plurality of layers include:

a panel layer;

a cover layer including a first portion corresponding to the base part of the display and a second portion corresponding to the rollable part of the display;

a protective layer disposed on the cover layer and facing the panel layer with the cover layer therebetween;

a reinforcement layer disposed between the protective layer and the cover layer and including a third portion corresponding to the first portion and a fourth portion corresponding to the second portion; and an adhesive layer disposed between the reinforcement layer and the cover layer or between the protective layer and the reinforcement layer and attaching the reinforcement layer to the cover layer or the protective layer, and wherein the reinforcement layer has a modulus less than a modulus of the protective layer and greater than a modulus of the adhesive layer, wherein the first portion of the cover layer has a first thickness and the second portion of the cover layer has a second thickness smaller than the first thickness, and wherein the third portion of the reinforcement layer has a third thickness and a fourth portion of the reinforcement layer has a fourth thickness thicker than the third thickness such that a thickness difference of the cover layer is compensated.

17. The electronic device of claim 16, wherein the modulus of the reinforcement layer ranges from 1 MPa to 500 MPa, and wherein the modulus of the adhesive layer ranges from 0.03 MPa to 0.2 MPa.

* * * * *